(12) United States Patent
Sumino et al.

(10) Patent No.: US 7,537,698 B2
(45) Date of Patent: May 26, 2009

(54) PROCESS AND EQUIPMENT FOR TREATING AMMONIUM CONTAINING LIQUID

(75) Inventors: Tatsuo Sumino, Chiyoda-ku (JP); Kazuichi Isaka, Chiyoda-ku (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 294 days.

(21) Appl. No.: 11/359,529

(22) Filed: Feb. 23, 2006

(65) Prior Publication Data

US 2006/0191846 A1  Aug. 31, 2006

(30) Foreign Application Priority Data

Feb. 28, 2005 (JP) ............................. 2005-054423
Mar. 4, 2005 (JP) ............................. 2005-061375
May 18, 2005 (JP) ............................. 2005-145785

(51) Int. Cl.
*C02F 3/30* (2006.01)

(52) U.S. Cl. .................. 210/603; 210/605; 210/616; 210/630; 210/631; 210/903

(58) Field of Classification Search ............... 210/605, 210/610, 611, 615, 616, 630, 631, 903, 603
See application file for complete search history.

(56) References Cited

U.S. PATENT DOCUMENTS 6,383,390 B1 *  5/2002  Van Loosdrecht et al. ... 210/630

| | | |
|---|---|---|
| 6,485,646 B1 | 11/2002 | Dijkman et al. |
| 2005/0211629 A1 | 9/2005 | Isaka et al. |
| 2006/0091073 A1 | 5/2006 | Sumino et al. |

FOREIGN PATENT DOCUMENTS

| | | |
|---|---|---|
| EP | 1 580 169 A1 | 9/2005 |
| EP | 1 595 852 A1 | 11/2005 |
| EP | 1 652 824 A1 | 5/2006 |
| JP | A 10-314787 | 12/1998 |
| JP | A 2001-037467 | 2/2001 |
| JP | A 2004-255269 | 9/2004 |

OTHER PUBLICATIONS

Wyffels, Stijn et al., "Identification And Quantification Of Nitrogen Removal In A Rotating Biological Contactor By $^{15}N$ Tracer Techniques," Water Research, vol. 37, pp. 1252-1259, Mar. 2003.
Dalsgaard, Tage et al., "Factors controlling anaerobic ammonium oxidation with nitrite in marine sediments," Applied and Environmental Microbiology, vol. 68, No. 8, 2002, pp. 3802-3808, XP-002384184.

(Continued)

*Primary Examiner*—Fred Prince
(74) *Attorney, Agent, or Firm*—Oliff & Berridge, PLC

(57) ABSTRACT

The process for treating an ammonium containing liquid by denitrification treatment of an ammonium containing liquid containing at least ammonium comprises carrying out nitrate reduction treatment of reducing nitrate contained in or added to the ammonium containing liquid to nitrite, and carrying out anaerobic ammonium oxidation treatment of simultaneously anaerobically denitrifying nitrite produced in the nitrate reduction treatment and ammonium contained in the ammonium containing liquid by anaerobic ammonium oxidizing bacteria.

9 Claims, 22 Drawing Sheets

OTHER PUBLICATIONS

Drysdale, G.D. et al., "Denitrification by heterotrophic bacteria during activated sludge treatment," Water SA, vol. 25, No. 3 Jul. 1999, pp. 357-362, XP002381260.

Strous, Marc et al., "Ammonium removal from concentrated waste streams with the anaerobic ammonium oxidation (anammox) process in different reactor configurations," Water Research, vol. 31, No. 8, Aug. 1997, pp. 1955-1962, XP004877663.

Stuven, Ralf et al., "Nitrification and denitrification as a source for NO and NO2 production in high-strength wasterwater," Water Research, vol. 35, No. 8, Jun. 2001, pp. 1905-1914, XP004233394.

* cited by examiner

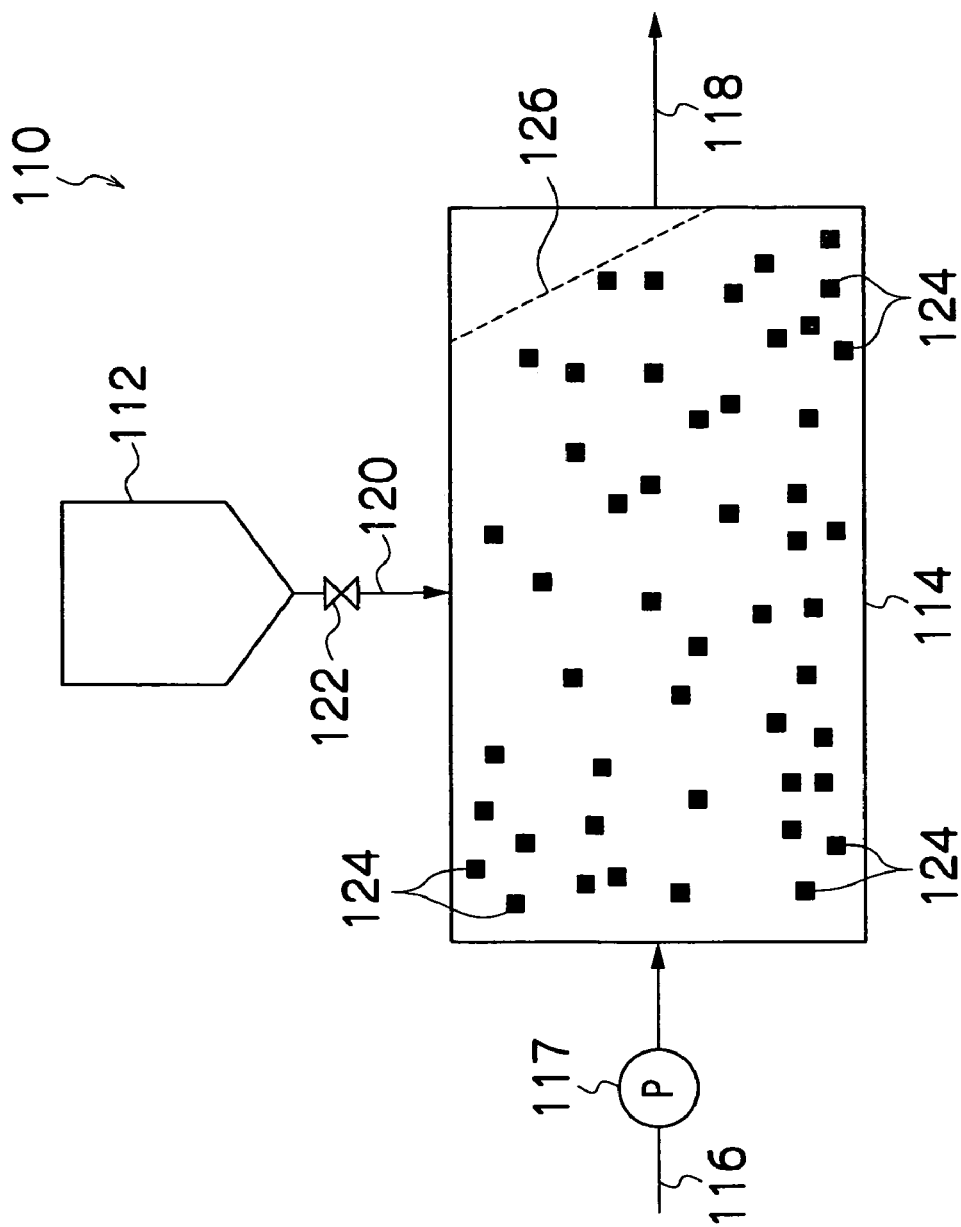

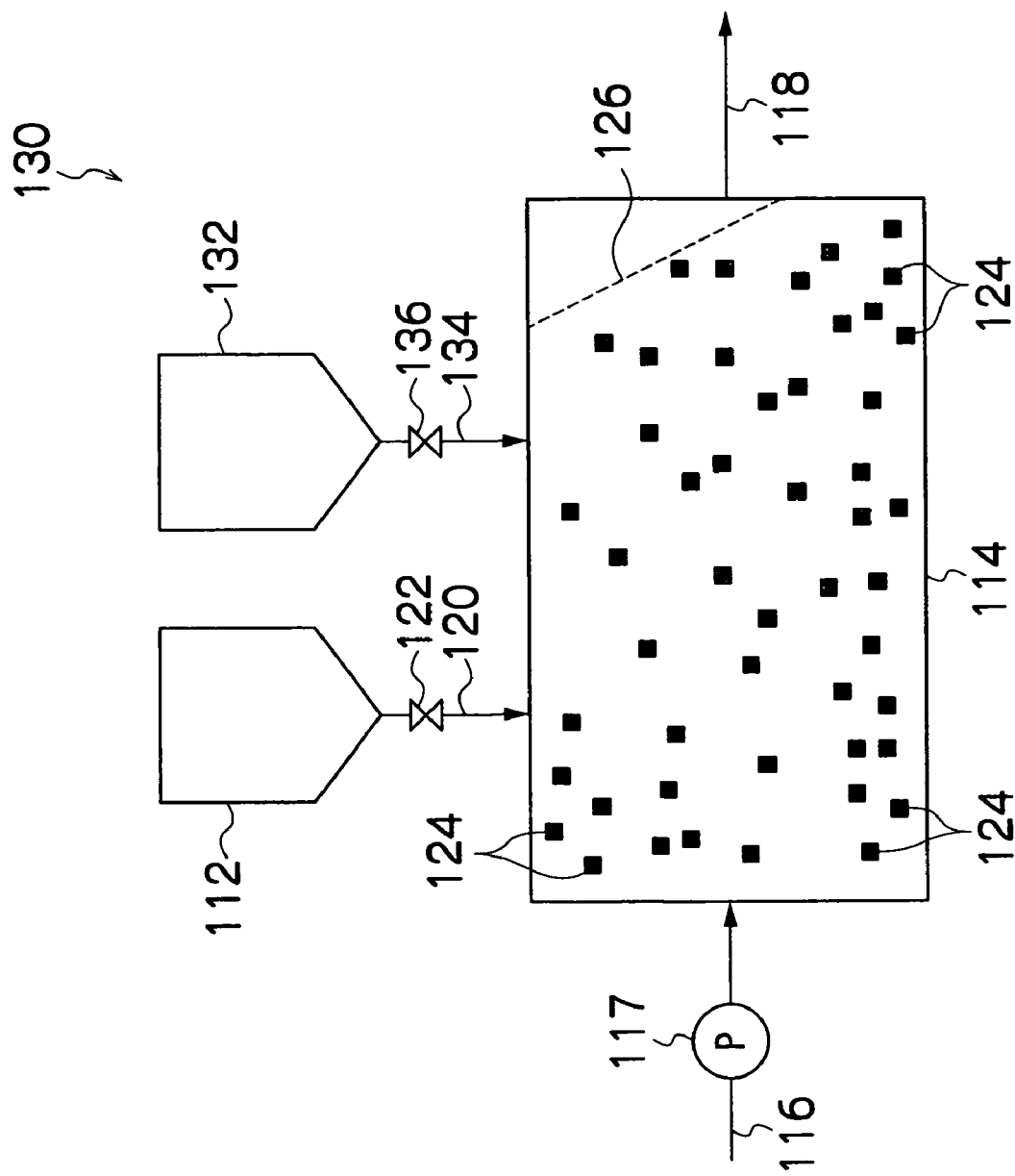

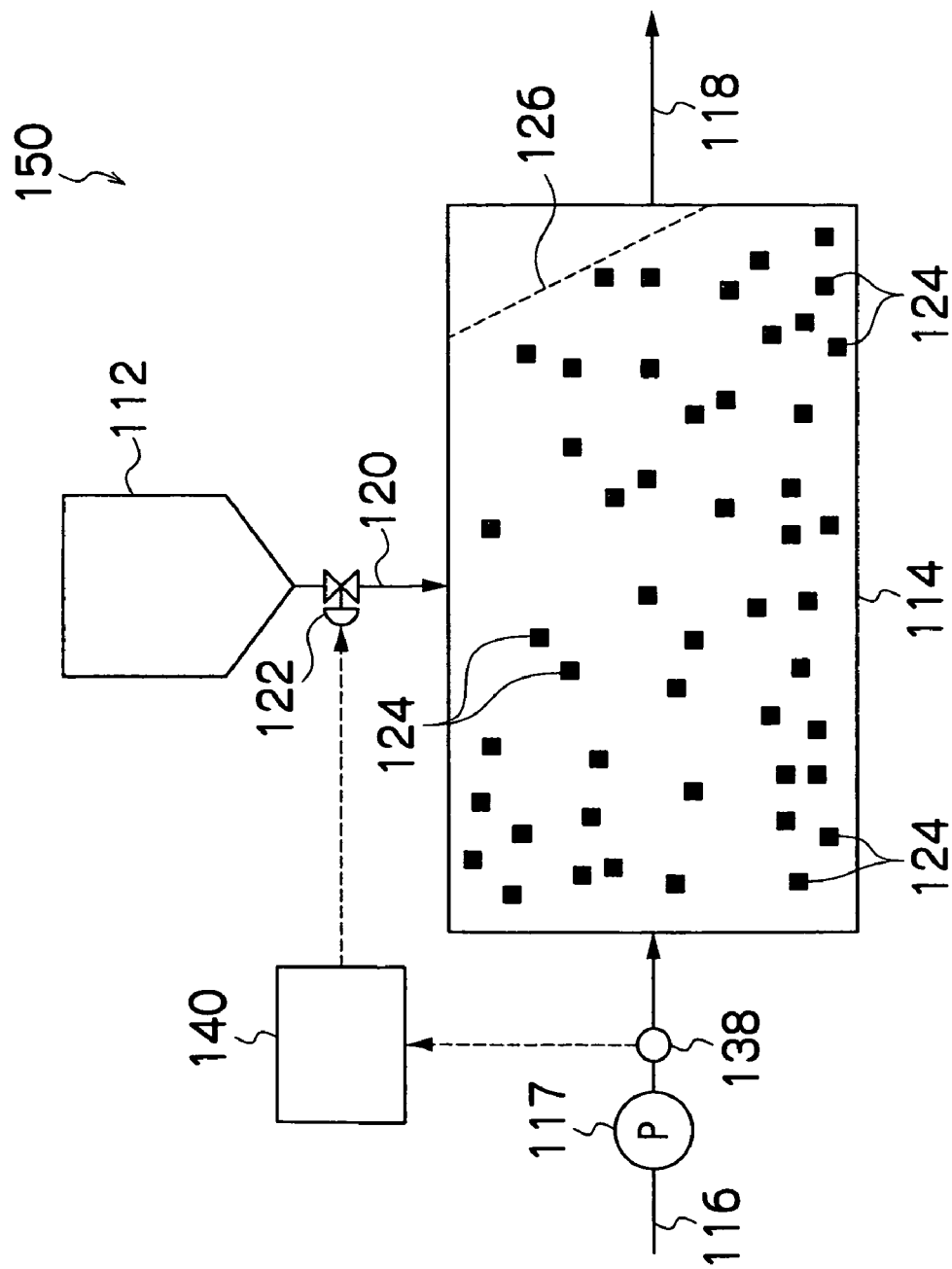

PROCESS AND EQUIPMENT FOR TREATING AMMONIUM CONTAINING LIQUID

BACKGROUND OF THE INVENTION

1. Field of the Invention

The present invention relates to a process and equipment for treating an ammonium containing liquid, in particular, to a technology for biologically denitrifying ammonium in an ammonium containing liquid generated in various fields such as the field of wastewater treatment and the field of fine chemicals.

2. Description of the Related Art

Since the Mikawashima sewage treatment plant in Tokyo began operation of full-scale sewage treatment in 1922, sewage treatment plants have operated not only treatment of organic substances but also treatment of nitrogen. In particular, governments of major cities have invested in sewage treatment so that the sewerage coverage finally reached more than 90%.

However, the sewerage has allowed almost no closed water areas to meet environmental standards. This is largely because of abnormal propagation of algae as an internal factor in water areas, but also because of inflow wastewater as an external factor still to be eliminated. In particular, nitrogen is largely involved in the external factor.

Thus, a large amount is nitrogen is contained in sewage or wastewater in the form of ammonium nitrogen. Ammonium containing liquids with low to high concentrations are generated in industrial wastewater, photographic development wastewater, and wastewater from chemical factories to produce chemical products, for example. These ammonium containing liquids, if discharged as wastewater, cause eutrophication and lowering the level of dissolved oxygen in waters, and thus it is necessary to purge ammonium before discharging the liquids. Further, it is necessary to purge ammonium from liquid chemical products containing ammonium in order to increase purity of the chemical products.

In these circumstances, ammonium containing liquids with low concentrations have been conventionally oxidized by chlorine or biologically treated. In the chlorine treatment, chlorine is reacted with ammonium to remove ammonium and produce chloramine at the same time. The chlorine treatment is not used for treating ammonium containing liquids with middle to high concentrations, since the chloramine is highly bactericidal and may disturb the ecosystem in the environment, and the treatment requires a large amount of chlorine. Such liquids are typically biologically treated by nitrification and denitrification.

The biological treatment by nitrification and denitrification is performed in sewage treatment plants and wastewater treatment plants by nitrification in which ammonium is converted into nitrate through nitrite by nitrifying bacteria, and denitrification in which nitrate is converted into nitrogen gas by denitrifying bacteria. However, the treatment of ammonium containing liquids by nitrification and denitrification requires an organic substance in denitrification reaction, and requires methanol to be added in an amount three times greater than nitrogen as the organic substance. In order to remove nitrogen in a stable manner, such treatment must be operated at a low nitrogen load of 0.2 to 0.4 kg-N/m$^3$/day. Accordingly, as the concentration of ammonia is higher, a greater amount of expensive methanol is used. Thus, a large tank is necessary as a treatment tank, and the treatment requires not only an initial cost but also a large running cost, disadvantageously.

In this situation, a process for treating wastewater utilizing anaerobic ammonium oxidation has been attracted attention from a long time ago (for example, Japanese Patent Application Laid-Open No. 2001-037467). The anaerobic ammonium oxidation is a method comprising converting a part of ammonium to nitrite by nitrite-type nitrification reaction using ammonium oxidizing bacteria, with ammonium as an electron donor and nitrite as an electron acceptor, and simultaneously denitrifying the nitrite and the remaining ammonium using anaerobic ammonium oxidizing bacteria without requiring an organic substance. The anaerobic ammonium oxidation requires only a small amount of oxygen in nitrification reaction, does not require an organic substance (such as methanol) in denitrification reaction, and thus can be operated at a considerably reduced running cost, advantageously. The anaerobic ammonium oxidation can reduce the amount of sludge generated, for example, advantageously, and is assumed to be an effective wastewater treatment method in the future.

A large number of processes for treating ammonium containing liquids as wastewater by anaerobic ammonium oxidation disclosed in Japanese Patent Application Laid-Open No. 2001-37467 have been proposed which are allegedly advantageous in significantly reducing the running cost. However, these processes have difficulty in practical use and have not been commonly employed.

This is because, in anaerobic ammonium oxidation, the reaction involves nitrite as an electron acceptor but does not involve nitrate as an electron acceptor, and thus nitrite must be supplied in a stable manner.

Specifically, when wastewater has a low ammonium nitrogen concentration, ammonium is easily oxidized to nitrate, and the amount of ammonium oxidized to nitrite is necessarily small. Thus, the wastewater has a ratio of ammonium to nitrite differing from such a ratio suitable for anaerobic ammonium oxidizing bacteria. In this manner, nitrification reaction of converting a part of ammonium to nitrite is not stable, and thus the concentration of nitrite reacted with ammonium is easily changed over time. Since it is thus difficult to react nitrite with ammonium by denitrification constantly at a preferable ratio between them, ammonium containing liquids cannot be treated in a stable manner, quality of the treated liquids tends to vary, and anaerobic ammonium oxidation treatment cannot be efficiently carried out. In particular, wastewater such as sewage tends to have a low ammonium nitrogen concentration, and it is thus difficult to treat such wastewater stably for a long time.

The present invention has been achieved in view of such circumstances. An object of the present invention is to provide a process and equipment for treating an ammonium containing liquid which can perform high-speed denitrification of an ammonium containing liquid by anaerobic ammonium oxidation or the like, without being affected by the change in concentrations of nitrogen components in the ammonium containing liquid to be treated, and can provide a treated liquid with high quality constantly stably.

SUMMARY OF THE INVENTION

According to a first aspect of the present invention, to attain the aforementioned object, there is provided a process for treating an ammonium containing liquid by denitrification treatment of an ammonium containing liquid containing at least ammonium, the process comprising carrying out nitrate reduction treatment of reducing nitrate contained in or added to the ammonium containing liquid to nitrite, and carrying out anaerobic ammonium oxidation treatment of simultaneously anaerobically denitrifying nitrite produced in the nitrate reduction treatment and ammonium contained in the ammonium containing liquid by anaerobic ammonium oxidizing bacteria.

According to the process for treating an ammonium containing liquid of the present invention, a conventional ammonium oxidation treatment of carrying out anaerobic ammonium oxidation treatment in which ammonium and nitrite are simultaneously denitrified by anaerobic ammonium oxidizing bacteria further comprises carrying out nitrate reduction treatment of reducing nitrate forming a nitrogen component in an ammonium containing liquid to nitrite. Consequently, even when an ammonium containing liquid has low nitrite and ammonium concentrations, the nitrite concentration can be increased by reducing nitrate in the ammonium containing liquid to nitrite by nitrate reduction treatment, and thus anaerobic ammonium oxidation treatment that allows high-speed denitrification can be carried out in a stable manner. On the other hand, even when an ammonium containing liquid has high ammonium and nitrite concentrations, nitrate contained in the ammonium containing liquid at a low concentration can be reduced to nitrite and, at the same time, efficiently denitrified by anaerobic ammonium oxidation treatment. Accordingly, when the present invention is employed, an ammonium containing liquid can be denitrified at a high speed in a stable manner irrespective to the concentrations of nitrogen components contained in an ammonium containing liquid.

Here, nitrate added to an ammonium containing liquid is not limited to synthetic nitrate added to the liquid, but includes nitrate obtained by biologically nitrifying ammonium in ammonium wastewater using a microorganism in a nitrification tank (aerobic tank). Hereinafter the same.

According to a second aspect of the present invention, there is provided the process for treating an ammonium containing liquid according to the first aspect, wherein the nitrate reduction treatment and the anaerobic ammonium oxidation treatment are carried out by bringing the ammonium containing liquid into contact with pellets in which heterotrophic denitrifying bacteria that reduce the nitrate to nitrite using, as a hydrogen donor, an organic substance contained in or added to the ammonium containing liquid are entrapped to be immobilized and pellets in which the anaerobic ammonium oxidizing bacteria are entrapped to be immobilized. According to a third aspect of the present invention, there is provided the process for treating an ammonium containing liquid according to the first aspect, wherein the nitrate reduction treatment and the anaerobic ammonium oxidation treatment are carried out by bringing the ammonium containing liquid into contact with pellets in which heterotrophic denitrifying bacteria that reduce the nitrate to nitrite using, as a hydrogen donor, an organic substance contained in or added to the ammonium containing liquid and the anaerobic ammonium oxidizing bacteria are entrapped to be immobilized.

According to the present invention, in the second aspect, an ammonium containing liquid is brought into contact with pellets in which heterotrophic denitrifying bacteria carrying out nitrate reduction treatment are entrapped to be immobilized and pellets in which anaerobic ammonium oxidizing bacteria are entrapped to be immobilized. In the third aspect, an ammonium containing liquid is brought into contact with pellets in which both the heterotrophic denitrifying bacteria and the anaerobic ammonium oxidizing bacteria are entrapped to be immobilized. Thus, nitrate reduction treatment and anaerobic ammonium oxidation treatment can be performed at the same time. Since heterotrophic denitrifying bacteria and anaerobic ammonium oxidizing bacteria are entrapped to be immobilized in entrapping immobilization pellets easily handled, the contact rate of the bacteria with an ammonium containing liquid can be increased, and the growth rate of each bacteria in each pellets and activity and operability of each treatment can be improved. Further, since the present invention can be applied to a conventional anaerobic ammonium oxidation treatment process when the pellets in which heterotrophic denitrifying bacteria are entrapped to be immobilized according to the second aspect are employed in the process, or the pellets in which heterotrophic denitrifying bacteria and anaerobic ammonium oxidizing bacteria are entrapped to be immobilized according to the third aspect are employed instead of such pellets in the process. Therefore, such a process can be easily and inexpensively changed to the treatment process of the present invention carrying out stable high-speed denitrification.

According to a fourth aspect of the present invention, there is provided the process for treating an ammonium containing liquid according to the first aspect, wherein the nitrate reduction treatment and the anaerobic ammonium oxidation treatment are carried out by bringing the ammonium containing liquid into contact with pellets to which heterotrophic denitrifying bacteria that reduce the nitrate to nitrite using, as a hydrogen donor, an organic substance contained in or added to the ammonium containing liquid are attached to be immobilized and pellets to which the anaerobic ammonium oxidizing bacteria are attached to be immobilized. According to a fifth aspect of the present invention, there is provided the process for treating an ammonium containing liquid according to the first aspect, wherein the nitrate reduction treatment and the anaerobic ammonium oxidation treatment are carried out by bringing the ammonium containing liquid into contact with pellets to which heterotrophic denitrifying bacteria that reduce the nitrate to nitrite using, as a hydrogen donor, an organic substance contained in or added to the ammonium containing liquid and the anaerobic ammonium oxidizing bacteria are attached to be immobilized.

The processes according to the fourth and fifth aspects can provide the same effects as exhibited by the processes according to the second and third aspects, and can reduce the labor and cost required for immobilization of each bacteria as compared with entrapping immobilization.

According to a sixth aspect of the present invention, there is provided the process for treating an ammonium containing liquid according to the first aspect, wherein the nitrate reduction treatment is carried out by bringing the ammonium containing liquid into contact with a catalyst that reduces the nitrate as a nitrogen component to nitrite. In the nitrate reduction treatment of the present invention, the same effects can be achieved by a chemical reaction using a catalyst. The catalyst is preferably a Pd—Cu catalyst formed of an alloy of palladium and copper. Consequently, nitrate reduction treatment using a catalyst does not allow a metal to flow to treated water, and nitrate can be efficiently reduced to nitrite.

According to an eighth aspect of the present invention, there is provided the process for treating an ammonium containing liquid according to any one of the second to fifth aspects, wherein the heterotrophic denitrifying bacteria are controlled to have cells 10 to 1,000 times of cells that the anaerobic ammonium oxidizing bacteria have.

According to the present invention, since nitrate reduction treatment and anaerobic ammonium oxidation treatment are carried out by controlling the ratio in number of cells of heterotrophic denitrifying bacteria to anaerobic ammonium oxidizing bacteria to make these bacteria live symbiotically and coexist in a preferable state, the nitrogen removal ratio can be improved.

According to a ninth aspect of the present invention, there is provided the process for treating an ammonium containing liquid according to any one of the first to eighth aspects, wherein the $C/NO_3$—N ratio of the concentration C of the organic carbon contained in or added to the ammonium containing liquid to the concentration $NO_3$—N of nitrate nitrogen contained in or added to the ammonium containing liquid is defined to be 0.5 to 2.5.

According to the present invention, efficiency in the aforementioned nitrate reduction treatment and anaerobic ammonium oxidation treatment is influenced by the ratio of the organic carbon concentration to the nitrate nitrogen concentration in an ammonium containing liquid to be treated. Specifically, when the $C/NO_3$—N ratio of the organic carbon concentration C to the nitrate nitrogen concentration $NO_3$—N is controlled to be 0.5 to 2.5, heterotrophic denitrifying bacteria cause insufficient nitrate reduction reaction, and thus nitrite in the ammonium containing liquid to be treated can be easily accumulated without being reduced to nitrogen gas. Consequently, accumulated nitrite and ammonium can be rapidly treated with anaerobic ammonium oxidizing bacteria, an ammonium containing liquid can be denitrified at a high speed.

According to a tenth aspect of the present invention, to attain the aforementioned object, there is provided equipment for treating an ammonium containing liquid by denitrification treatment of an ammonium containing liquid containing at least ammonium, the equipment comprising a nitrate reduction tank of reducing nitrate contained in or added to the ammonium containing liquid to nitrite by heterotrophic denitrifying bacteria using, as a hydrogen donor, an organic carbon contained in or added to the ammonium containing liquid, and an anaerobic ammonium oxidation tank of simultaneously anaerobically denitrifying nitrite produced in the nitrate reduction tank and ammonium contained in the ammonium containing liquid by anaerobic ammonium oxidizing bacteria.

The tenth aspect of the present invention shows a configuration of equipment that implements the aforementioned processes for treating an ammonium containing liquid according to the first to ninth aspects.

According to an eleventh aspect of the present invention, there is provided the equipment for treating an ammonium containing liquid according to the tenth aspect, wherein the nitrate reduction tank has a structure of bringing the ammonium containing liquid into contact with pellets in which the heterotrophic denitrifying bacteria are entrapped to be immobilized, and the anaerobic ammonium oxidation tank has a structure of bringing the ammonium containing liquid treated in the nitrate reduction tank into contact with pellets in which the anaerobic ammonium oxidizing bacteria are entrapped to be immobilized. According to a twelfth aspect of the present invention, there is provided the equipment for treating an ammonium containing liquid according to the tenth aspect, wherein the nitrate reduction tank has a structure of bringing the ammonium containing liquid into contact with pellets to which the heterotrophic denitrifying bacteria are attached to be immobilized, and the anaerobic ammonium oxidation tank has a structure of bringing the ammonium containing liquid treated in the nitrate reduction tank into contact with pellets to which the anaerobic ammonium oxidizing bacteria are attached to be immobilized.

By entrapping immobilization or attachment immobilization of heterotrophic denitrifying bacteria or anaerobic ammonium oxidizing bacteria as described above, the equipment for treating an ammonium containing liquid can have performance easily maintained and denitrification capability improved.

In the aforementioned equipment for treating an ammonium containing liquid of the present invention, the nitrate reduction tank and the anaerobic ammonium oxidation tank preferably have a cell amount ratio control device of controlling the number of cells of the heterotrophic denitrifying bacteria to 10 to 1,000 times the number of cells of the anaerobic ammonium oxidizing bacteria. The nitrate reduction tank and the anaerobic ammonium oxidation tank also preferably have a $C/NO_3$—N ratio control device of controlling the $C/NO_3$—N ratio of the concentration C of the organic carbon contained in or added to the ammonium containing liquid to the concentration $NO_3$—N of nitrate nitrogen contained in or added to the ammonium containing liquid to 0.5 to 2.5. This can promote stable high-speed denitrification of an ammonium containing liquid in the equipment for treating an ammonium containing liquid.

According to a fifteenth aspect of the present invention, there is provided the equipment for treating an ammonium containing liquid according to the tenth aspect, wherein the nitrate reduction tank and the anaerobic ammonium oxidation tank are carried out in one anaerobic tank.

In the present invention, in particular, nitrate reduction treatment and anaerobic ammonium oxidation treatment do not have to be separately carried out insofar as each treatment is not prevented. When heterotrophic denitrifying bacteria and anaerobic ammonium oxidizing bacteria are present in one anaerobic tank and each of the treatments is carried out for an ammonium containing liquid in the one tank, the same effects as in the separate treatments can be obtained.

The aforementioned anaerobic tank preferably has a structure of bringing the ammonium containing liquid into contact with pellets in which the heterotrophic denitrifying bacteria are entrapped to be immobilized and pellets in which the anaerobic ammonium oxidizing bacteria are entrapped to be immobilized. The anaerobic tank may have a structure of bringing the ammonium containing liquid into contact with pellets in which the heterotrophic denitrifying bacteria and the anaerobic ammonium oxidizing bacteria are entrapped to be immobilized. Further, the anaerobic tank may have a structure of bringing the ammonium containing liquid into contact with pellets to which the heterotrophic denitrifying bacteria that reduce the nitrate to nitrite are attached to be immobilized and pellets to which the anaerobic ammonium oxidizing bacteria are attached to be immobilized. The anaerobic tank may have a structure of bringing the ammonium containing liquid brought into contact with pellets to which the heterotrophic denitrifying bacteria and the anaerobic ammonium oxidizing bacteria are attached to be immobilized.

Here, the anaerobic tank preferably has a cell amount ratio control device of controlling the number of cells of the heterotrophic denitrifying bacteria to 10 to 1,000 times the number of cells of the anaerobic ammonium oxidizing bacteria. The anaerobic tank preferably has a $C/NO_3$—N ratio control device of controlling the $C/NO_3$—N ratio of the concentration C of the organic carbon contained in or added to the ammonium containing liquid to the concentration $NO_3$—N of nitrate nitrogen contained in or added to the ammonium containing liquid to 0.5 to 2.5.

According to a twenty-second aspect of the present invention, to attain the aforementioned object, there is provided a process for treating an ammonium containing liquid by anaerobically biologically denitrifying ammonium in the ammonium containing liquid, the process comprising adding a certain concentration of nitrate to an anaerobic ammonium oxidation tank from a nitrate storage tank with the nitrate stored when the ammonium containing liquid is brought into contact with heterotrophic denitrifying bacteria and anaerobic ammonium oxidizing bacteria in the anaerobic ammonium oxidation tank to carry out the biological denitrification.

If a part of ammonium in an ammonium containing liquid is converted to nitrite by nitrite-type nitrification reaction using nitrifying bacteria, and the converted nitrite and the remaining ammonium are denitrified by anaerobic ammonium oxidizing bacteria, in a conventional manner, the concentration of nitrite to be reacted with ammonium tends to vary over time. Because of this, according to the present invention, a certain concentration of nitrate is stored in the nitrate storage tank, and a certain concentration of nitrate is added to the anaerobic ammonium oxidation tank as a biological treatment tank from the nitrate storage tank.

Specifically, when a certain concentration of nitrate is added from the nitrate storage tank, the added nitrate can be converted to nitrite by heterotrophic denitrifying bacteria using, as a hydrogen donor, a BOD component in an ammonium containing liquid flowing into the anaerobic ammonium oxidation tank. Consequently, the concentration of nitrite as an instable element can be stable, and thus nitrite and ammonium can be simultaneously denitrified by anaerobic ammonium oxidizing bacteria in a stable manner. Furthermore, since nitrate inexpensive than nitrite is added, the running cost necessary for the treatment can be reduced.

Here, a certain concentration of nitrate stored in the nitrate storage tank may be nitrate of a naturally occurring substance or chemically synthesized substance such as nitrate metal salt, or may be nitrate biologically produced by nitrifying bacteria in a nitrification tank. It is basically enough only if a certain concentration of nitrate can be added to the anaerobic ammonium oxidation tank from the nitrate storage tank.

According to a twenty-third aspect of the present invention, to attain the aforementioned object, there is provided a process for treating an ammonium containing liquid by anaerobically biologically denitrifying ammonium in the ammonium containing liquid, the process comprising adding a certain concentration of nitrate to an anaerobic ammonium oxidation tank from a nitrate storage tank with the nitrate stored, and adding a certain concentration of an organic substance to the anaerobic ammonium oxidation tank from an organic substance storage tank with the organic substance stored when the ammonium containing liquid is brought into contact with heterotrophic denitrifying bacteria and anaerobic ammonium oxidizing bacteria in the anaerobic ammonium oxidation tank to carry out the biological denitrification.

If the amount of a BOD component in an ammonium containing liquid to be treated is small, specifically, the organic substance concentration is small, the reaction of reducing nitrate to nitrite by heterotrophic denitrifying bacteria is carried out with reduced reactivity. Because of this, according to the present invention, a certain concentration of an organic substance is added in a necessary amount from the organic substance storage tank, in addition to a certain concentration of nitrate. Consequently, nitrate added from the nitrate storage tank can be constantly stably reduced to nitrite by heterotrophic denitrifying bacteria in the anaerobic ammonium oxidation tank, and thus nitrite and ammonium can be simultaneously denitrified by anaerobic ammonium oxidizing bacteria in a more stable manner.

According to a twenty-fourth aspect of the present invention, there is provided the process for treating an ammonium containing liquid according to the twenty-second or twenty-third aspect, further comprising measuring the ammonium nitrogen concentration in the ammonium containing liquid, calculating the necessary amount of nitrate from the measured ammonium nitrogen concentration, and controlling the amount of a certain concentration of the nitrate added, based on the calculated necessary amount of the nitrate.

According to the present invention, the necessary amount of nitrite is calculated from the ammonium nitrogen concentration obtained by measurement for an ammonium containing liquid, and the amount of a certain concentration of nitrite added is controlled based on the calculation results. Consequently, the amount of nitrite added can be appropriately controlled according to the ammonium concentration in an ammonium containing liquid. The process is particularly effective when the ammonium concentration in an ammonium containing liquid varies. The ammonium nitrogen concentration in an ammonium containing liquid may be measured continuously or intermittently.

According to a twenty-fifth aspect of the present invention, there is provided the process for treating an ammonium containing liquid according to the twenty-third aspect, further comprising measuring the ammonium nitrogen concentration in the ammonium containing liquid, calculating the necessary amount of nitrate from the measured ammonium nitrogen concentration, controlling the amount of a certain concentration of the nitrate added from the nitrate storage tank, based on the calculated necessary amount of the nitrate, and controlling the amount of a certain concentration of the organic substance added from the organic storage tank, so that the $C/NO_3$—N ratio of the organic carbon concentration to the nitrate nitrogen concentration in the ammonium containing liquid is 0.5 to 2.5.

According to the present invention, when a necessary amount of a certain concentration of nitrate is added to the anaerobic ammonium oxidation tank from the nitrate storage tank in accordance with the measured ammonium nitrogen concentration in an ammonium containing liquid, the amount of a certain concentration of an organic substance added from the organic substance storage tank is controlled in accordance with the necessary amount of nitrate added, so that the $C/NO_3$—N ratio of the organic carbon concentration to the nitrate nitrogen concentration in the ammonium containing liquid is 0.5 to 2.5.

Consequently, nitrate is added to the anaerobic ammonium oxidation tank while maintaining a constantly stable $C/NO_3$—N ratio, a competition for nitrite in an ammonium containing liquid can be prevented between heterotrophic denitrifying bacteria and anaerobic ammonium oxidizing bacteria. Accordingly, since nitrate reduction reaction by heterotrophic denitrifying bacteria and simultaneous denitrification of nitrite and ammonium by anaerobic ammonium oxidizing bacteria can be carried out in a stable manner without being affected by the quality of an ammonium containing liquid, constantly stable high-speed denitrification can be continuously carried out.

According to a twenty-sixth aspect of the present invention, there is provided the process for treating an ammonium containing liquid according to any one of the twenty-second to twenty-fifth aspects, further comprising measuring the volume of the ammonium containing liquid flowing into the anaerobic ammonium oxidation tank, and increasing or decreasing the amount of a certain concentration of the nitrate added in proportion to an increase or decrease in the measured inflow volume.

According to the present invention, once the amount of nitrate added is determined corresponding to the necessary amount of nitrate, the amount of nitrate added is increased or decreased in proportion to an increase or decrease in the inflow volume of an ammonium containing liquid. The amount of nitrate added corresponding to the necessary amount of nitrate may be determined by calculating the necessary amount of nitrate from measurement of the ammonium nitrogen concentration in the ammonium containing liquid as in the twenty-fourth and twenty-fifth aspects. Consequently, the amount of nitrate added can be appropriately controlled in accordance with the inflow volume of the ammonium containing liquid, and the measurement and controlling can be simplified. The inflow volume of the ammonium containing liquid may be measured continuously or intermittently. This process is effective for an ammonium containing liquid having a constant ammonium concentration such as a development waste liquid. By measuring not only the ammonium nitrogen concentration in the ammonium containing liquid but also the volume of the ammonium containing liquid flowing into the anaerobic ammonium oxidation tank, and controlling the amount of nitrite added, based on both the ammonium nitrogen concentration and the inflow volume, the amount of nitrite added can be more accurately controlled.

According to a twenty-seventh aspect of the present invention, there is provided the process for treating an ammonium containing liquid according to the twenty-second or twenty-third aspect, further comprising increasing or decreasing the amount of the nitrate added to the anaerobic ammonium oxidation tank from the nitrate storage tank, measuring an increase or decrease in the production rate (L/min) of nitrogen gas produced in the anaerobic ammonium oxidation tank when the amount is increased or decreased, and controlling the amount of a certain concentration of the nitrate added with reference to, as the necessary amount of nitrate, an amount that does not allow the gas production rate to be increased or decreased in direct proportion to an increase or decrease in the amount of the nitrate added.

The process of the present invention controls the addition amount of a certain concentration of nitrate stored in the nitrate storage tank in accordance with the production rate of gas produced in the anaerobic ammonium oxidation tank, and thus is effective for controlling the amount of nitrate added concurrently with an increase or decrease in the treatment load such as an increase or decrease in the ammonium concentration in the ammonium containing liquid or an increase or decrease in the volume of the liquid flowing into the anaerobic ammonium oxidation tank.

Specifically, in the anaerobic ammonium oxidation tank, ammonium is reacted with nitrite in the presence of anaerobic ammonium oxidizing bacteria to produce nitrogen gas. The production rate of the nitrogen gas is increased or decreased concurrently with an increase or decrease in the treatment load such as an increase or decrease in the ammonium concentration or an increase or decrease in the inflow volume. For example, when the nitrogen gas production rate is increased as the amount of nitrate added is increased, the amount of nitrate added may be insufficient. Thus, the amount of nitrate added is repeatedly increased until the gas production rate is not increased. When the gas production rate is not increased even if the amount of nitrate added is increased, the amount of nitrate added is excessive, and anaerobic ammonium oxidizing bacteria may have reduced activity. Thus, the amount of nitrate added is decreased until the gas production rate is decreased. The amount of nitrate added is repeatedly increased or decreased in this manner to find an amount of nitrate added which does neither increase nor decrease the gas production rate. With reference to such an amount as the necessary amount of nitrate, the amount of nitrate added is controlled. This allows the amount of nitrate added to be appropriately controlled, even if the ammonium nitrogen concentration in the ammonium containing liquid or the inflow volume of the liquid is not measured, and furthermore allows the amount of nitrate added to be controlled concurrently with an increase or decrease in the treatment load such as an increase or decrease in the ammonium concentration or an increase or decrease in the inflow volume.

According to a twenty-eighth aspect of the present invention, to attain the aforementioned object, there is provided equipment for treating an ammonium containing liquid by anaerobically biologically denitrifying ammonium in the ammonium containing liquid, the equipment comprising an aerobic ammonium oxidation tank in which heterotrophic denitrifying bacteria and anaerobic ammonium oxidizing bacteria are present, an inflow section of allowing the ammonium containing liquid to flow into the anaerobic ammonium oxidation tank, a discharge section of discharging the liquid treated in the anaerobic ammonium oxidation tank, a nitrate storage tank of storing a certain concentration of nitrate, a nitrate addition device of adding nitrate to the anaerobic ammonium oxidation tank from the nitrate storage tank, and a nitrate addition amount control device of controlling the amount of the nitrate added.

According to a twenty-ninth aspect of the present invention, there is provided the equipment for treating an ammonium containing liquid according to the twenty-eighth aspect, further comprising an organic substance storage tank of storing a certain concentration of an organic substance, an organic substance addition device of adding the organic substance to the anaerobic ammonium oxidation tank from the organic substance storage tank, and an organic substance addition amount control device of controlling the amount of the organic substance added.

In the twenty-eighth and twenty-ninth aspects, the aforementioned processes for treating an ammonium containing liquid according to the twenty-second and twenty-third aspects are embodied in equipment. The equipment can treat an ammonium containing liquid constantly stably and thus can provide a treated liquid with high quality constantly stably.

According to a thirtieth aspect of the present invention, there is provided the equipment for treating an ammonium containing liquid according to the twenty-eighth or twenty-ninth aspect, further comprising a concentration measurement device of measuring the ammonium nitrogen concentration in the ammonium containing liquid, wherein the nitrate addition amount control device controls the amount of the nitrate added, based on the measurement results from the concentration measurement device. Consequently, a certain concentration of nitrate is added to the anaerobic ammonium oxidation tank in an appropriately controlled necessary amount by the nitrate addition amount control device. For this reason, the process is effective when the ammonium concentration in an ammonium containing liquid varies, and can further reduce the running cost necessary for the treatment.

According to a thirty-first aspect of the present invention, there is provided the equipment for treating an ammonium containing liquid according to the twenty-ninth aspect, wherein the organic substance addition amount control device controls the amount of the organic substance added, based on the amount of the nitrate added from the nitrate addition amount control device, so that the $C/NO_3$—N ratio of the organic carbon concentration to the nitrate nitrogen concentration in the ammonium containing liquid is 0.5 to 2.5. Consequently, even when the ammonium concentration or organic substance concentration in an ammonium containing liquid varies, ammonium in the ammonium containing liquid can be effectively treated.

According to a thirty-second aspect of the present invention, there is provided the equipment for treating an ammonium containing liquid according to the twenty-eighth or twenty-ninth aspect, further comprising: an inflow volume measurement device of measuring the volume of the ammonium containing liquid flowing into the anaerobic ammonium oxidation tank, and a control device controls the amount of the nitrate added, based on the measurement results from the inflow volume measurement device. Consequently, the amount of nitrate added is controlled to be a necessary amount of nitrate, based on the volume of an ammonium containing liquid flowing into the anaerobic ammonium oxidation tank. This process is thus effective for an ammonium containing liquid having a constant ammonium concentration such as a development waste liquid.

According to a thirty-third aspect of the present invention, there is provided the equipment for treating an ammonium containing liquid according to the twenty-eighth or twenty-ninth aspect, further comprising a gas production rate measurement device of measuring an increase or decrease in the production rate (L/min) of nitrogen gas produced in the anaerobic ammonium oxidation tank when the amount of the nitrate added by the nitrate addition device is increased or decreased, wherein the nitrate addition amount control device controls the amount of the nitrate added, based on the measurement results from the gas production rate measurement device.

The process of the present invention controls the amount of nitrate added by the nitrate addition amount control device to a necessary amount of nitrate, based on the production rate of a nitrogen gas produced in the anaerobic ammonium oxidation tank and measured by the gas production measurement device, and thus is effective for controlling the amount of nitrate added concurrently with an increase or decrease in the treatment load such as an increase or decrease in the ammonium concentration in the ammonium containing liquid or an increase or decrease in the volume of the liquid flowing into the anaerobic ammonium oxidation tank.

According to a thirty-fourth aspect of the present invention, there is provided the equipment for treating an ammonium containing liquid according to any one of the twenty-eighth to thirty-third aspects, wherein the anaerobic ammonium oxidation tank has a removable cartridge structure and comprises a plurality of connection sections for the inflow section, the discharge section, and the addition device, and a plurality of the anaerobic ammonium oxidation tanks are attached to the inflow section, the discharge section, and the addition device.

According to the present invention, in the equipment for treating an ammonium containing liquid, the anaerobic ammonium oxidation tanks have a removable cartridge structure, comprise a plurality of the connection sections, respectively, and thus can be removably attached to the inflow section, the discharge section, and the addition device. For this reason, an ammonium containing liquid can be treated in the multiple anaerobic ammonium oxidation tanks by rotation, or one of the anaerobic ammonium oxidation tanks can be used as an anaerobic ammonium oxidation tank reserved for emergency. Since the anaerobic ammonium oxidation tanks have a removable cartridge structure in this manner, when heterotrophic denitrifying bacteria or anaerobic ammonium oxidizing bacteria have reduced activity or are killed in one of the anaerobic ammonium oxidation tanks, the anaerobic ammonium oxidation tank can be easily exchanged with another anaerobic ammonium oxidation tank, or a reserved anaerobic ammonium oxidation tank can be used instead.

According to a thirty-fifth aspect of the present invention, to attain the aforementioned object, there is provided equipment for treating an ammonium containing liquid by biologically denitrifying ammonium in the ammonium containing liquid, the equipment comprising a nitrification tank of nitrifying ammonium in the ammonium containing liquid into nitrate by nitrifying bacteria, and an anaerobic ammonium oxidation tank of carrying out nitrate reduction treatment of reducing nitrate obtained in the nitrification tank to nitrite by heterotrophic denitrifying bacteria using an organic substance in the ammonium containing liquid as a hydrogen donor, and of simultaneously denitrifying nitrite produced by the nitrate reduction treatment and ammonium in the ammonium containing liquid by anaerobic ammonium oxidizing bacteria.

The equipment for treating an ammonium containing liquid of the present invention carries out nitrification treatment of oxidizing ammonium in the ammonium containing liquid to nitrate in the nitrification tank. The equipment reduces nitrate produced in the nitrification tank to nitrite by heterotrophic denitrifying bacteria using an organic substance in the ammonium containing liquid as a hydrogen donor, and carries out anaerobic ammonium oxidation treatment of denitrifying the produced nitrite and ammonium in the ammonium containing liquid in the anaerobic ammonium oxidation tank. This is because it is difficult for nitrifying bacteria carrying out nitrification reaction to terminate the reaction when ammonium is converted to nitrite, due to the presence of ammonium oxidizing bacteria of oxidizing ammonium to nitrite and nitrite oxidizing bacteria of oxidizing nitrite to nitrate. According to the present invention, a conventional nitrite-type nitrification reaction is not carried out, but a nitrate-type nitrification treatment of oxidizing ammonium to nitrate is carried out in the nitrification tank does not, and the resulting nitrate is reduced to nitrite by heterotrophic denitrifying bacteria using an organic substance in an ammonium containing liquid as a hydrogen donor in the anaerobic ammonium oxidation tank. Consequently, the concentration of nitrite reacted with ammonium is not changed over time. Thus, when nitrite obtained in this manner and ammonium in the ammonium containing liquid are simultaneously denitrified by anaerobic ammonium oxidizing bacteria, nitrite and ammonium can be denitrified at a preferable ratio between them. Accordingly, the ammonium containing liquid can be treated in a stable manner. The nitrification treatment may be carried out before or after the anaerobic ammonium oxidation treatment. The anaerobic ammonium oxidation treatment can be carried out by bypassing or circulating wastewater or a nitrified liquid.

According to a thirty-sixth aspect of the present invention, to attain the aforementioned object, there is provided equipment for treating an ammonium containing liquid by biologically denitrifying ammonium in the ammonium containing liquid, the equipment comprising a nitrification tank of primarily separating the ammonium containing liquid into two separated ammonium containing liquids, and nitrifying ammonium in one of the separated ammonium containing liquids to nitrate by nitrifying bacteria; a denitrification tank of further secondarily separating the nitrified liquid obtained in the nitrification tank into two separated nitrified liquids, mixing one of the separated nitrified liquids with the other primarily separated ammonium containing liquid, and carrying out denitrification treatment of nitrate in the separated nitrified liquid by denitrifying bacteria using an organic substance in the separated ammonium containing liquid as a hydrogen donor; and an anaerobic ammonium oxidation tank of mixing the other secondarily separated nitrified liquid with the denitrified liquid from the denitrification tank and carrying out nitrate reduction treatment of reducing nitrate contained in the separated nitrified liquid to nitrite by heterotrophic denitrifying bacteria using an organic substance in the denitrified liquid as a hydrogen donor, and of simultaneously denitrifying nitrite produced by the nitrate reduction treatment and ammonium in the denitrified liquid by anaerobic ammonium oxidizing bacteria.

In the equipment according to the thirty-sixth aspect of the present invention, unlike the equipment according to the thirty-fifth aspect, the anaerobic ammonium oxidation tank does not carry out reduction treatment of reducing nitrate produced in the nitrification tank to nitrite together with denitrification treatment of nitrite and ammonium. Instead, the aforementioned reduction treatment is carried out in the denitrification tank, and the denitrified liquid is allowed to flow into the anaerobic ammonium oxidation tank. The equipment is suitable when a large amount of an organic substance is contained in an ammonium containing liquid. If the ammonium containing liquid contains a high concentration of an organic substance concentration, the organic substance inhibits ammonium oxidation reaction in anaerobic ammonium oxidation treatment. On the contrary, when the organic substance concentration is low, reduction reaction from nitrate does not proceed in anaerobic ammonium oxidation treatment. Thus, by allowing the liquid subjected to denitrification treatment in the denitrification tank and ammonium in the ammonium containing liquid to flow to the anaerobic ammonium oxidation tank, anaerobic ammonium oxidation treatment can be carried out using a certain concentration of an organic substance.

Specifically, in the line between the nitrification tank and the denitrification tank, common nitrification and denitrification treatment is carried out, and nitrate is converted into nitrogen gas using an organic substance in an ammonium containing liquid as a hydrogen donor. Thus, not only the organic substance in the ammonium containing liquid but also the reaction burden on the anaerobic ammonium oxidation tank can be reduced. Consequently, the organic component can be made stable in anaerobic ammonium oxidation treatment, and nitrite and ammonium in the ammonium containing liquid can be simultaneously denitrified by anaerobic ammonium oxidizing bacteria in a stable manner.

According to a thirty-seventh aspect of the present invention, there is provided the equipment for treating an ammonium containing liquid according to the thirty-fifth or thirty-sixth aspect, wherein the heterotrophic denitrifying bacteria are controlled to have cells 10 to 1,000 times of cells that the anaerobic ammonium oxidizing bacteria have.

According to the present invention, since nitrate reduction treatment and anaerobic ammonium oxidation treatment are carried out by controlling the ratio in number of cells of heterotrophic denitrifying bacteria to anaerobic ammonium oxidizing bacteria to make these bacteria live symbiotically and coexist in a preferable state, the nitrogen removal ratio can be improved.

According to a thirty-eighth aspect of the present invention, there is provided the equipment for treating an ammonium containing liquid according to any one of the thirty-fifth to thirty-seventh aspects of the present invention, wherein the organic substance is added to the anaerobic ammonium oxidation tank.

If the organic substance concentration in an ammonium containing liquid to be treated is small, the reaction of reducing nitrate to nitrite by heterotrophic denitrifying bacteria is carried out with reduced reactivity. Because of this, according to the present invention, a certain concentration of the organic substance is added in a necessary amount. Consequently, nitrate can be constantly stably reduced to nitrite by heterotrophic denitrifying bacteria in the anaerobic ammonium oxidation tank, and thus nitrite and ammonium can be simultaneously denitrified by anaerobic ammonium oxidizing bacteria in a more stable manner in anaerobic ammonium oxidation treatment.

According to a thirty-ninth aspect of the present invention, there is provided the equipment for treating an ammonium containing liquid according to any one of the thirty-fifth to thirty-eighth aspects, wherein the $C/NO_3$—N ratio of the concentration C of the organic carbon contained in and/or added to the ammonium containing liquid to the concentration $NO_3$—N of nitrate nitrogen contained in and/or added to the ammonium containing liquid is controlled to be 0.5 to 2.5 in the anaerobic ammonium oxidation tank.

In the ammonium oxidation tank, efficiency in the aforementioned nitrate reduction treatment and anaerobic ammonium oxidation treatment is influenced by the ratio of the organic carbon concentration to the nitrate nitrogen concentration in an ammonium containing liquid. Specifically, when the $C/NO_3$—N ratio of the organic carbon concentration C to the nitrate nitrogen concentration $NO_3$—N in the inflow ammonium containing liquid is controlled to be 0.5 to 2.5, nitrite can be accumulated easily in nitrate reduction treatment by heterotrophic denitrifying bacteria, and the produced nitrite and ammonium can be easily denitrified by anaerobic ammonium oxidizing bacteria.

According to the present invention, the $C/NO_3$—N ratio is constantly stable in the anaerobic ammonium oxidation tank, a competition for nitrite in an ammonium containing liquid can be controlled in a stable manner between heterotrophic denitrifying bacteria and anaerobic ammonium oxidizing bacteria. Accordingly, since nitrate reduction reaction by heterotrophic denitrifying bacteria and simultaneous denitrification of nitrite and ammonium by anaerobic ammonium oxidizing bacteria can be carried out in a stable manner, constantly stable high-speed denitrification can be continuously carried out.

According to a fortieth aspect of the present invention, there is provided the equipment for treating an ammonium containing liquid according to any one of the thirty-sixth to thirty-ninth aspects of the present invention, wherein the denitrification tank is provided as multiple tanks.

According to the present invention, by providing the denitrification tank as multiple tanks and allowing a liquid to flow therein stepwise, anaerobic ammonium oxidation bacteria can be prevented from being inhibited by an organic substance.

According to a forty-first aspect of the present invention, there is provided the equipment for treating an ammonium containing liquid according to any one of the thirty-fifth to fortieth aspects of the present invention, wherein the nitrification tank is provided as multiple tanks.

According to the present invention, since the nitrification tank is provided as multiple tanks, ammonium can be efficiently nitrified, and a nitrified liquid can be supplied to the anaerobic ammonium oxidation tank. In particular, the equipment is effective for high-concentration ammonium wastewater since nitrification of the wastewater proceeds only with difficulty.

According to a forty-second aspect of the present invention, there is provided the equipment for treating an ammonium containing liquid according to any one of the thirty-fifth to forty-first aspects of the present invention, wherein the anaerobic ammonium oxidation tank is provided as multiple tanks.

According to the present invention, by providing the anaerobic ammonium oxidation tank as multiple tanks and allowing a liquid to flow therein stepwise, anaerobic ammonium oxidation bacteria can be prevented from being inhibited by an organic substance.

As described above, the process and equipment of the present invention can stably carry out anaerobic ammonium oxidation treatment that allows high-speed denitrification without being affected by the change in the concentrations of nitrogen components in an ammonium containing liquid to be treated or the change in the nitrogen form between nitrate and nitrite.

The process and equipment of the present invention can treat an ammonium containing liquid constantly stably and thus can provide a treated liquid with constantly stable and high quality. Further, the process and equipment of the present invention employ nitrate inexpensive than nitrite, and thus can reduce the cost necessary for the treatment.

BRIEF DESCRIPTION OF THE DRAWINGS

FIG. 5 is a plan view showing a schematic configuration of equipment for treating an ammonium containing liquid according to a fifth embodiment of the present invention;

FIG. 6 is a plan view showing a schematic configuration of equipment for treating an ammonium containing liquid according to a sixth embodiment of the present invention;

FIG. 7 is a plan view showing a schematic configuration of equipment for treating an ammonium containing liquid according to a seventh embodiment of the present invention;

DETAILED DESCRIPTION OF THE PREFERRED EMBODIMENTS

Figure 1:
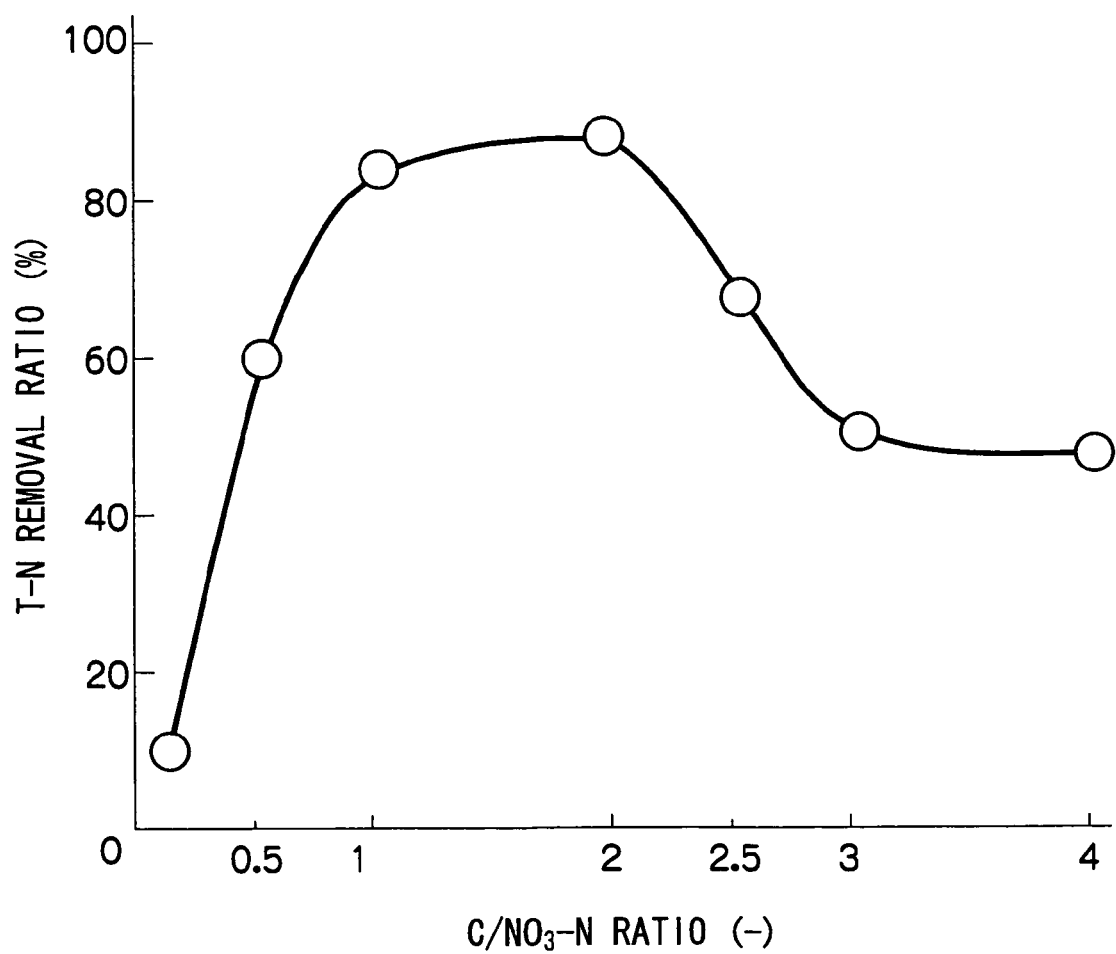
FIG. 1 is a graph showing the relation between the $C/NO_3$—N ratio and the nitrogen removal ratio in a first test of demonstrating the present invention.

A first feature of the present invention is that nitrate contained in or added to an ammonium containing liquid to be treated is reduced to nitrite by heterotrophic denitrifying bacteria, and the nitrite and ammonium are denitrified by anaerobic ammonium oxidizing bacteria.

A second feature of the present invention is described as follows. The present inventors have found that, in a conventional anaerobic ammonium oxidation reaction, (i) too high a concentration of nitrite supplied involves a risk in treatment due to toxicity of nitrite, and (ii) an organic substance highly inhibits anaerobic ammonium oxidizing bacteria. In order to solve these problems, the inventors have found that complete nitrification reaction is carried out in a nitrification tank, the resulting nitrate solution is supplied to an anaerobic ammonium oxidation tank, and denitrification stably proceeds in a system in which anaerobic ammonium oxidizing bacteria and heterotrophic denitrifying bacteria coexist.

The supplied nitrate is reduced to nitrite by heterotrophic denitrifying bacteria, using an organic substance (also called "organic carbon") as a hydrogen donor, and the produced nitrite is immediately denitrified together with ammonium by anaerobic ammonium oxidizing bacteria. Consequently, nitrite is not accumulated, and toxic inhibition by nitrite is prevented. The organic substance in wastewater is used for nitrate reduction reaction, and anaerobic ammonium oxidizing bacteria are prevented from being inhibited by the organic substance. Water flowing into the anaerobic ammonium oxidation vessel is preferably controlled so that the nitrate nitrogen concentration is once to twice the ammonium nitrogen concentration. Nitrate is reduced to nitrite by heterotrophic denitrifying bacteria. Anaerobic ammonium oxidizing bacteria compete with heterotrophic denitrifying bacteria for the nitrite. The present inventors have discovered the best process for treating an ammonium containing liquid characterized by the following two features in order to give priority to reaction by anaerobic ammonium oxidizing bacteria in this case.

(1) In the present invention, when the $C/NO_3$—N ratio of the concentration C of the organic carbon contained in or added to an inflow ammonium containing liquid to the concentration $NO_3$—N of nitrate nitrogen contained in or added to the inflow ammonium containing liquid is controlled to be 0.5 to 2.5, reduction treatment by heterotrophic denitrifying bacteria is insufficient, and thus nitrite can be easily accumulated without being reduced to nitrogen gas, and the produced nitrite and ammonium can be easily denitrified by anaerobic ammonium oxidizing bacteria.

(2) The aforementioned heterotrophic denitrifying bacteria and anaerobic ammonium oxidizing bacteria are preferably entrapped or attached to be immobilized for use. When these bacteria are immobilized so that the heterotrophic denitrifying bacteria have cells 10 to 1,000 times of cells that the anaerobic ammonium oxidizing bacteria have, these bacteria live symbiotically or coexist in a preferable state, and nitrate reduction treatment and anaerobic ammonium oxidation treatment are activated, and thus the rate of removing nitrogen from an ammonium containing liquid can be improved.

First, the present inventors have carried out a first test for demonstrating the feature (1). In the first test, synthetic wastewater as an ammonium containing liquid was continuously treated with pellets in which $2 \times 10^6$ cells/mL of heterotrophic denitrifying bacteria and $2 \times 10^5$ cells/mL of anaerobic ammonium oxidizing bacteria were immobilized. One month later, the treatment was made stable, and the $C/NO_3$—N ratio and the denitrification rate were measured.

In the first test, pellets obtained by forming a polyethylene glycol diacrylate material with a microorganism entrapped to be immobilized into 3 mm-square cubes were used for entrapping immobilization. A 1 L reaction tank was packed with the pellets thus obtained at a packing ratio of 20%. The synthetic wastewater was continuously supplied to the reaction tank and treated.

The above-described synthetic wastewater used was synthetic wastewater controlled to have a ratio of the ammonium nitrogen concentration to the nitrate concentration of 1:1 and a total nitrogen concentration T-N of 80 mg/L, and controlled to have a $C/NO_3$—N ratio of 1 by addition of sodium acetate as an organic source (C).

The reaction tank started operation at a treatment load of 1.2 kg-N/m³/day. One month later, the wastewater was treated to achieve a T-N removal ratio of 82%, and the treatment was made stable. Then, the tank was operated while changing the $C/NO_3$—N ratio to 0.2 to 4, and the relation between the $C/NO_3$—N ratio and the T-N removal ratio was examined. The results are shown in FIG. 1. FIG. 1 is a graph showing the relation between the $C/NO_3$—N ratio and the T-N removal ratio in the first test.

The graph of FIG. 1 shows that a high T-N removal ratio of 50% or more is obtained when the $C/NO_3$—N ratio is 0.5 to 2.5, in particular 1 to 2. On the other hand, when the $C/NO_3$—N ratio is more than 2.5, the T-N removal ratio is rapidly reduced. This is presumably because denitrification is carried out primarily by heterotrophic denitrifying bacteria, and reaction using an organic substance as an electron donor proceeds, and thus anaerobic ammonium oxidation reaction by anaerobic ammonium oxidizing bacteria is inhibited. Accordingly, in the present invention, efficient denitrification treatment can be carried out in a stable manner by carrying out nitrate reduction treatment and anaerobic ammonium oxidation treatment with a $C/NO_3$—N ratio controlled to 0.5 to 2.5, and preferably 1 to 2. As an organic substance used for controlling the $C/NO_3$—N ratio, methanol, molasses, or acetic acid is preferable.

Next, the present inventors have carried out a second test for demonstrating the aforementioned feature (2). In the second test, synthetic wastewater as an ammonium containing liquid was continuously treated with pellets in which cells of heterotrophic denitrifying bacteria and cells of anaerobic ammonium oxidizing bacteria were immobilized. One month later, the treatment was made stable, and the $C/NO_3$—N ratio and the denitrification rate were measured.

In the second test, pellets obtained by forming a polyethylene glycol diacrylate material with a microorganism entrapped to be immobilized into 3 mm-square cubes were used for entrapping immobilization as in the first test. A 1 L reaction tank was packed with the pellets thus obtained at a packing ratio of 20%. The synthetic wastewater was continuously supplied to the reaction tank and treated.

The above-described synthetic wastewater used was synthetic wastewater controlled to have a ratio of the ammonium nitrogen concentration to the nitrate concentration of 1:1 and a total nitrogen concentration T-N of 80 mg/L, and controlled to have a $C/NO_3$—N ratio of 1 by addition of sodium acetate as an organic carbon (C).

Figure 2:
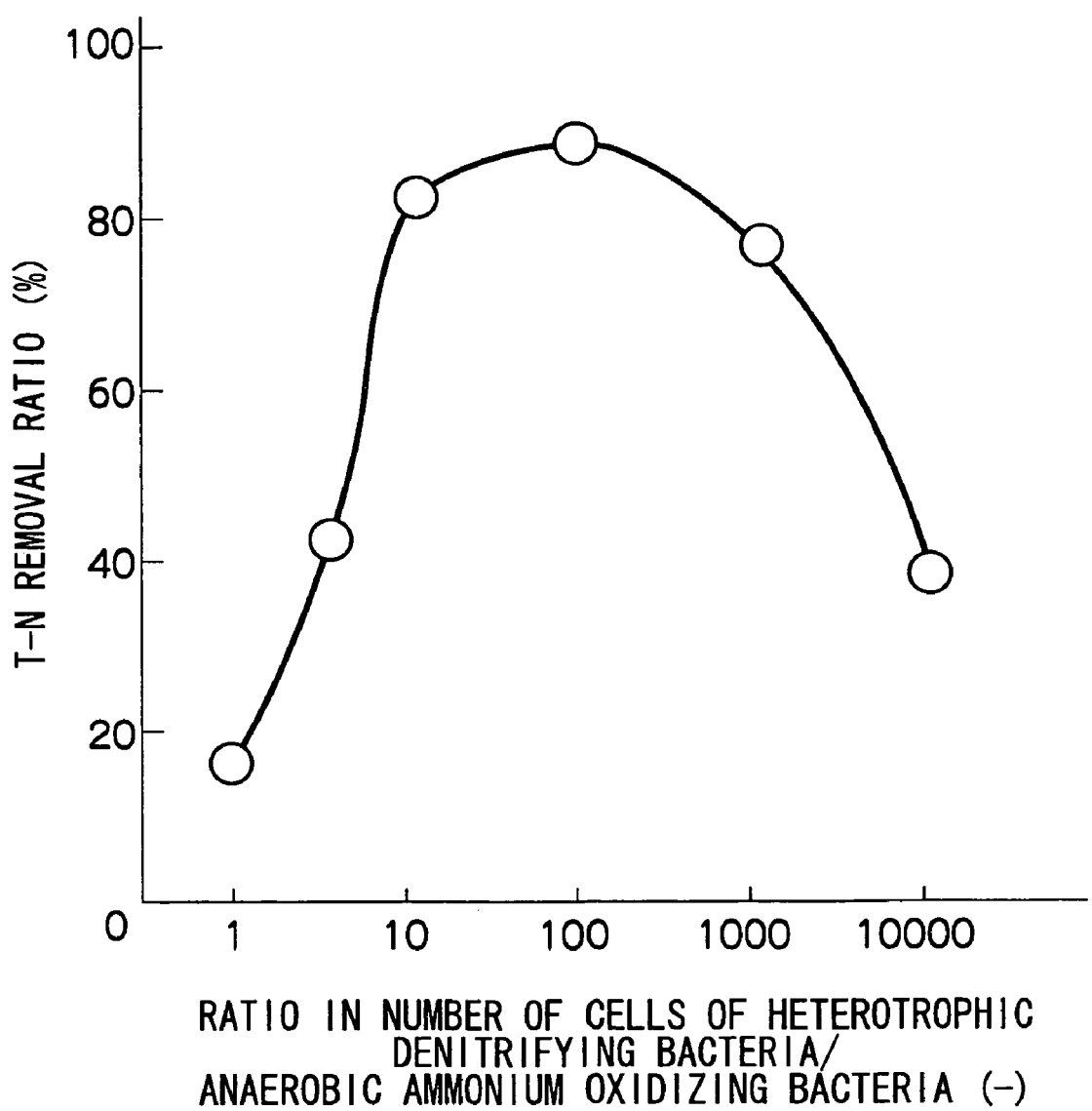
FIG. 2 is a graph showing the correlation between the nitrogen removal ratio and the ratio of the number of cells of heterotrophic denitrifying bacteria to the number of cells of anaerobic ammonium oxidizing bacteria in a second test of demonstrating the present invention.

The reaction tank started operation at a treatment load of 1.2 kg-N/m³/day. One month later, the treatment was made stable, and the quality of the treated water (specifically, nitrogen removal ratio) was evaluated. The results are shown in FIG. 2. FIG. 2 is a graph showing the correlation between the nitrogen removal ratio and the ratio of the number of cells of heterotrophic denitrifying bacteria to the number of cells of anaerobic ammonium oxidizing bacteria in the second test.

The graph of FIG. 2 shows that a high T-N removal ratio of 50% or more is obtained when using pellets in which heterotrophic denitrifying bacteria having cells 10 to 1,000 times of cells that anaerobic ammonium oxidizing bacteria have are immobilized. On the other hand, if the number of cells of heterotrophic denitrifying bacteria is too small, the T-N removal ratio is low. Or if the number of cells is too large, the T-N removal ratio tends to be reduced. This is because heterotrophic denitrifying bacteria and anaerobic ammonium oxidizing bacteria live symbiotically or coexist at an appropriate ratio between them, and thus a competition for the produced nitrite between treatments by the two kinds of bacteria is controlled in a well-balanced manner, and nitrogen removal is further activated. The same inclination was observed in attachment immobilization at the above-described ratio in number of cells between these bacteria. Description for such immobilization is omitted.

Preferred embodiments of the process and equipment for treating an ammonium containing liquid of the present invention will be described in detail below with reference to the accompanying drawings.

[1] First, embodiments in which nitrite produced by nitrate reduction treatment is supplied to an anaerobic ammonium oxidation tank will be described with reference to FIGS. 3A to 3D.

Figure 3A:
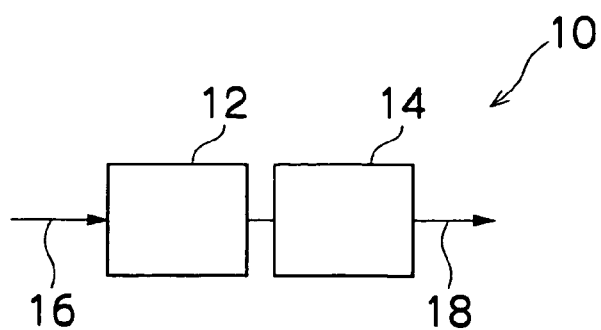
FIG. 3A is a side view showing a schematic configuration of equipment for treating an ammonium containing liquid according to a first embodiment of the present invention.

FIG. 3A is a side view showing a schematic configuration of equipment 10 for treating an ammonium containing liquid according to a first embodiment for implementing the present invention, and shows one example of equipment composed of a nitrate reduction tank 12 and an anaerobic ammonium oxidation tank 14.

As shown in FIG. 3A, in the equipment 10 for treating an ammonium containing liquid, an ammonium containing liquid containing ammonium and nitrate (hereinafter called "wastewater") flows into the nitrate reduction tank 12 through an inflow pipe 16. Here, the wastewater is preferably controlled to have a C/NO$_3$—N ratio of 0.5 to 2.5. For example, the equipment may comprise a C/NO$_3$—N ratio control device (not shown) for measuring C/NO$_3$—N in the wastewater, and adding an organic substance such as methanol or molasses or nitrate nitrogen such as a nitrate metal salt to the wastewater inside or outside the tank in accordance with the measurement results.

In the nitrate reduction tank 12, heterotrophic denitrifying bacteria are present, and nitrate in the inflow wastewater is reduced to nitrite using an organic substance in the wastewater as a hydrogen donor. The wastewater subjected to nitrate reduction treatment in the nitrate reduction tank 12 in this manner flows into the anaerobic ammonium oxidation tank 14, and nitrite and ammonium contained in the wastewater are simultaneously denitrified by anaerobic ammonium oxidizing bacteria in the tank. The wastewater treated in this manner is discharged from a discharge pipe 18.

Heterotrophic denitrifying bacteria in the nitrate reduction tank 12 and anaerobic ammonium oxidizing bacteria in the anaerobic ammonium oxidation tank 14 are preferably attachment immobilized or entrapping immobilized.

Anaerobic ammonium oxidizing bacteria can be acclimatized using, as seed sludge, activated sludge or anaerobic digested sludge containing anaerobic ammonium oxidizing bacteria, as described in Lectures in Japan Society on Water Environment 7th Symposium, 2004, p. 125. Anaerobic ammonium oxidizing bacteria in the present specification refers to any bacteria containing ammonium and nitrite as substrates for anaerobically biologically denitrifying ammonium in an ammonium containing liquid.

An anaerobic ammonium oxidation tank in the present invention refers to an anaerobic ammonium oxidation tank for anaerobically biologically denitrifying ammonium in an ammonium containing liquid, which can be applied to any biological denitrification treatment using bacteria containing ammonium and nitrite as substrates.

Although anaerobic ammonium oxidizing bacteria or the like may be maintained as floating bacteria in the anaerobic ammonium oxidation tank 14, the bacteria are preferably maintained in the tank as a biofilm in which anaerobic ammonium oxidizing bacteria or the like are attached to a packing material, or as immobilization pellets in which anaerobic ammonium oxidizing bacteria or the like are immobilized in or to an immobilizing material.

The anaerobic ammonium oxidation tank 14 is packed with heterotrophic denitrifying bacteria and anaerobic ammonium oxidizing bacteria maintained as a biofilm preferably in an amount of 30 to 70 vol % when the tank is a fixed bed tank, or in an amount of 5 to 40 vol % when the tank is a suspended particle tank or an expansion bed tank. The packing material used for the biofilm may be a material such as a nonwoven cloth, plastic material, or sponge material, and may have various shapes such as a plate-like shape, granular shape, and cylindrical shape.

Each bacteria can be immobilized by 1) attachment immobilization or 2) entrapping immobilization.

In the attachment immobilization 1), the ammonium removal ratio can be improved by using pellets such as globular or cylindrical pellets or materials with many irregularities such as a material in the shape of strings, gels, or nonwoven clothes, because each bacteria are easily attached to such pellets or materials.

The entrapping immobilization 2) is generally carried out by mixing a monomer or prepolymer as an immobilization material with bacteria to be immobilized, and polymerizing the mixture to entrap and immobilize the bacteria. As the monomer material, acrylamide, methylenebisacrylamide, triacrylformal, or the like is preferable. As the prepolymer material, polyethylene glycol diacrylate or polyethylene glycol methacrylate is preferable, and a derivative thereof may also be used. Entrapping immobilization pellets with many irregularities such as globular or cylindrical entrapping pellets, string-shaped entrapping pellets, or nonwoven cloth entrapping pellets bring an ammonium containing liquid such as wastewater into contact with each bacteria efficiently, and thus the ammonium removal ratio can be improved.

For example, Table 1 shows a typical composition example of entrapping immobilization pellets in which heterotrophic denitrifying bacteria and anaerobic ammonium oxidizing bacteria are entrapped to be immobilized.

TABLE 1

| Composition component | Composition ratio (weight %) |
| --- | --- |
| Anaerobic ammonium oxidizing bacteria concentrate ($10^7$ cells/mL) | 15 |
| Heterotrophic nitrifying bacteria ($10^8$ cells/mL) | 15 |
| Polyethylene glycol diacrylate | 10 |
| N,N,N',N'-tetramethylethylenediamine | 0.5 |
| Potassium persulfate | 0.25 |
| Water | 59.25 |

A suspension having a composition of Table 1 starts to be polymerized by addition of 0.25 part of potassium persulfate, and is gelled. The gel is cut into entrapping immobilization pellets with any size each. Entrapping immobilization pellets in the shape of rectangles or globes preferably have a size of 1 to 10 mm each.

Figure 4A:
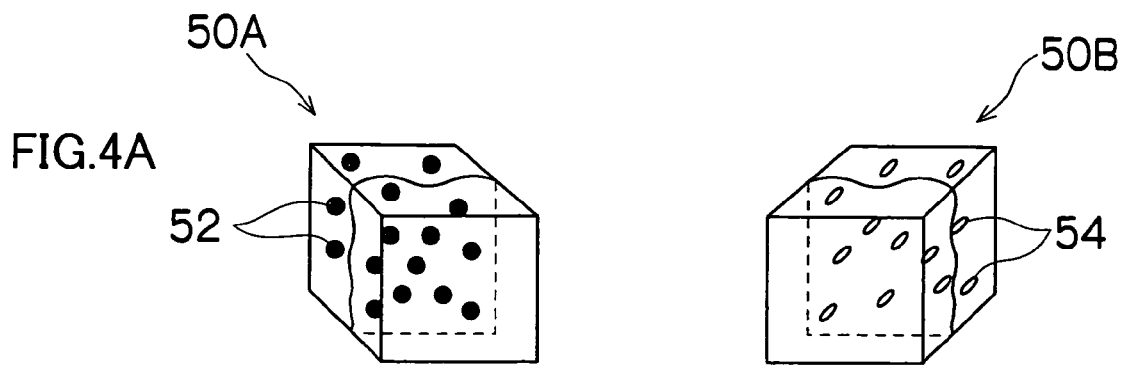
FIG. 4A is an oblique perspective view showing an outline of one example of entrapping immobilization pellets applied to the present invention.
Figure 4B:
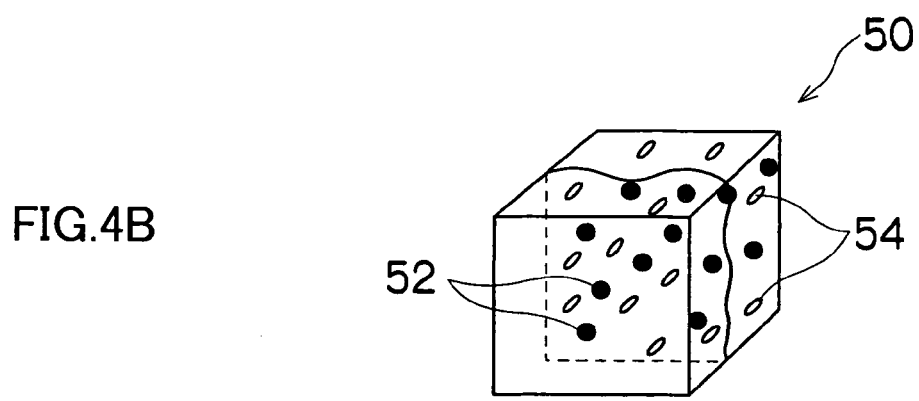
FIG. 4B is an oblique perspective view showing an outline of another example of entrapping immobilization pellets applied to the present invention.
Figure 4C:
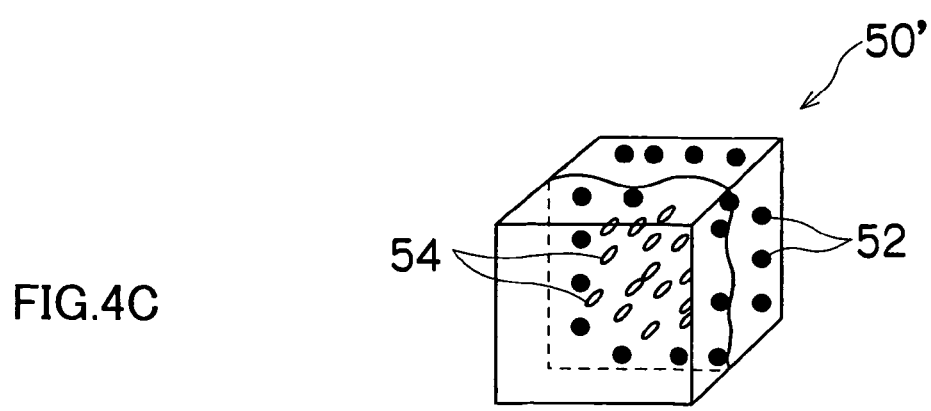
FIG. 4C is an oblique perspective view showing an outline of still another example of entrapping immobilization pellets applied to the present invention.

FIGS. 4A to 4C are oblique perspective views showing an outline of each example of entrapping immobilization pellets applied to the present invention, in which some of the pellets are transparent.

In the present invention, as shown in FIG. 4A, pellets 50A in which heterotrophic denitrifying bacteria 52,52 . . . are entrapped to be immobilized and pellets 50B in which anaerobic ammonium oxidizing bacteria 54,54 . . . are entrapped to be immobilized can be separately prepared and used. As shown in FIG. 4B, pellets 50 in which a mixture of heterotrophic denitrifying bacteria 52,52 . . . with anaerobic ammonium oxidizing bacteria 54,54 . . . are entrapped to be immobilized can also be used. Further, as shown in FIG. 4C, pellets 50' in which anaerobic ammonium oxidizing bacteria 54,54 . . . are entrapped to be immobilized in the center and heterotrophic denitrifying bacteria 52,52 . . . are entrapped to be immobilized around the anaerobic ammonium oxidizing bacteria and near the surface can also be used. When these pellets are used for the treatment equipment of the present invention, it is preferable to control the amount of each pellets in each tank by a cell number ratio control device (not shown), so that the above-described ratio between the two kinds of bacteria is achieved, specifically, heterotrophic denitrifying bacteria have cells 10 to 1,000 times of cells that anaerobic ammonium oxidizing bacteria have.

The equipment 10 for treating an ammonium containing liquid according to the first embodiment shown in FIG. 3A preferably employs the pellets 50A and 50B shown in FIG. 4A.

Figure 3B:
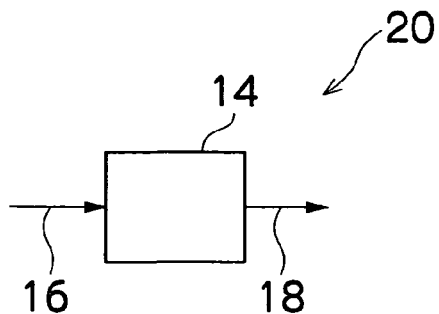
FIG. 3B is a side view showing a schematic configuration of equipment for treating an ammonium containing liquid according to a second embodiment of the present invention.

FIG. 3B is a side view showing a schematic configuration of equipment 20 for treating an ammonium containing liquid according to a second embodiment for implementing the present invention, and shows one example of equipment composed of an anaerobic ammonium oxidation tank. The same apparatus or member as in the equipment 10 for treating an ammonium containing liquid according to the first embodiment shown in FIG. 3A will be described with the same reference numeral, and repetition of the same description will be omitted. This also applies to third and fourth embodiments.

As shown in FIG. 3B, in the equipment 20 for treating an ammonium containing liquid, wastewater containing ammonium and nitrate flows into the anaerobic ammonium oxidation tank 14 through an inflow pipe 16. Here, the wastewater is preferably controlled to have a C/NO$_3$—N ratio of 0.5 to 2.5, as in the aforementioned first embodiment. For example, the equipment may comprise a C/NO$_3$—N ratio control device (not shown) for measuring C/NO$_3$—N in the wastewater, and adding an organic substance such as methanol or molasses or nitrate nitrogen such as a nitrate metal salt to the wastewater inside or outside the tank in accordance with the measurement results.

In the anaerobic ammonium oxidation tank 14, the aforementioned heterotrophic denitrifying bacteria and anaerobic ammonium oxidizing bacteria are present. These bacteria are preferably attachment immobilized or entrapping immobilized, and the entrapping immobilized pellets shown in FIGS. 4A to 4C can be suitably used at a predetermined ratio between them. In the anaerobic ammonium oxidation tank 14, nitrate in the inflow wastewater is reduced to nitrite by the heterotrophic denitrifying bacteria using an organic substance as a hydrogen donor, and nitrite and ammonium in the inflow wastewater are simultaneously denitrified by the anaerobic ammonium oxidizing bacteria. The wastewater treated in this manner is discharged to outside the system from a discharge pipe 18.

Figure 3C:
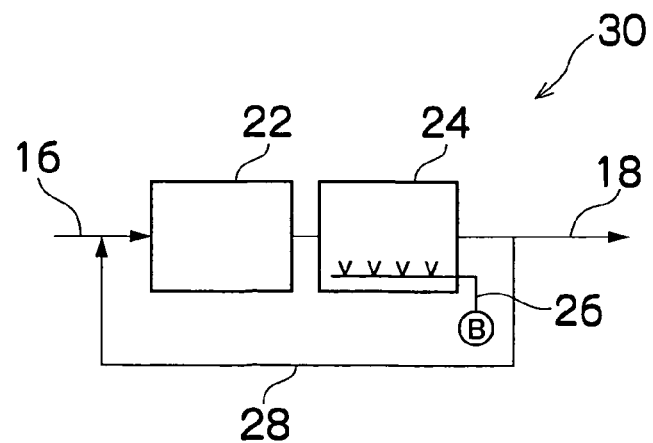
FIG. 3C is a side view showing a schematic configuration of equipment for treating an ammonium containing liquid according to a third embodiment of the present invention.

FIG. 3C is a side view showing a schematic configuration of equipment 30 for treating an ammonium containing liquid according to a third embodiment of the present invention, and shows one example of equipment comprising an anaerobic tank 22 and an aerobic tank 24.

As shown in FIG. 3C, in the equipment 30 for treating an ammonium containing liquid, wastewater containing ammonium flows into the anaerobic tank 22 through an inflow pipe 16. Here, the wastewater is preferably controlled to have a C/NO$_3$—N ratio of 0.5 to 2.5, as in the aforementioned first and second embodiments. For example, the equipment may comprise a C/NO$_3$—N ratio control device (not shown) for measuring C/NO$_3$—N in the wastewater, and adding an organic substance such as methanol or molasses or nitrate nitrogen such as a nitrate metal salt to the wastewater inside or outside the tank in accordance with the measurement results.

In the anaerobic tank 22, the aforementioned heterotrophic denitrifying bacteria and anaerobic ammonium oxidizing bacteria are present. It is preferable that each bacteria form entrapping immobilization pellets as shown in FIGS. 4A to 4C, and the tank be packed with the pellets. Accordingly, in the anaerobic tank 22, nitrate in the inflow wastewater is reduced to nitrite by the heterotrophic denitrifying bacteria using an organic substance as a hydrogen donor, and nitrite and ammonium in the inflow wastewater are simultaneously denitrified by the anaerobic ammonium oxidizing bacteria. The wastewater treated in the anaerobic tank 22 flows into the aerobic tank 24.

The aerobic tank 24 has nitrifying bacteria therein, and is aerated by an aeration unit 26 from below. The aerobic tank 24 is packed with the nitrifying bacteria in the state of attachment immobilization pellets, entrapping immobilization pellets, or floating activated sludge such as granules.

A part of the water treated in the aerobic tank 24 is fed back to the anaerobic tank 22 from a discharge pipe 18 through a circulation line 28, and nitrate remaining in the treated water is treated. Consequently, the wastewater can be efficiently treated by reuse of the treated water in the anaerobic tank that needs nitrate. The returning volume in the circulation line 28 is smaller than that in a conventional denitrification treatment, but a high denitrification rate can be achieved. The water treated in this manner is discharged to outside the system from the discharge pipe 18.

Figure 3D:
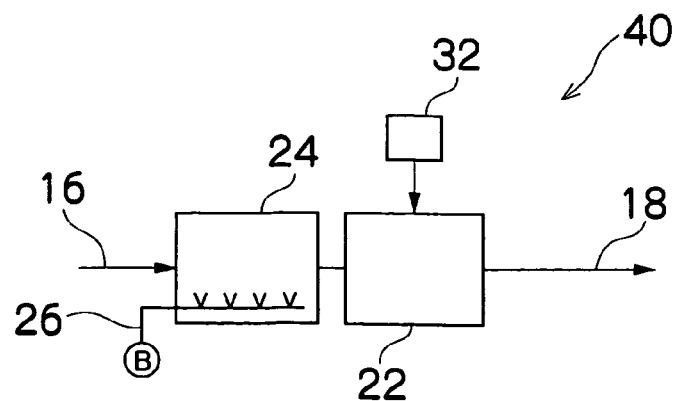
FIG. 3D is a side view showing a schematic configuration of equipment for treating an ammonium containing liquid according to a fourth embodiment of the present invention.

FIG. 3D is a side view showing a schematic configuration of equipment 40 for treating an ammonium containing liquid according to a fourth embodiment of the present invention, and shows one example of equipment comprising an aerobic tank 24 and an anaerobic tank 22 in this order from the upstream.

As shown in FIG. 3D, in the equipment 40 for treating an ammonium containing liquid, wastewater containing ammonium flows into the aerobic tank 24 through an inflow pipe 16. The aerobic tank 24 has nitrifying bacteria therein, and is aerated by an aeration unit 26 from below. The aerobic tank 24 is packed with the nitrifying bacteria in the state of attachment immobilization pellets, entrapping immobilization pellets, or floating activated sludge such as granules. In the aerobic tank 24, a part of ammonium in the inflow wastewater is oxidized to nitrate by the nitrifying bacteria. The wastewater containing ammonium and nitrate treated in this manner flows into the anaerobic tank 22.

In the anaerobic tank 22, the aforementioned heterotrophic denitrifying bacteria and anaerobic ammonium oxidizing bacteria are present. It is preferable that each bacteria form entrapping immobilization pellets as shown in FIGS. 4A to 4C, and the tank be packed with the pellets. An organic substance addition unit 32 is provided in the anaerobic tank 22, and the unit preferably adds an organic substance to the wastewater flowing into the tank so that the wastewater has a C/NO$_3$—N ratio of 0.5 to 2.5. For example, the equipment may comprise a C/NO$_3$—N ratio control device (not shown) for measuring C/NO$_3$—N in the wastewater, and adding an organic substance such as methanol or molasses or nitrate nitrogen such as a nitrate metal salt to the wastewater inside or outside the tank in accordance with the measurement results.

In the anaerobic tank 22 thus configured, nitrate in the inflow wastewater is reduced to nitrite by the heterotrophic denitrifying bacteria using an organic substance as a hydrogen donor, and nitrite and ammonium in the inflow wastewater are simultaneously denitrified by the anaerobic ammonium oxidizing bacteria. The wastewater treated in the anaerobic tank 22 in this manner is discharged to outside the system from a discharge pipe 18.

The aforementioned first to fourth embodiments are described taking biological treatment by heterotrophic denitrifying bacteria as an example of treatment of reducing nitrate to nitrite. The same effect can be achieved when using a catalyst that reduces nitrate to nitrite, for example, a Pd—Cu catalyst composed of an alloy of palladium and copper. In this case, the catalyst is preferably used in a nitrate reduction tank 12 in FIG. 3A, an anaerobic ammonium oxidation tank 14 in FIG. 3B, or an anaerobic tank 22 in FIGS. 3C and 3D. However, nitrate reduction treatment by a catalyst must be carried out under the same conditions as in nitrate reduction treatment carried by the aforementioned heterotrophic denitrifying bacteria. Nitrate may be added to raw water in advance, or may be added as in the case of the above sodium acetate.

[2] Next, embodiments of a process of supplying nitrate to an anaerobic ammonium oxidation tank from a tank for storing a certain concentration of nitrate will be described with reference to FIGS. 5 to 12.

The equipment for treating an ammonium containing liquid of the present invention shown in FIGS. 5 to 12 comprises a nitrate storage tank 112 and an anaerobic ammonium oxidation tank 114 as basic constituents, and constituents equipped with the basic constituents such as various measurement devices and control devices, as shown in the following various embodiments.

Accordingly, the nitrate storage tank 112 and the anaerobic ammonium oxidation tank 114 as basic constituents will be described first, and then various embodiments will be described.

The nitrate storage tank 112 has a structure that can store a solution of a nitrate metal salt in a solvent (typically water) with a certain concentration of nitrate added, or a powder of a nitrate metal salt controlled so that a certain concentration of nitrate is added. The nitrate storage tank 112 has a structure in which a necessary amount of nitrate appropriate for treating ammonium contained in an ammonium containing liquid is added to the anaerobic ammonium oxidation tank 114 by various measurements and controls. In this case, nitrate stored in the nitrate storage tank 112 is not limited to a naturally occurring substance such as the aforementioned nitrate metal salt, or a chemically synthesized substance, but may be nitrate produced when biologically nitrifying ammonium or nitrite. It is basically enough only if a certain concentration of nitrate is stored in and stably added to the anaerobic ammonium oxidation tank 114.

Heterotrophic denitrifying bacteria and anaerobic ammonium oxidizing bacteria are acclimatized in or introduced into the anaerobic ammonium oxidation tank 114, and the tank is maintained in an anaerobic atmosphere.

The anaerobic ammonium oxidation tank 114 is, as described above, a biological treatment tank for anaerobically biologically denitrifying ammonium in an ammonium containing liquid. The anaerobic ammonium oxidation tank 114 is preferably packed with entrapping immobilization pellets containing anaerobic ammonium oxidizing bacteria in an amount as described above, for example.

Here, the content, type, culturing method, and maintenance form of various bacteria such as heterotrophic denitrifying bacteria and anaerobic ammonium oxidizing bacteria, and the form of entrapping immobilization pellets may be the same as described above.

Entrapping immobilization pellets may be introduced into a reaction tank such as an anaerobic ammonium oxidation tank, as entrapping immobilization pellets in which heterotrophic denitrifying bacteria are mixed with anaerobic ammonium oxidizing bacteria at the aforementioned ratio shown in Table 1, or as pellets in which heterotrophic denitrifying bacteria are entrapped to be immobilized and pellets in which anaerobic ammonium oxidizing bacteria are entrapped to be immobilized, the two types of pellets separately prepared. Pellets in which anaerobic ammonium oxidizing bacteria are entrapped to be immobilized at the center, and heterotrophic denitrifying bacteria are entrapped to be immobilized around the anaerobic ammonium oxidizing bacteria and near the surface can also be used in the present invention.

FIG. 5 shows equipment 110 for treating an ammonium containing liquid according to a fifth embodiment, which is constituted by an anaerobic ammonium oxidation tank 114 in an anaerobic atmosphere in which heterotrophic denitrifying bacteria and anaerobic ammonium oxidizing bacteria are present, an inflow section of allowing an ammonium containing liquid to flow into the anaerobic ammonium oxidation tank 114, a discharge section of discharging the liquid treated in the anaerobic ammonium oxidation tank 114, a nitrate storage tank 112 of storing a certain concentration of nitrate, a nitrate addition device of adding nitrate to the anaerobic ammonium oxidation tank 114 from the nitrate storage tank 112, and a nitrate addition amount control device of controlling the amount of nitrate added.

An ammonium containing liquid flows into the anaerobic ammonium oxidation tank 114 from an inflow pipe 116 forming the inflow section by driving an inflow pump 117. The anaerobic ammonium oxidation tank 114 is packed with entrapping immobilization pellets 124 in which heterotrophic denitrifying bacteria and anaerobic ammonium oxidizing bacteria are entrapped to be immobilized, and the pellets are brought into contact with the ammonium containing liquid flowing into the tank. In this case, it is preferable to provide a stirrer, an anaerobic gas blower, or the like (omitted in FIG. 5), for example, in order to cause a flow of the entrapping immobilization pellets 124 in the anaerobic ammonium oxidation tank 114 to bring the pellets into contact with the ammonium containing liquid more efficiently.

In the anaerobic ammonium oxidation tank 114, it is preferable that heterotrophic denitrifying bacteria be controlled to have cells 10 to 1,000 times of cells that anaerobic ammonium oxidizing bacteria have. By controlling the cell number ratio to the above, heterotrophic denitrifying bacteria can be prevented from treatment of oxidizing nitrite to nitrate and from a competition for nitrite with anaerobic ammonium oxidizing bacteria.

From the nitrate storage tank 112 provided above the anaerobic ammonium oxidation tank 114, a nitrate addition pipe 120 as the nitrate addition device is extended to the upper end of the anaerobic ammonium oxidation tank 114, and a certain concentration of nitrate stored in the nitrate storage tank 112 is added to the anaerobic ammonium oxidation tank 114. Thus, in an anaerobic atmosphere, the added nitrate is reduced to nitrite by heterotrophic denitrifying bacteria, and ammonium in the ammonium containing liquid and nitrite are simultaneously denitrified by anaerobic ammonium oxidizing bacteria and removed as nitrogen gas. The liquid treated in the anaerobic ammonium oxidation tank 114 is discharged through a discharge pipe 118 forming the discharge section to outside the system. A screen 126 is provided on the side of the discharge section of the anaerobic ammonium oxidation tank 114, and prevents the entrapping immobilization pellets 124 from being discharged together with the treated liquid. By storing a certain concentration of nitrate in the nitrate storage tank 112, and adding nitrate to the anaerobic ammonium oxidation tank 114 from the nitrate storage tank 112 in an amount corresponding to the necessary amount of nitrate in this manner, an ammonium containing liquid can be treated constantly stably, and thus a treated liquid can be provided with high quality constantly stably.

The nitrate addition pipe 120 is provided with a nitrate valve 122 as a device for controlling the amount of nitrate added. A certain concentration of nitrate is added to anaerobic ammonium oxidation tank 114 from the nitrate storage tank 112 in an amount controlled by opening and closing the nitrate valve 122. Nitrate is added to the anaerobic ammonium oxidation tank 114 in an amount corresponding to the amount of nitrate necessary for treating ammonium in an ammonium containing liquid. The necessary amount of nitrate is preferably an amount of nitrate necessary for being reduced to nitrite by heterotrophic denitrifying bacteria so that the amount of nitrite nitrogen in nitrite is 1 to 1.5 times the amount of ammonium nitrogen in ammonium. Specifically, in the anaerobic ammonium oxidation tank 114, the ratio of the amount of nitrite nitrogen ($NO_2$—N) in nitrite to the amount of ammonium nitrogen ($NH_4$—N) in ammonium contained in an ammonium containing liquid to be treated has a close relation with the total nitrogen removal ratio for the ammonium containing liquid (T-N removal ratio). If the ratio between them is 1 to 1.5, the T-N removal ratio is highest. If less than 1 or more than 1.5, the T-N removal ratio tends to be drastically reduced.

FIG. 6 is a plan view showing a schematic configuration of equipment 130 for treating an ammonium containing liquid according to a sixth embodiment of the present invention. The same member or device as in treatment equipment 110 according to the fifth embodiment shown in FIG. 5 will be described with the same reference numeral, and the description will be omitted.

As shown in FIG. 6, in the treatment 130, an organic substance storage tank 132 is disposed in the anaerobic ammonium oxidation tank 114, in addition to a nitrate storage tank 112.

The organic substance storage tank 132 has a structure that can store a solution of an organic substance in a solvent (typically water) with a certain concentration of organic substance added, or a powder of an organic substance controlled so that a certain concentration of an organic substance is added. The organic substance used is preferably methanol, molasses, acetic acid, or the like, but is not specifically limited. The organic substance storage tank 132 has a structure in which an appropriate necessary amount of an organic substance is added to the anaerobic ammonium oxidation tank 114 by various measurements and controls. In this case, the organic substance stored in the organic substance storage tank 132 is not limited to the above-described naturally occurring substance or a chemically synthesized substance. It is basically enough only if a certain concentration of an organic substance is stored in the organic substance storage tank 132 and stably added to the anaerobic ammonium oxidation tank 114.

Accordingly, in the treatment equipment 130, from the nitrate storage tank 112 provided above the anaerobic ammonium oxidation tank 114, a certain concentration of nitrate stored is added to the anaerobic ammonium oxidation tank 114 through the nitrate addition pipe 120. On the other hand, from the organic substance storage tank 132, a certain concentration of an organic substance stored is added to the anaerobic ammonium oxidation tank 114 through an organic substance addition pipe 134 as an organic substance addition device extended to the upper end of the anaerobic ammonium oxidation tank 114.

The organic substance addition pipe 134 is provided with an organic substance valve 136 as a device for controlling the amount of the organic substance added. A certain concentration of the organic substance is added to the anaerobic ammonium oxidation tank 114 from the organic substance storage tank 132 in an amount controlled by opening and closing the valve 136. The organic substance is added to the anaerobic ammonium oxidation tank 114 in an amount corresponding to the amount necessary for treating ammonium in an ammonium containing liquid. The necessary amount of the organic substance is preferably set so that the $C/NO_3$—N ratio of the organic substance concentration to the nitrate nitrogen concentration in an ammonium containing liquid in the anaerobic ammonium oxidation tank 114 is 0.5 to 2.5. Heterotrophic denitrifying bacteria retained in pellets 124,124 . . . can reduce nitrate to nitrite using an organic substance as a hydrogen donor in a stable manner by keeping the aforementioned $C/NO_3$—N ratio in the anaerobic ammonium oxidation tank 114, and thus a competition for nitrite between anaerobic ammonium oxidizing bacteria and heterotrophic denitrifying bacteria can be controlled in the anaerobic ammonium oxidation tank 114.

FIG. 7 is a plan view showing a schematic configuration of equipment 150 for treating an ammonium containing liquid according to a seventh embodiment of the present invention. The same member or device as in the fifth and sixth embodiments will be described with the same reference numeral, and the description will be omitted.

As shown in FIG. 7, a concentration measuring instrument 138 for measuring the ammonium nitrogen concentration in an ammonium containing liquid is provided in the middle of an inflow pipe 116. The values measured in the concentration measuring instrument 138 are sent to a concentration monitoring-type nitrate control unit 140. The ammonium nitrogen concentration may be measured in the concentration measuring instrument 138 continuously or intermittently. The nitrate control unit 140 calculates the amount of nitrate added corresponding to the amount of nitrate necessary for being reduced by heterotrophic denitrifying bacteria to produce nitrite in an amount necessary for anaerobic ammonium oxidizing bacteria in an anaerobic ammonium oxidation tank 114, and controls the opening of a nitrate valve 122 based on the calculated addition amount. It is preferable to previously measure the relation between the amount of nitrate added and the valve opening, and input the relation in the nitrate control unit 140. This allows appropriate control of the amount of nitrate added in accordance with the ammonium concentration in the ammonium containing liquid. Accordingly, the equipment 150 for treating an ammonium containing liquid according to the seventh embodiment of the present invention is effective when the ammonium concentration in an ammonium containing liquid varies.

When the volume of the ammonium containing liquid flowing into the anaerobic ammonium oxidation tank 114 also varies, it is preferable to provide, in the inflow pipe 116, an inflow volume measuring instrument not shown in FIG. 7 for measuring the inflow volume, in addition to the concentration measuring instrument 138, to control the amount of nitrate added with reference to the concentration and the inflow volume.

Figure 8:
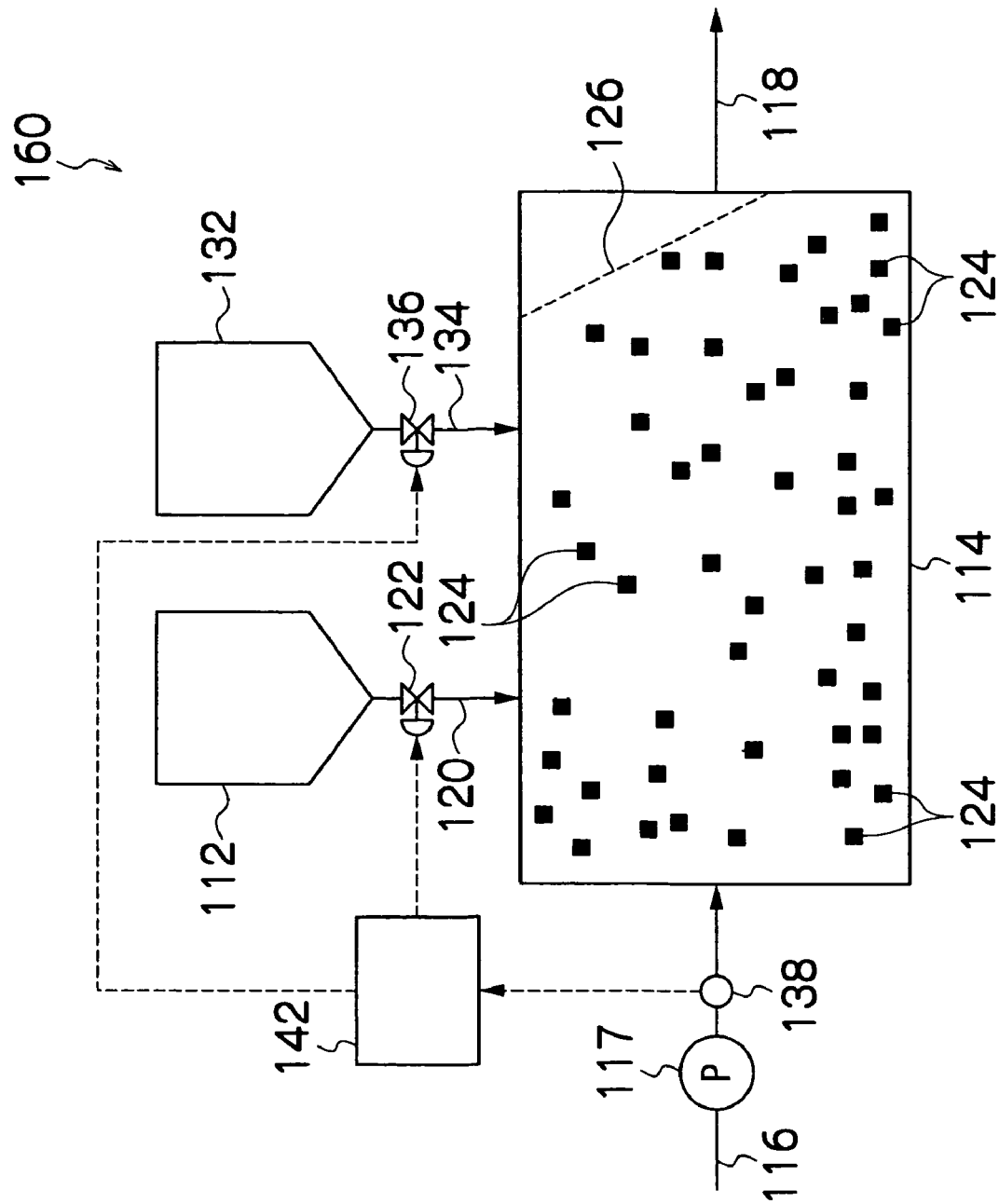
FIG. 8 is a plan view showing a schematic configuration of equipment for treating an ammonium containing liquid according to an eighth embodiment of the present invention.

FIG. 8 is a plan view showing a schematic configuration of equipment 160 for treating an ammonium containing liquid according to an eighth embodiment of the present invention, and shows a manner of controlling the amount of nitrate added and the amount of an organic substance added with reference to the ammonium nitrogen concentration. The same member or device as in the fifth to seventh embodiments will be described with the same reference numeral, and the description will be omitted.

As shown in FIG. 8, in the treatment equipment 160, the concentration of ammonium nitrogen contained in an ammonium containing liquid flowing into an anaerobic ammonium oxidation tank 114 is measured by a concentration measuring instrument 138, and the measurement values are sent to a concentration monitoring-type control unit 142. Based on the sent measurement values, the control unit 142 calculates the amount of nitrate added corresponding to the amount of nitrate necessary for being reduced by heterotrophic denitrifying bacteria to produce nitrite in an amount necessary for anaerobic ammonium oxidizing bacteria in an anaerobic ammonium oxidation tank 114, and calculates the amount of an organic substance necessary for attaining a $C/NO_3$—N ratio of 0.5 to 2.5 which is a ratio of the organic carbon concentration to the nitrate nitrogen concentration in an ammonium containing liquid in the anaerobic ammonium oxidation tank 114. Then, the control unit 142 controls the opening and closing of a nitrate valve 122 and an organic substance valve 136 based on the calculated amounts of nitrite and organic substance added, and regulates the amounts of nitrite and organic substance added. Consequently, nitrate reduction treatment by heterotrophic denitrifying bacteria and simultaneous denitrification of nitrite and ammonium by anaerobic ammonium oxidizing bacteria can be appropriately carried out according to the ammonium concentration in an ammonium containing liquid in the anaerobic ammonium oxidation tank 114. For this reason, the equipment is particularly effective when the ammonium concentration in an ammonium containing liquid varies.

Figure 9:
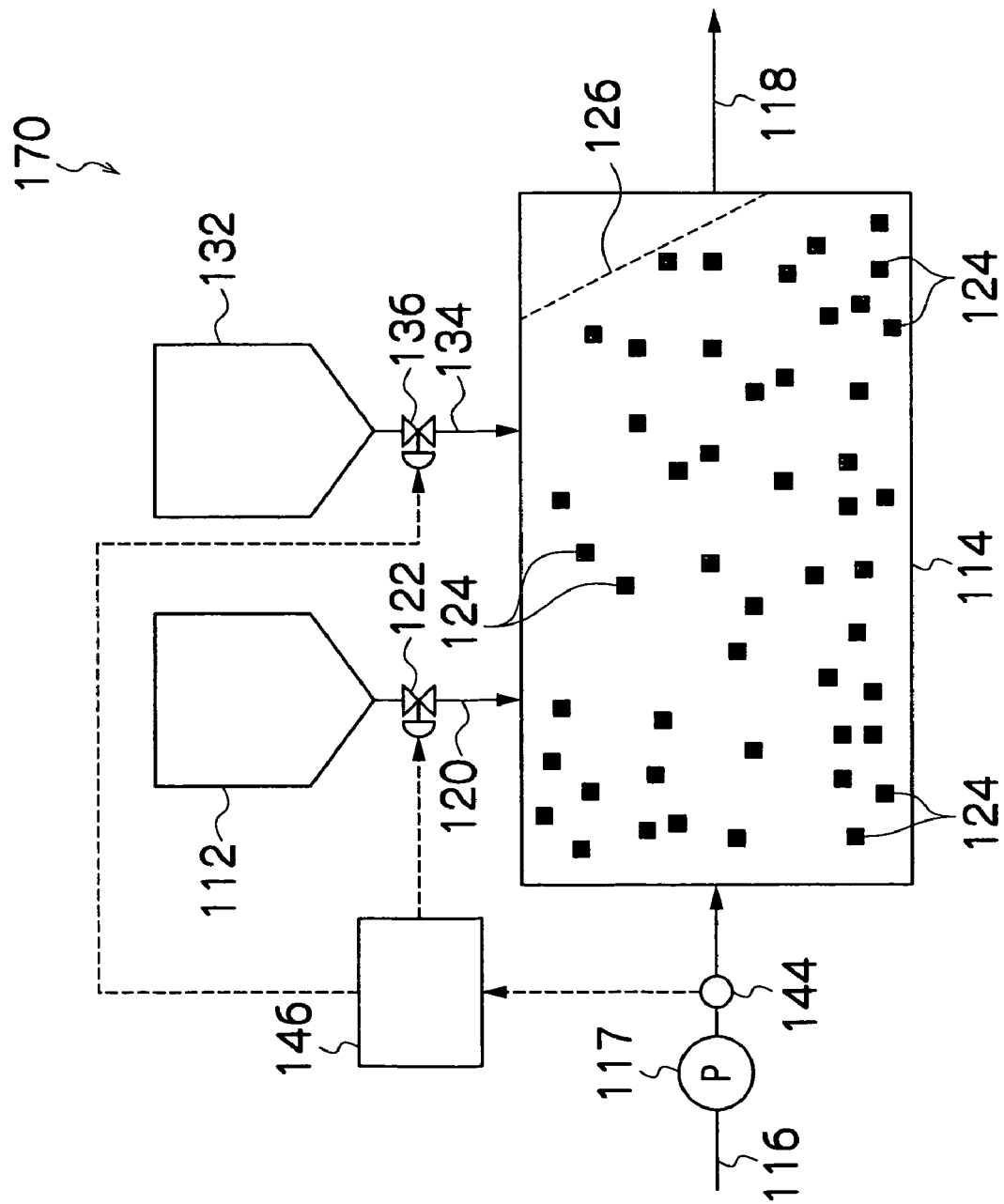
FIG. 9 is a plan view showing a schematic configuration of equipment for treating an ammonium containing liquid according to a ninth embodiment of the present invention.

FIG. 9 is a plan view showing a schematic configuration of equipment 170 for treating an ammonium containing liquid according to a ninth embodiment of the present invention. The same member or device as in the fifth to eighth embodiments will be described with the same reference numeral, and the description will be omitted.

As shown in FIG. 9, an inflow volume measuring instrument 144 for measuring the inflow volume of an ammonium containing liquid is provided in the middle of an inflow pipe 116. The values measured in the inflow volume measuring instrument 144 are sent to an inflow volume monitoring-type control unit 146. The inflow volume of the ammonium containing liquid may be measured in the inflow volume measuring instrument 144 continuously or intermittently. The control unit 146 controls the opening and closing of a nitrate valve 122 to increase and decrease the amount of nitrate added corresponding to the amount of nitrate necessary for producing nitrite by heterotrophic denitrifying bacteria in an amount corresponding to the necessary amount of nitrite in direct proportion to an increase or decrease in the inflow volume measured in the inflow volume measuring instrument 144. At the same time, the control unit 146 controls the opening and closing of an organic substance valve 136 to increase and decrease the amount of an organic substance added corresponding to the amount of the organic substance necessary for attaining a $C/NO_3$—N ratio of 0.5 to 2.5 which is a ratio of the organic carbon concentration to the nitrate nitrogen concentration in an ammonium containing liquid in an anaerobic ammonium oxidation tank 114. It is preferable to previously determine the necessary amount of nitrate and the necessary amount of the organic substance by analyzing the ammonium nitrogen concentration in the ammonium containing liquid.

Because of this, the treatment equipment 170 according to the ninth embodiment is effective when an ammonium containing liquid has a certain ammonium concentration as in development wastewater. When the amount of an organic substance is constant in an inflow ammonium containing liquid, and it is not necessary to control the organic substance in the anaerobic ammonium oxidation tank 114, the control unit 146 may control only the amount of nitrate added from the inflow volume.

Figure 10:
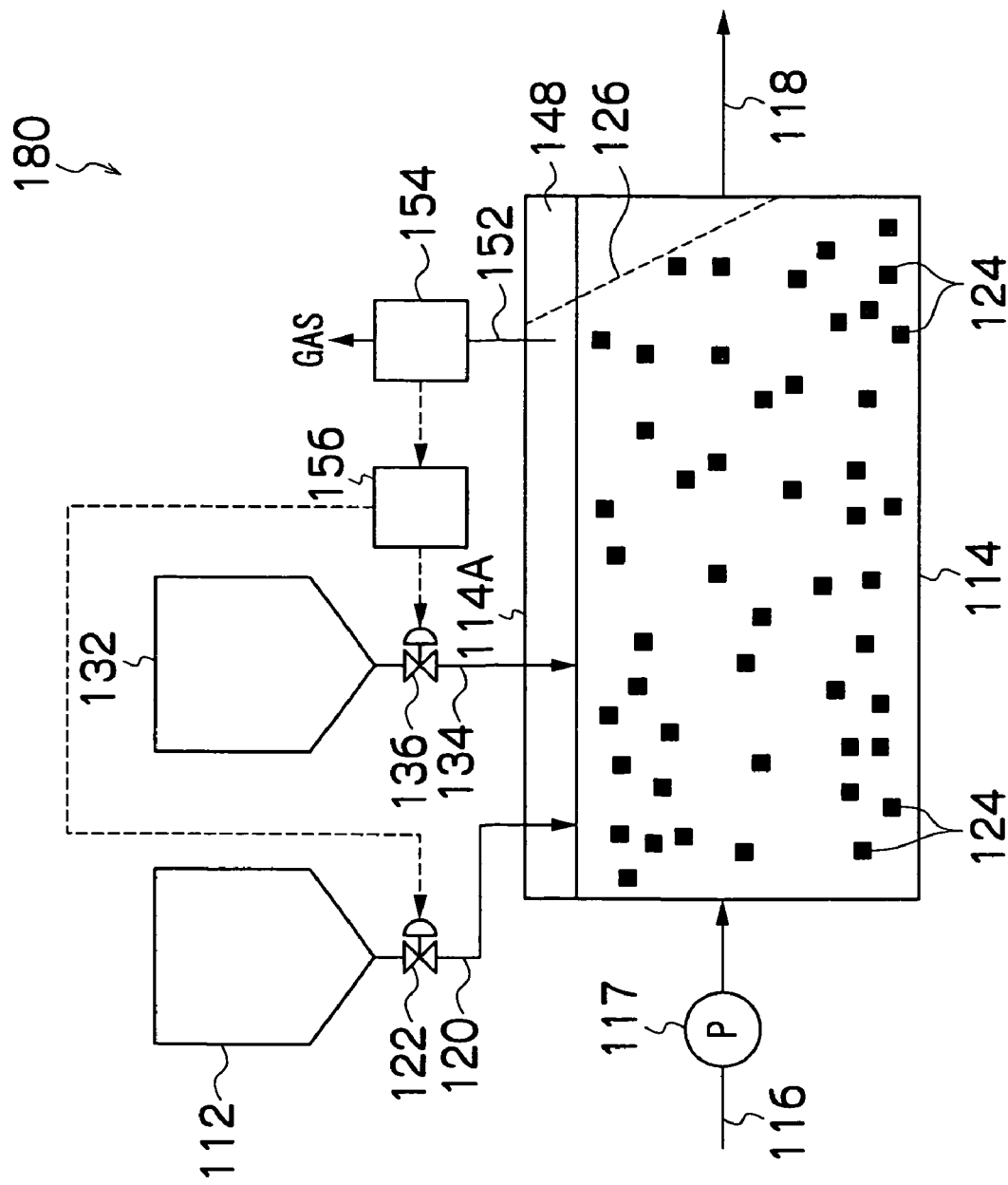
FIG. 10 is a plan view showing a schematic configuration of equipment for treating an ammonium containing liquid according to a tenth embodiment of the present invention.

FIG. 10 is a plan view showing a schematic configuration of equipment 180 for treating an ammonium containing liquid according to a tenth embodiment of the present invention. The same apparatus, member, or device as in the fifth to ninth embodiments will be described with the same reference numeral, and the description will be omitted.

As shown in FIG. 10, an anaerobic ammonium oxidation tank 114 is formed as a closed tank. In an upper space in the anaerobic ammonium oxidation tank 114, a trap 148 is formed, in which nitrogen gas produced by reaction of ammonium with nitrite in the anaerobic ammonium oxidation tank 114 is pooled. A gas recovery pipe 152 for recovering nitrogen gas pooled in the trap 148 is connected to an upper board 114A of the anaerobic ammonium oxidation tank 114. It is preferable to provide a liquid seal mechanism not shown in the figure to prevent nitrogen gas generated in the anaerobic ammonium oxidation tank 114 from being leaked together with the treated liquid in a connection section in which a discharge pipe 118 is connected to the anaerobic ammonium oxidation tank 114. As the liquid seal mechanism, a known mechanism such as a liquid seal U-tube may be used.

In the middle of the gas recovery pipe 152, a gas production rate measuring instrument 154 is provided, in which the amount of gas flowing in the gas recovery pipe 152 is sequentially measured to determine the production rate (L/min) of nitrogen gas generated in the anaerobic ammonium oxidation tank 114. Although gas recovered in the gas recovery pipe 152 may contain an air component brought from an ammonium containing liquid, such a component is ignored because the gas contains the component in an extremely small amount. Here, the gas production rate refers to a nitrogen gas production rate. As the gas production rate measuring instrument 154, a vortex flowmeter, float flowmeter, or integrating flowmeter may be preferably used, for example.

The values measured in the gas production rate measuring instrument 154 are sequentially input into a nitrogen gas monitoring-type control unit 156. The control unit 156 increases or decreases the amount of nitrate added, and monitors an increase or decrease in the nitrogen gas production rate Vn (L/min) measured in the gas production rate measuring instrument 154 when the amount is increased or decreased, so that an amount of nitrate added and an amount of an organic substance added which do not allow the gas production rate Vn to be increased or decreased in proportion to an increase or decrease in the amount of nitrate added and the amount of the organic substance added is defined as the necessary amount of nitrate and the necessary amount of the organic substance. The amount of nitrate added is controlled by controlling the opening and closing of a nitrate valve 122 and an organic substance valve 136.

In the treatment equipment 180, a certain concentration of an organic substance stored in an organic substance storage tank 132 is added to the anaerobic ammonium oxidation tank 114 at the same time. Here, when the opening and closing of the organic substance valve 136 is controlled to attain a $C/NO_3$—N ratio of 0.5 to 2.5 which is a ratio of the organic carbon concentration to the nitrate nitrogen concentration in an ammonium containing liquid, the amount of the organic substance added is controlled to be the necessary amount.

Figure 11:
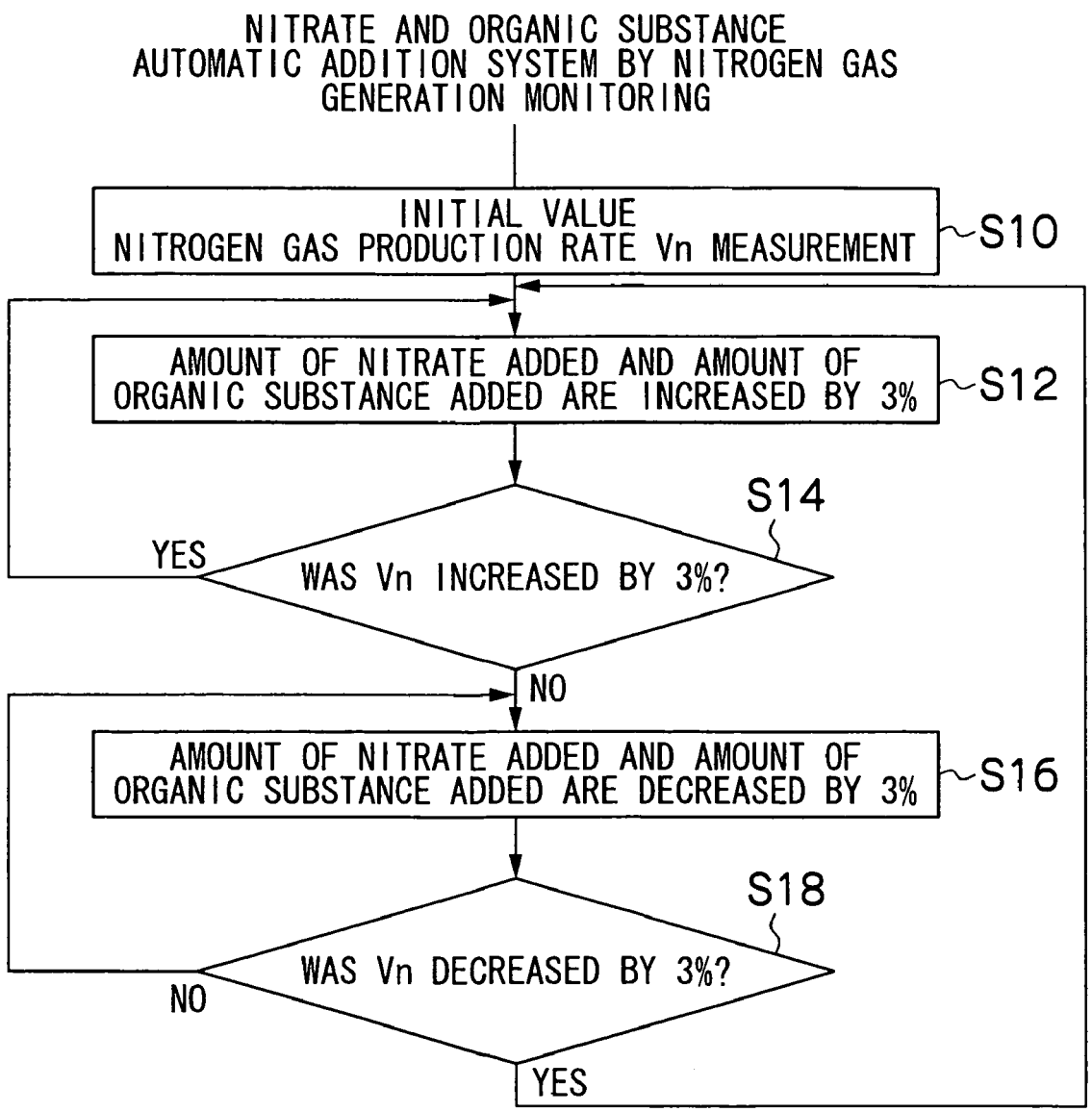
FIG. 11 is a flow chart showing a control program in a nitrate and organic substance automatic control system by nitrogen gas generation monitoring.

For example, as shown in the flow chart of FIG. 11, in a nitrate control program by nitrogen gas generation monitoring, the nitrogen gas production rate with respect to the amount of nitrate added at the initial stage of operation of the treatment equipment 180 is measured, and the amount of nitrate added at the time of this gas production rate Vn is used as the reference addition amount (step S10).

Next, the control unit 156 widens the opening of the nitrate valve 122 in the step S12 to increase the amount of nitrate added to the anaerobic ammonium oxidation tank 114 from a nitrate storage tank 112 by 3% (wt % or vol %) with respect to the reference addition amount. The control unit 156 increases the amount of nitrate added by 3% in the step S14 to monitor whether or not the gas production rate Vn measured in the gas production rate measuring instrument 154 is increased. When the gas production rate Vn is increased (by 3%, for example) in direct proportion to an increase in the amount of nitrate added, the amount of nitrate added may be insufficient, and thus the step S12 is repeated to increase the amount of nitrate added by further 3% with respect to the reference addition amount.

When the gas production rate Vn is not increased in direct proportion to an increase in the amount of nitrate added, the amount of nitrate added is excessive, and anaerobic ammonium oxidizing bacteria may have reduced activity. Thus, the opening of the nitrate valve 122 and the organic substance valve 136 is narrowed in the step S16 to decrease the amounts of nitrate and organic substance added by 3%. The control unit 156 decreases the amounts of nitrate and organic substance added by 3% to monitor in the step S18 whether or not the gas production rate Vn measured in the gas production rate measuring instrument 154 is decreased. When the gas production rate Vn is decreased (by 3%, for example) in direct proportion to a decrease in the amounts of nitrate and organic substance added, the step S12 is repeated. When the gas production rate Vn is not decreased, nitrate and the organic substance may still be excessive, and thus the step S16 is repeated.

Operations of the steps S12 to S18 are repeated in this manner to find an amount of nitrate added which does neither increase nor decrease the gas production rate. With reference to such an amount as the necessary amount of nitrate, the amount of nitrate added is controlled. This allows the amount of nitrate added to be appropriately controlled, even if the ammonium nitrogen concentration in the ammonium containing liquid or the inflow volume of the liquid is not measured, and furthermore allows the amount of nitrate added to be controlled concurrently with an increase or decrease in the treatment load such as an increase or decrease in the ammonium concentration or an increase or decrease in the inflow volume. In the above-described program, the amount of nitrate added is increased or decreased by 3%, but the amount is preferably increased or decreased by 2 to 5% as a percentage appropriately selected. This is because an increase or decrease in the gas production rate cannot be accurately monitored in the steps S14 and S18 if the amount is increased or decreased by less than 2%, and the nitrate concentration in the anaerobic ammonium oxidation tank 114 may be drastically increased if the amount is increased or decreased by more than 5%. When the step S12 or the step S14 is repeated, nitrate may be increased or decreased by, for example, 2% instead of 3% as a next cycle.

Figure 12:
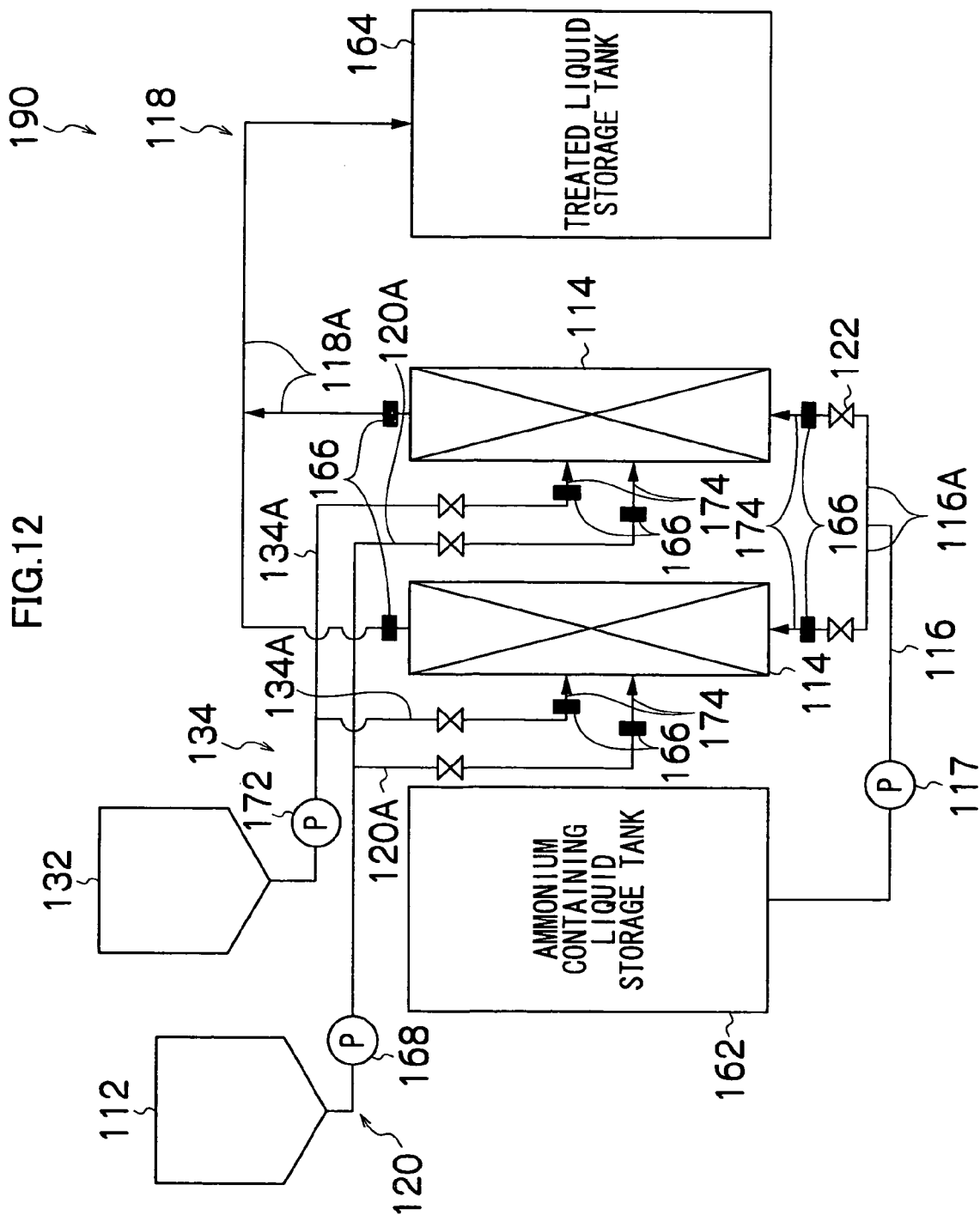
FIG. 12 is a plan view showing a schematic configuration of equipment for treating an ammonium containing liquid according to an eleventh embodiment of the present invention.

FIG. 12 is a plan view showing a schematic configuration of equipment 190 for treating an ammonium containing liquid according to an eleventh embodiment of the present invention. The same apparatus, member, or device as in the fifth to tenth embodiments will be described with the same reference numeral, and the description will be omitted.

As shown in FIG. 12, the treatment equipment 190 is mainly constituted by an ammonium containing liquid storage tank 162 for storing an ammonium containing liquid, a nitrate storage tank 112 for storing a certain concentration of nitrate, an organic substance storage tank 132 for storing a certain concentration of an organic substance, vertical anaerobic ammonium oxidation tanks 114 having a removable cartridge structure, and a treated liquid storage tank 164 for storing the liquid treated in the anaerobic ammonium oxidation tanks 114. The cartridge-type anaerobic ammonium oxidation tanks 114 are preferably closed cylinder vessels packed with entrapping immobilization pellets as fixed beds.

An inflow pipe 116 that allows an ammonium containing liquid in the ammonium containing liquid storage tank 162 to flow into the anaerobic ammonium oxidation tanks 114 has two branches on the top (on the side of the anaerobic ammonium oxidation tanks). Valves 122 are provided in the middle of the two branched pipes 116A, 116A, and male parts of one-touch connectors 166 are provided on the tops of the two pipes 116A, 116A. A nitrate addition pipe 120 of adding nitrate in the nitrate storage tank 112 to the anaerobic ammonium oxidation tank 114 has a plurality of branched pipes 120A, 120A equipped with the valves 122. Nitrate addition pumps 168 are provided in the pipes 120A, and male parts of the one-touch connectors 166 are provided on each of the tops of the pipes 120A, 120A. Similarly, an organic substance addition pipe 134 of adding an organic substance in the organic substance storage tank 132 to the anaerobic ammonium oxidation tank 114 has a plurality of branched pipes 134A, 134A equipped with the valves 122. Organic substance addition pumps 172 are provided in the pipes 134A, and male parts of the one-touch connectors 166 are provided on each of the tops of the pipes 134A, 134A. Further, a discharge pipe 118 for water treated in the anaerobic ammonium oxidation tanks 114 has two branches on the top (on the side of the anaerobic ammonium oxidation tanks), and male parts of the one-touch connectors 166 are provided on the tops of the two pipes 118A, 118A equipped with valves.

On the other hand, connection pipes 174, 174 . . . are respectively provided on the lower ends, the upper ends, and the lateral sides of the anaerobic ammonium oxidation tanks 114, and female parts of the one-touch connectors 166 are provided on the tops of the respective connection pipes 174. Thus, the two anaerobic ammonium oxidation tanks 114 can be removably attached to the inflow pipe 116, the discharge pipe 118, the nitrate addition pipe 120, and the organic substance addition pipe 134 through the one-touch connectors 166.

The treatment equipment according to the present embodiment is constituted by two anaerobic ammonium oxidation tanks 114 that can be removed. However, the number of the anaerobic ammonium oxidation tanks 14 may be one or more, and the inflow pipe 116, the discharge pipe 118, the nitrate addition pipe 120, and the organic substance addition pipe 134 may be formed with one or more branches corresponding to the number of the tanks.

In the treatment equipment 190 thus constituted according to the eleventh embodiment, a plurality of the anaerobic ammonium oxidation tanks 114 can be used by rotation. Further, it is convenient if one of the multiple anaerobic ammonium oxidation tanks 114 is used as a reserved anaerobic ammonium oxidation tank 114 when anaerobic ammonium oxidizing bacteria are killed or have reduced activity in the anaerobic ammonium oxidation tanks 114 in use. Accordingly, the treatment equipment 190 according to the eleventh aspect of the present invention shown in FIG. 12 is effective when treating a small-scale waste liquid containing a certain concentration of ammonium such as a development waste liquid.

[3] Next, embodiments of a process of supplying nitrate to an anaerobic ammonium oxidation tank from a nitrification tank will be described with reference to FIGS. 13 to 22.

Figure 13:
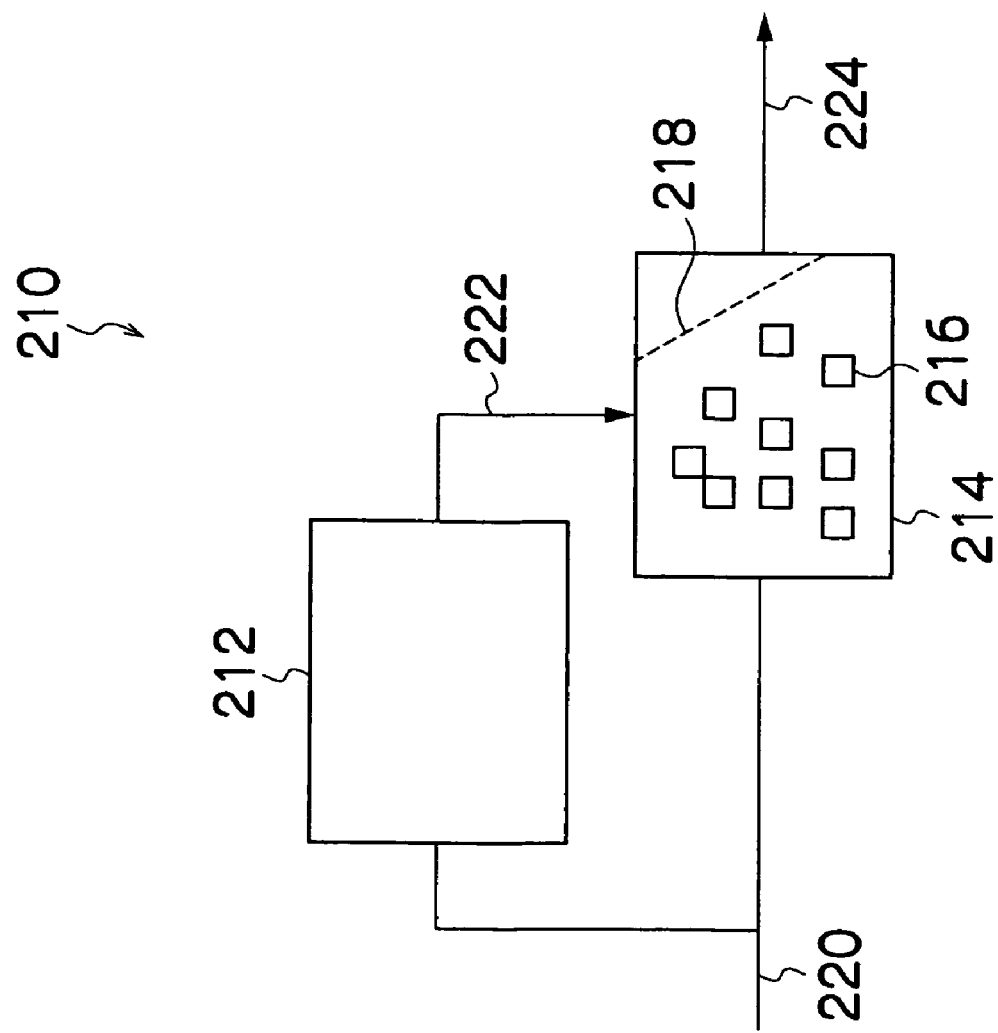
FIG. 13 is a plan view showing a schematic configuration of equipment for treating an ammonium containing liquid according to a twelfth embodiment of the present invention.

FIG. 13 shows equipment 210 for treating an ammonium containing liquid according to a twelfth embodiment. The equipment is constituted by a nitrification tank 212 in an aerobic atmosphere in which nitrifying bacteria are present; an anaerobic ammonium oxidation tank 214 in an anaerobic atmosphere in which heterotrophic denitrifying bacteria and anaerobic ammonium oxidizing bacteria are present; an inflow pipe 220 of allowing an ammonium containing liquid to flow into the nitrification tank 212 and the anaerobic ammonium oxidation tank 214; a nitrified liquid pipe 222 of allowing the nitrified liquid treated in the nitrification tank 212 to flow into the anaerobic ammonium oxidation tank 214; and a discharge pipe 224 of discharging the liquid treated in the anaerobic ammonium oxidation tank 214.

Here, the content, type, culturing method, and maintenance form of various bacteria such as heterotrophic denitrifying bacteria and anaerobic ammonium oxidizing bacteria, and the form of various entrapping immobilization pellets may be the same as described above in each embodiment. The anaerobic ammonium oxidation tank 214 used here may be the same as the above-described anaerobic ammonium oxidation tank 114.

An ammonium containing liquid flows into the nitrification tank 212 from an inflow pipe 220 forming the inflow section by driving an inflow pump (not shown). The nitrification tank 212 is packed with filter media to which nitrifying bacteria are attached (not shown), and the filter media are brought into contact with the inflow ammonium containing liquid.

The nitrified liquid pipe 222 allows the nitrified liquid treated in the nitrification tank 212 to flow into the anaerobic ammonium oxidation tank 214.

An ammonium containing liquid flows into the anaerobic ammonium oxidation tank 214 from the inflow pipe 220 forming the inflow section by driving an inflow pump (not shown). Further, the nitrified liquid flows into the tank 214 from the nitrified liquid pipe 222.

The nitrified liquid pipe 222 is extended from the nitrification tank 212 to the anaerobic ammonium oxidation tank 214. A certain concentration of nitrate nitrified in the nitrification tank 212 is added to the anaerobic ammonium oxidation tank 214. Thus, in an anaerobic atmosphere, nitrate added from the nitrification tank 212 is reduced to nitrite by heterotrophic denitrifying bacteria, and ammonium in the ammonium containing liquid and nitrite are simultaneously denitrified by anaerobic ammonium oxidizing bacteria and removed as nitrogen gas. The necessary amount of nitrate and the like are the same as in the aforementioned fifth to eleventh embodiments.

The liquid treated in the anaerobic ammonium oxidation tank 214 is discharged through the discharge pipe 224 forming the discharge section to outside the system. A screen 218 is provided on the side of the discharge section of the anaerobic ammonium oxidation tank 214, and prevents entrapping immobilization pellets 216 from being discharged together with the treated liquid. In this manner, an ammonium containing liquid can be treated constantly stably by supplying a certain concentration of nitrate to the anaerobic ammonium oxidation tank 214 from the nitrification tank 212, and thus a treated liquid can be provided with good quality constantly stably.

Figure 14:
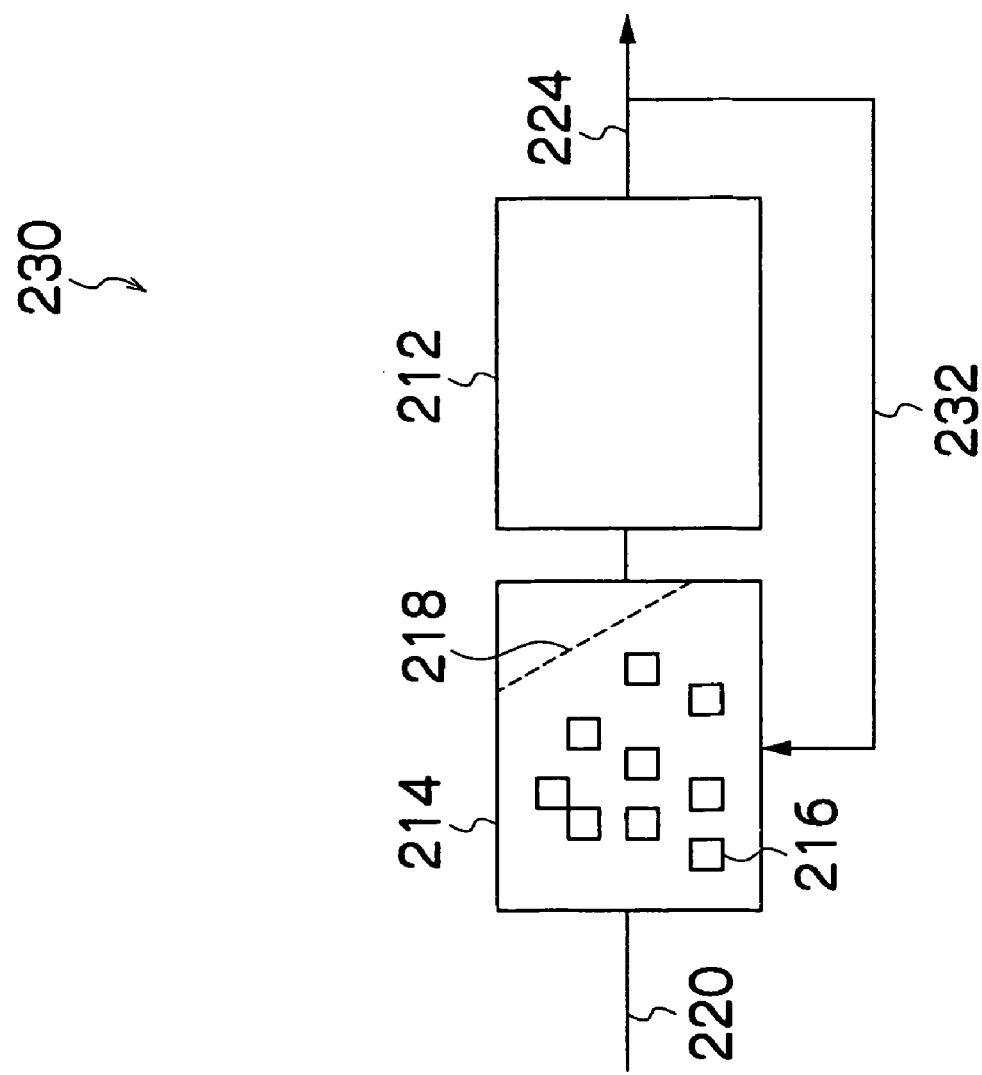
FIG. 14 is a plan view showing a schematic configuration of equipment for treating an ammonium containing liquid according to a thirteenth embodiment of the present invention.

FIG. 14 is a plan view showing a schematic configuration of equipment 230 for treating an ammonium containing liquid according to a thirteenth embodiment of the present invention.

As shown in FIG. 14, in the treatment equipment 230, a nitrification tank 212 is placed downstream of an anaerobic ammonium oxidation tank 214. Ammonium is nitrified in the downstream nitrification tank 212, the produced nitrate is fed back to the anaerobic ammonium oxidation tank 214 through a feedback pipe 232, and nitrate and ammonium are denitrified in the anaerobic ammonium oxidation tank 214. The treatment equipment 230 are effective in low-concentration ammonium treatment such as sewage treatment.

Figure 15:
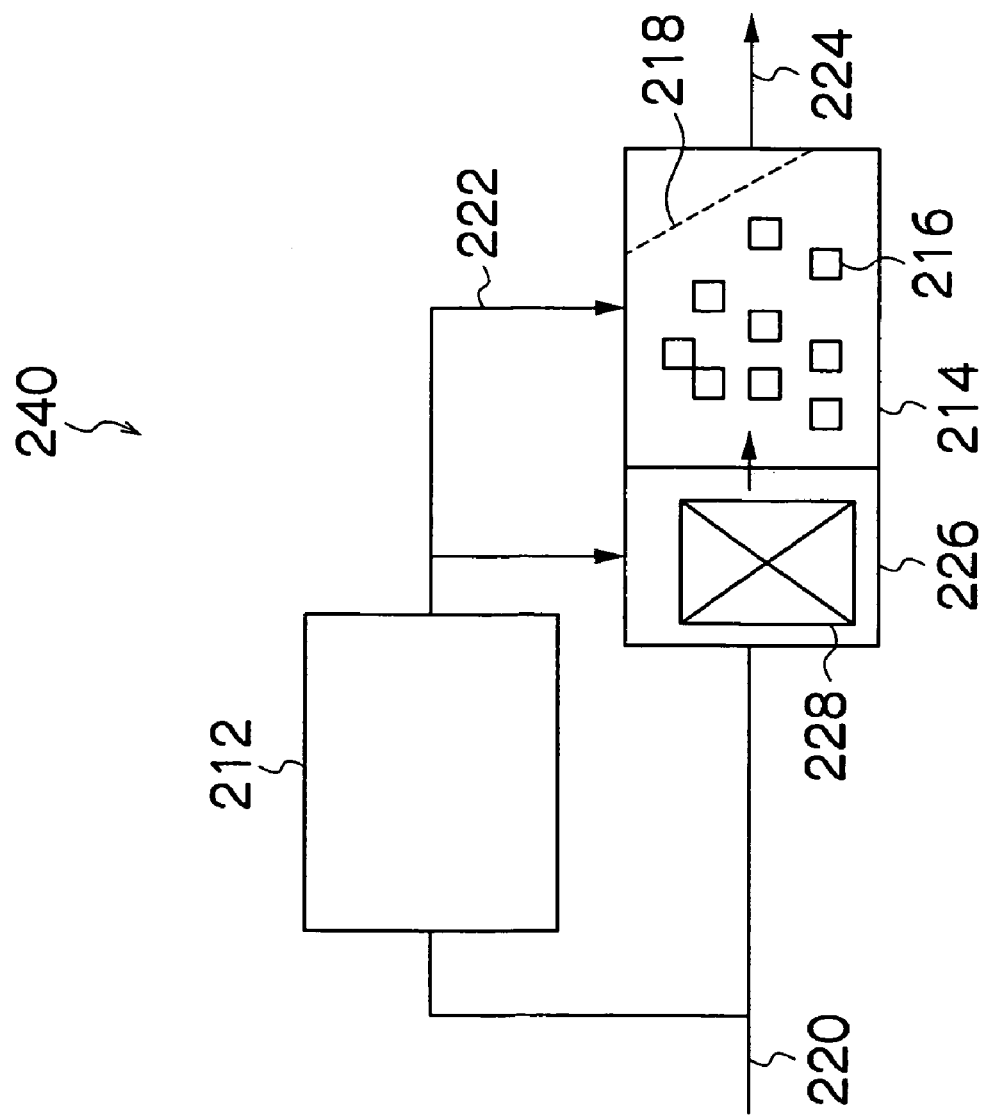
FIG. 15 is a plan view showing a schematic configuration of equipment for treating an ammonium containing liquid according to a fourteenth embodiment of the present invention.
Figure 16:
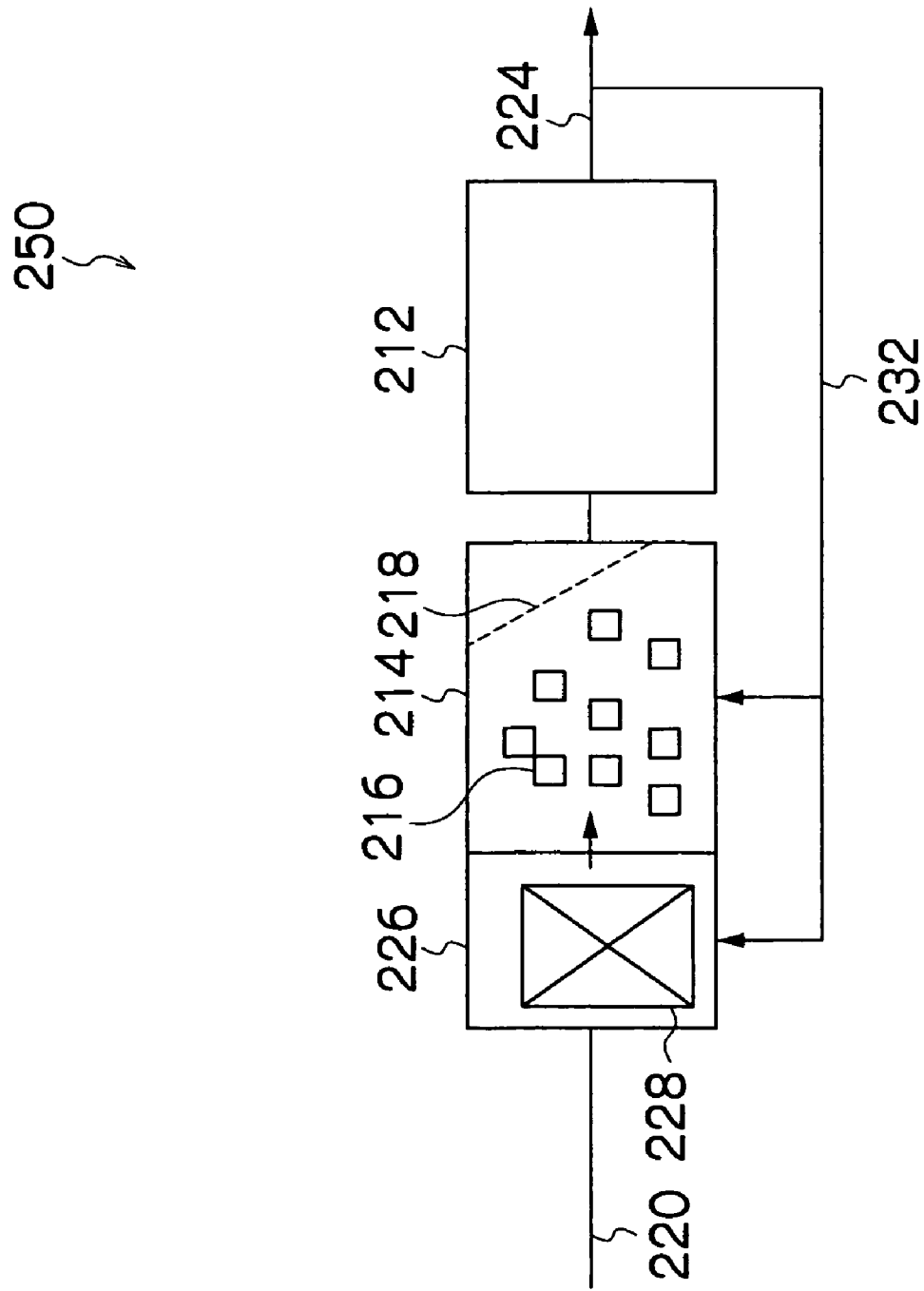
FIG. 16 is a plan view showing a schematic configuration of equipment for treating an ammonium containing liquid according to a fifteenth embodiment of the present invention.

FIGS. 15 and 16 are plan views showing schematic configurations of equipments 240 and 250 for treating an ammonium containing liquid according to fourteenth and fifteenth embodiments of the present invention.

As shown in FIG. 15, in the treatment equipment 240, a denitrification tank 226 is placed upstream of an anaerobic ammonium oxidation tank 214 in the treatment equipment 210 of FIG. 13. In the treatment equipment 250 of FIG. 16, as in the equipment of FIG. 15, a denitrification tank 226 is placed upstream of an anaerobic ammonium oxidation tank 214 in the treatment equipment 230 of FIG. 14.

In the denitrification tank 226, nitrate in the treated liquid from the nitrification tank 212 is denitrified to $N_2$ gas by denitrifying bacteria by use of an organic substance contained in an ammonium containing liquid.

If the denitrification tank 226 is placed upstream of the anaerobic ammonium oxidation tank 214 in this manner, an organic component can be removed when denitrifying nitrate. In this case, if the organic component is completely removed, reduction from nitrate does not proceed in the anaerobic ammonium oxidation tank 214. Thus, the $C/NO_3$—N ratio of the organic substance concentration to the nitrate nitrogen concentration in an ammonium containing liquid in the anaerobic ammonium oxidation tank 214 is preferably 0.5 to 2.5. These treatment equipments 240 and 250 are effective when wastewater has a high organic substance concentration and an organic substance inhibits ammonium oxidation reaction.

Figure 17:
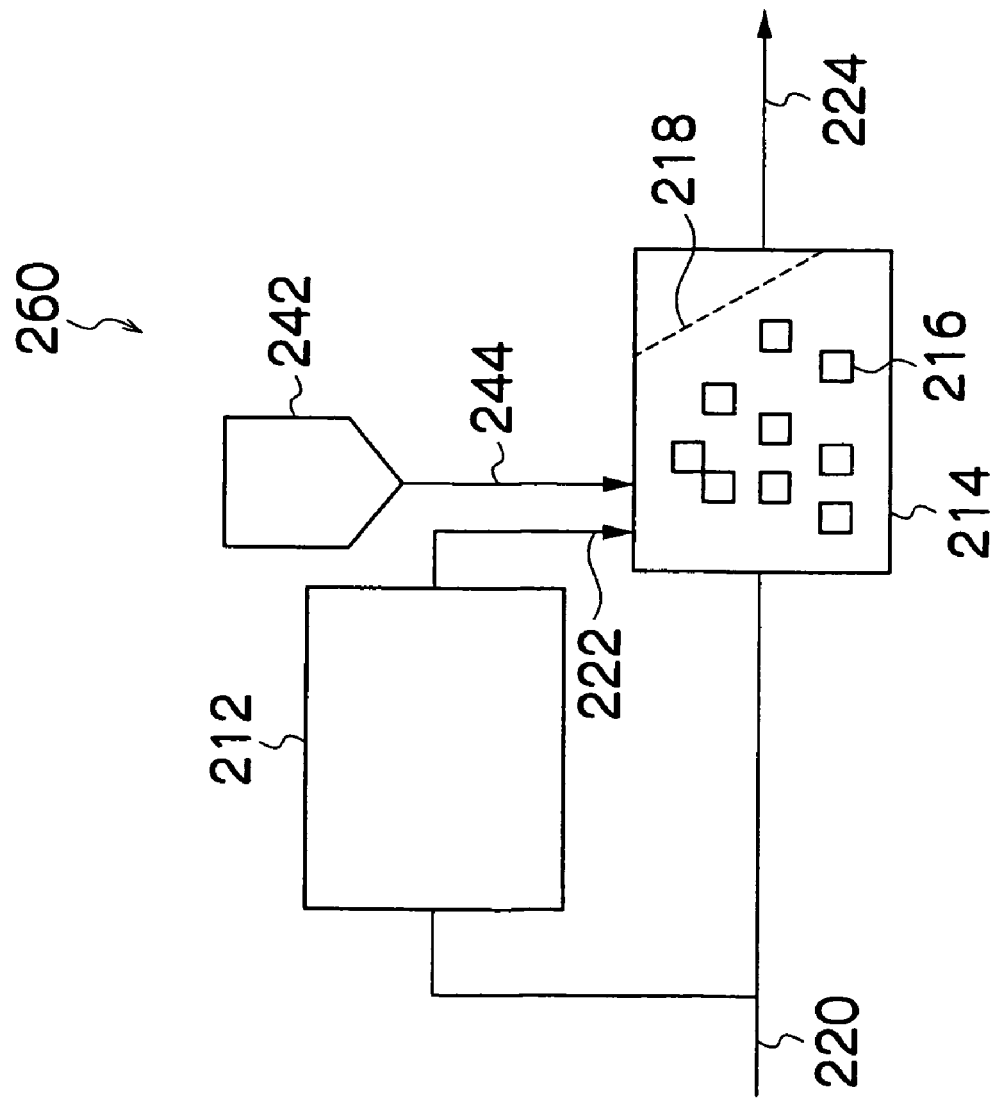
FIG. 17 is a plan view showing a schematic configuration of equipment for treating an ammonium containing liquid according to a sixteenth embodiment of the present invention.

FIG. 17 is a plan view showing a schematic configuration of equipment 260 for treating an ammonium containing liquid according to a sixteenth embodiment of the present invention.

As shown in FIG. 17, in the treatment equipment 260, an organic substance storage tank 242 is connected to an anaerobic ammonium oxidation tank 214 in the treatment equipment 210 of FIG. 13 through an organic substance addition pipe 244. If wastewater lacks an organic component, an organic substance can be supplied. The opening and closing of an organic substance valve (not shown) is controlled to increase and decrease the amount of an organic substance added corresponding to the amount of the organic substance necessary for attaining a $C/NO_3$—N ratio of 0.5 to 2.5 which is a ratio of the organic carbon concentration to the nitrate nitrogen concentration in an ammonium containing liquid in the anaerobic ammonium oxidation tank 214. It is preferable to previously determine the necessary amount of nitrate and the necessary amount of the organic substance by analyzing the ammonium nitrogen concentration in the ammonium containing liquid. An organic substance storage tank 242 can also be placed in the anaerobic ammonium oxidation tanks 214 in the treatment equipments of FIGS. 13 to 16.

Figure 18:
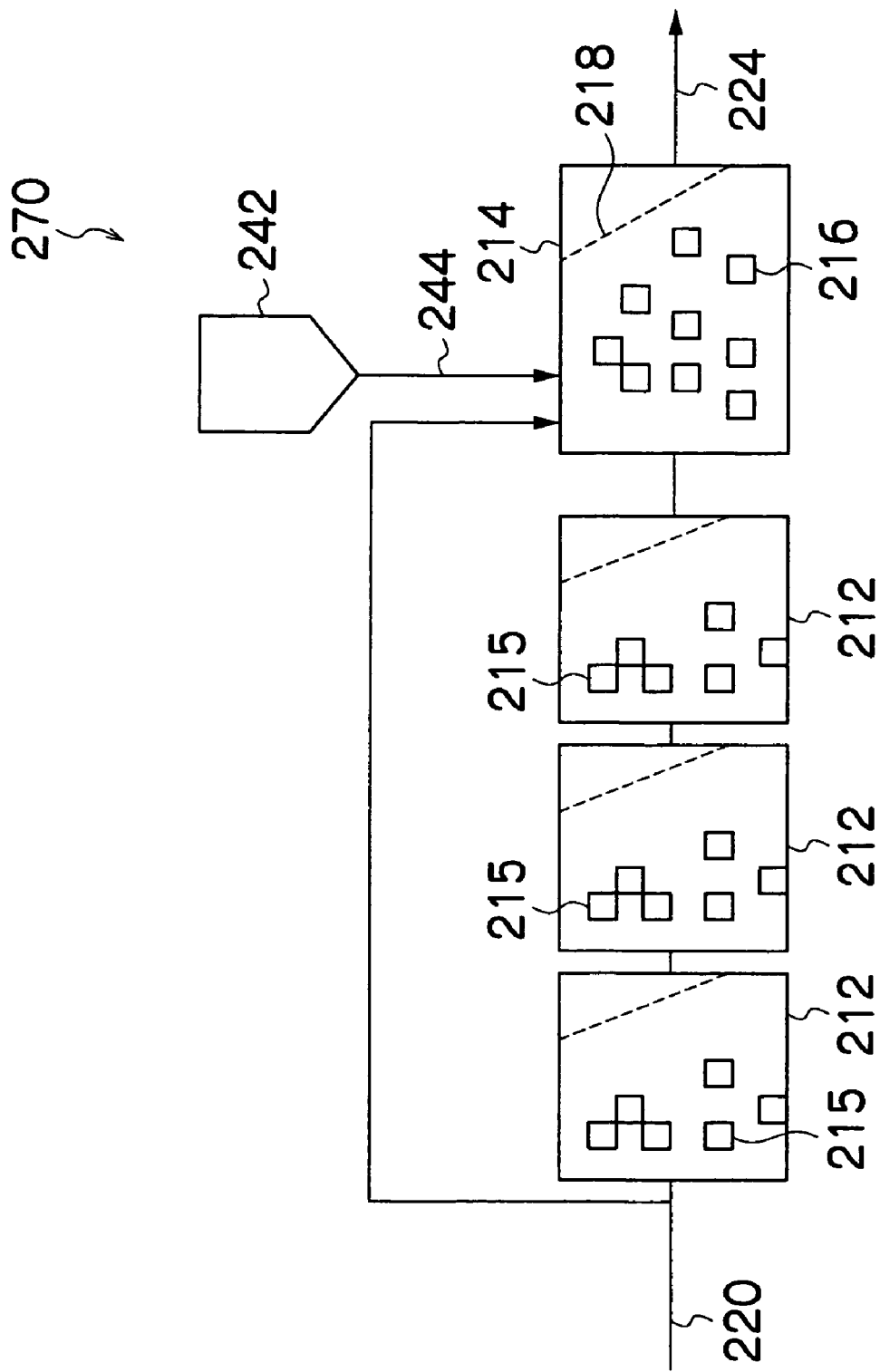
FIG. 18 is a plan view showing a schematic configuration of equipment for treating an ammonium containing liquid according to a seventeenth embodiment of the present invention.

FIG. 18 is a plan view showing a schematic configuration of equipment 270 for treating an ammonium containing liquid according to a seventeenth embodiment of the present invention.

As shown in FIG. 18, in the present embodiment, an organic substance storage tank 242 is provided in an anaerobic ammonium oxidation tank 214 in the treatment equipment 210 of FIG. 13, and a nitrification tank 212 of the equipment 210 is provided as multiple tanks.

Nitrifying bacteria in the nitrification tanks 212, 212 . . . are preferably immobilized in or to an immobilization material to form nitrification sludge pellets 215. The opening and closing of an organic substance valve (not shown) is controlled to increase and decrease the amount of an organic substance added corresponding to the amount of the organic substance necessary for attaining a $C/NO_3$—N ratio of 0.5 to 2.5 which is a ratio of the organic carbon concentration to the nitrate nitrogen concentration in an ammonium containing liquid in the anaerobic ammonium oxidation tank 214 as described above. It is preferable to previously determine the necessary amount of nitrate and the necessary amount of the organic substance by analyzing the ammonium nitrogen concentration in the ammonium containing liquid. The treatment equipment 270 is effective when treating high-concentration ammonium wastewater having an ammonium nitrogen concentration of 500 mg/L or more.

Figure 19:
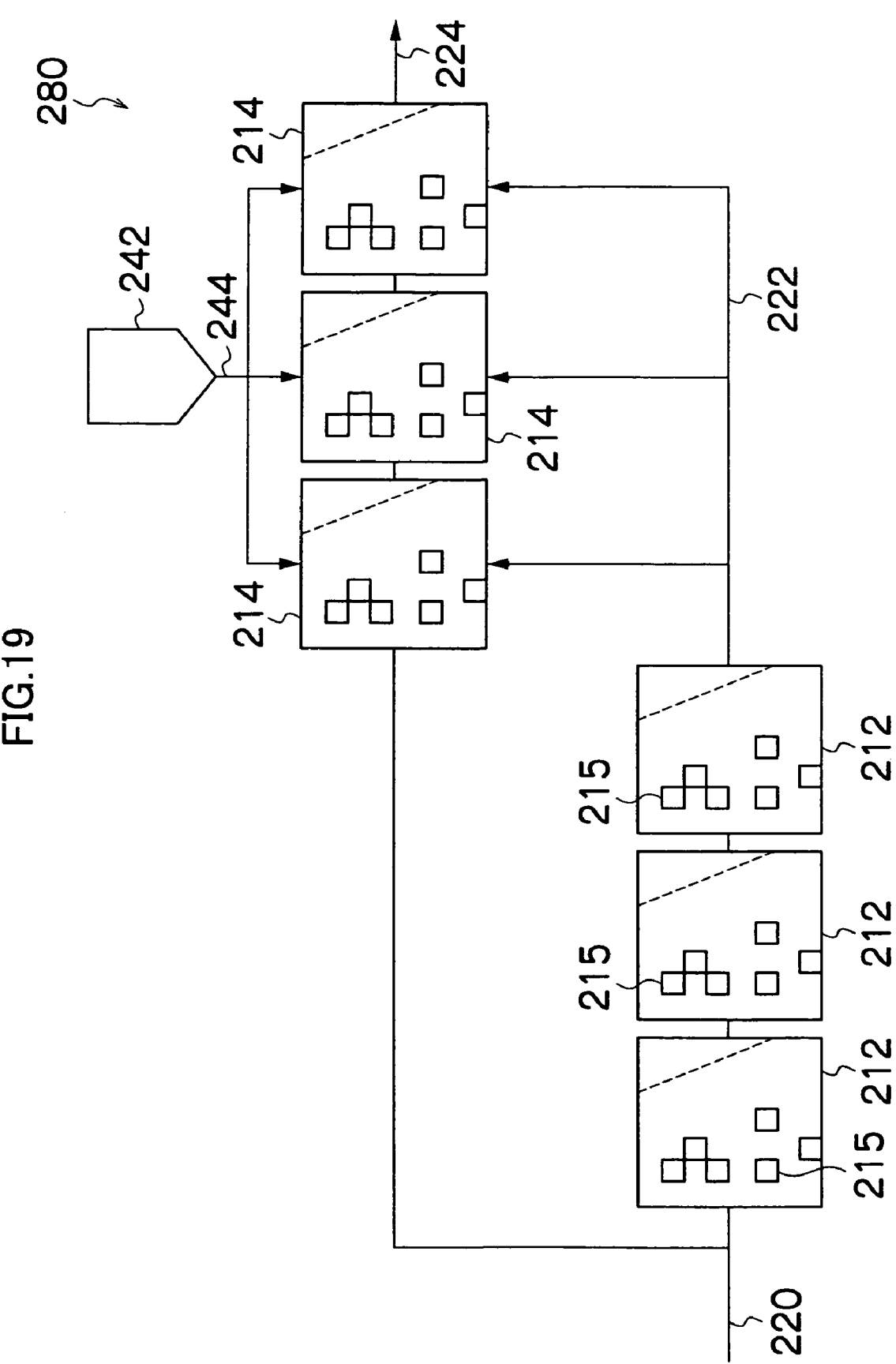
FIG. 19 is a plan view showing a schematic configuration of equipment for treating an ammonium containing liquid according to an eighteenth embodiment of the present invention.

FIG. 19 is a plan view showing a schematic configuration of equipment 280 for treating an ammonium containing liquid according to an eighteenth embodiment of the present invention.

As shown in FIG. 19, in the present embodiment, an anaerobic ammonium oxidation tank 214 in the treatment equipment 270 of FIG. 18 is provided as multiple tanks, and a nitrified liquid pipe 222 and an organic substance addition pipe 244 are connected to the anaerobic ammonium oxidation tanks 214, 214 . . . , respectively. The opening and closing of an organic substance valve (not shown) is controlled to increase and decrease the amount of an organic substance added corresponding to the amount of the organic substance necessary for attaining a $C/NO_3$—N ratio of 0.5 to 2.5 which is a ratio of the organic carbon concentration to the nitrate nitrogen concentration in an ammonium containing liquid in the anaerobic ammonium oxidation tank 214. It is preferable to previously determine the necessary amount of nitrate and the necessary amount of the organic substance by analyzing the ammonium nitrogen concentration in the ammonium containing liquid. In this manner, the ammonium removal ratio is improved by supplying a nitrified liquid and an organic substance to the anaerobic ammonium oxidation tanks 214, 214 . . . .

Figure 20:
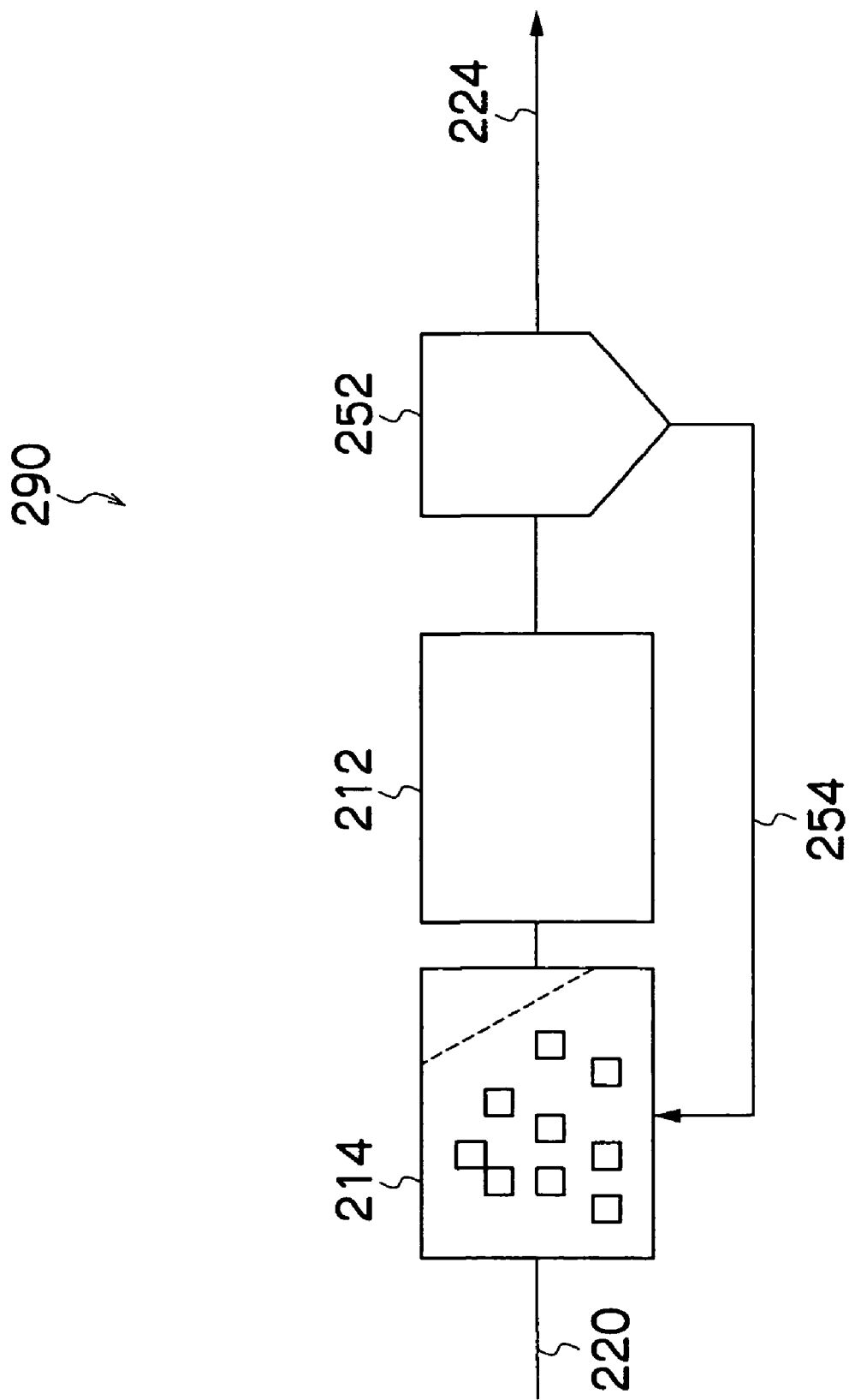
FIG. 20 is a plan view showing a schematic configuration of equipment for treating an ammonium containing liquid according to a nineteenth embodiment of the present invention.

FIG. 20 is a plan view showing a schematic configuration of equipment 290 for treating an ammonium containing liquid according to a nineteenth embodiment of the present invention.

As shown in FIG. 20, in the treatment equipment 290, a settlement tank 252 is placed downstream of a nitrification tank 212 in the treatment equipment 230 of FIG. 14. This is a case where feedback sludge is used as a nitrified liquid. In the case of treatment of low-concentration nitrogen wastewater such as sewage treatment, it is preferable that the wastewater be fed back to an anaerobic ammonium oxidation tank 214 through a sludge feedback pipe 254 at a feedback ratio of 50 to 100%.

Figure 21:
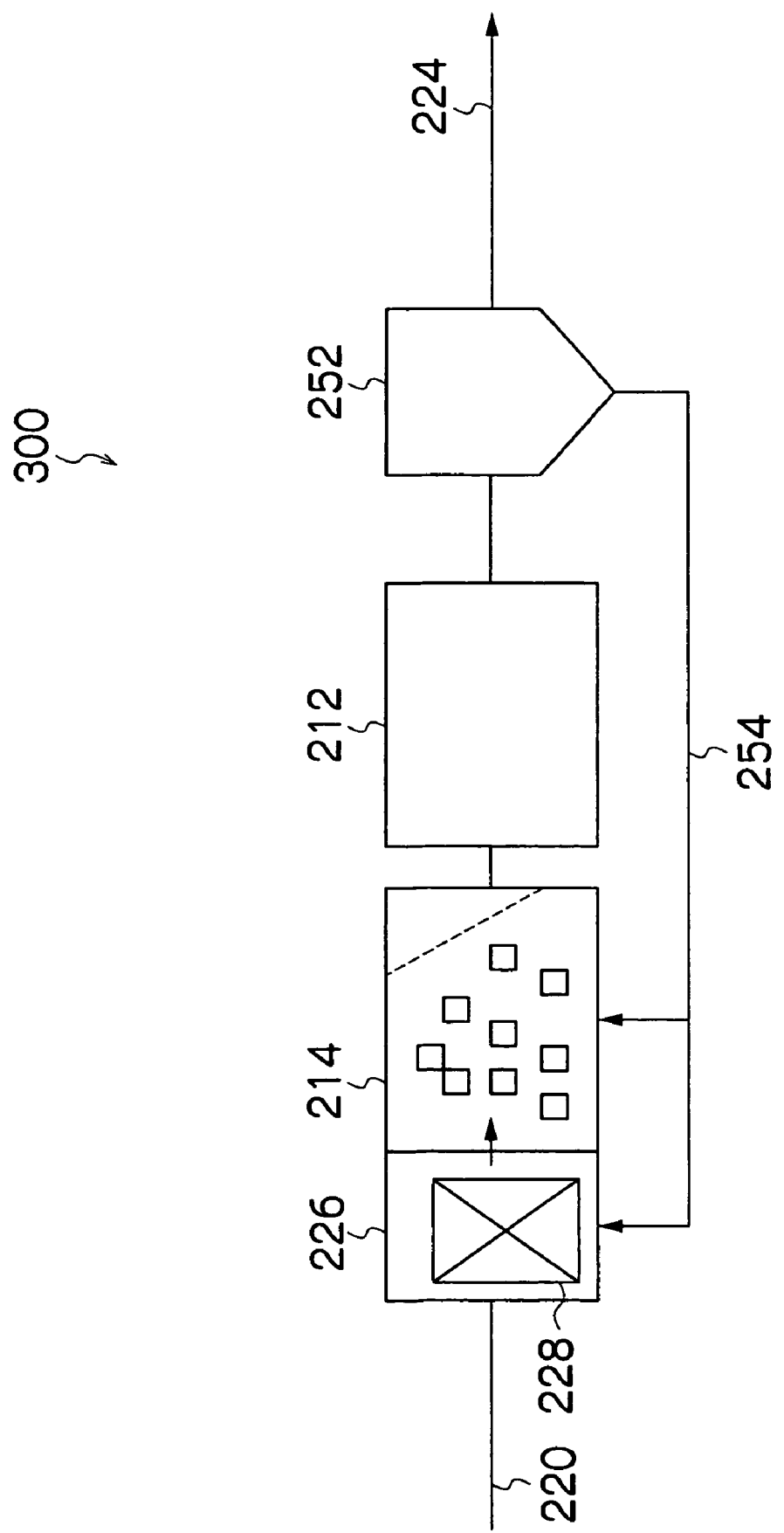
FIG. 21 is a plan view showing a schematic configuration of equipment for treating an ammonium containing liquid according to a twentieth embodiment of the present invention.

FIG. 21 is a plan view showing a schematic configuration of equipment 300 for treating an ammonium containing liquid according to a twentieth embodiment of the present invention.

As shown in FIG. 21, in the treatment equipment 300, a settlement tank 252 is placed downstream of a nitrification tank 212 in the treatment equipment 250 of FIG. 16. This is a case where feedback sludge is used as a nitrified liquid, as in the treatment equipment 290. In the case of treatment of low-concentration nitrogen wastewater such as sewage treatment, it is preferable that the wastewater be fed back to an anaerobic ammonium oxidation tank 214 through a sludge feedback pipe 254 at a feedback ratio of 50 to 100%.

Figure 22:
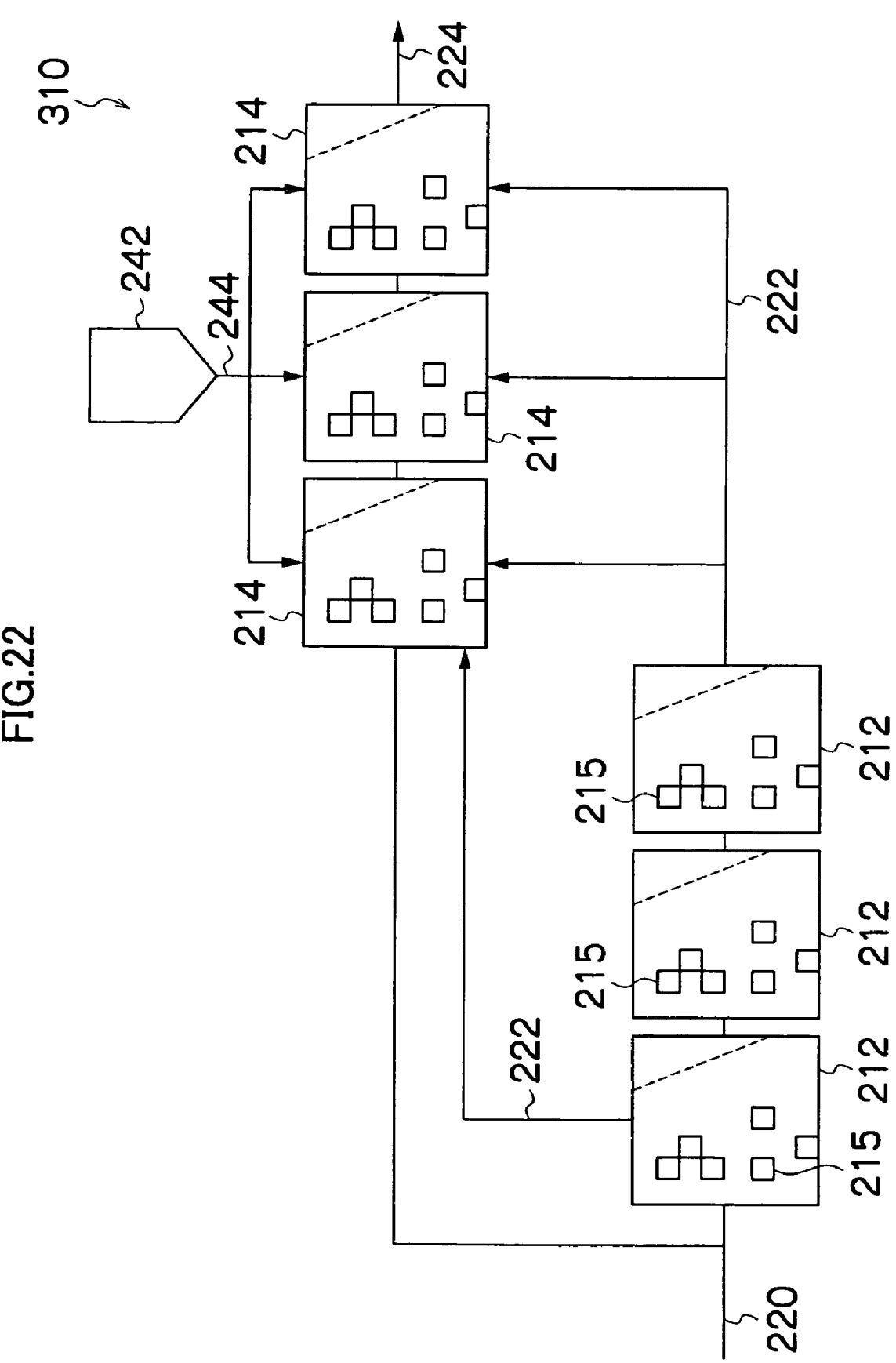
FIG. 22 is a plan view showing a schematic configuration of equipment for treating an ammonium containing liquid according to a twenty-first embodiment of the present invention.

FIG. 22 is a plan view showing a schematic configuration of equipment 310 for treating an ammonium containing liquid according to a twenty-first embodiment of the present invention.

As shown in FIG. 22, the nitrified liquid pipe 222 is provided in the treatment equipment 310, so that the nitrified liquid in the most upstream of nitrification tanks 212, 212 . . . of the treatment equipment 280 can be supplied to anaerobic ammonium oxidation tanks 214. The first nitrification tank 212 easily produces nitrite. Thus, by setting the tank in this manner, the amount of an organic substance added can be saved. When nitrite is produced in the second nitrification tank 212, the amount of the organic substance added can be further saved by providing the nitrified liquid pipe 222 so that the nitrified liquid can also be supplied to the anaerobic ammonium oxidation tanks 214.

The first to twenty-first embodiments of the present invention are as described above. However, the present invention is not limited to the above embodiments, and various embodiments are possible.

For examples, in the aforementioned treatment equipments according to the present embodiments shown in FIGS. 3A to 3D, FIGS. 5 to 10, and FIGS. 13 to 22, the number, shape, material, and the like of each apparatus and member used are not specifically limited.

The embodiments shown in FIGS. 5 to 10 and FIGS. 13 to 22 are described with the proviso that heterotrophic denitrifying bacteria and anaerobic ammonium oxidizing bacteria in the anaerobic ammonium oxidation tanks 114 and 214 are maintained in the form of entrapping immobilization pellets. However, there are no specific limitations to the maintenance form. Any of floating bacteria, a biofilm, and attachment immobilization pellets are possible.

The first to fourth embodiments shown in FIGS. 3A to 3D, the fifth to eleventh embodiments shown in FIGS. 5 to 12, and the twelfth to twenty-first embodiments shown in FIGS. 13 to 22 are individually described. However, the present embodiments are not limited thereto. For example, an embodiment of a combination of any one or more from any one of the first to fourth embodiments, any one of the fifth to eleventh embodiments, and any one of the twelfth to twenty-first embodiments is possible.

EXAMPLES

Example 1, Example 2, and Example 3 of the present invention will be described below based on the above description. However, the present invention is not limited to these Examples.

Example 1

Example 1-1

First, in this Example, a treatment test for synthetic wastewater containing ammonium, nitrate, and sodium acetate was carried out in equipments 10 and 20 for treating an ammonium containing liquid shown in FIGS. 3A and 3B, and a treatment test for synthetic wastewater containing ammonium and sodium acetate was carried out in equipments 30 and 40 for treating an ammonium containing liquid shown in FIGS. 3C and 3D, under the conditions of the following Tests 1 to 6 and Test 7 as Comparative Example using a conventional process, respectively.

In the treatment equipments 10 and 20, synthetic wastewater having a ratio of the ammonium nitrogen concentration to the nitrate concentration of 1:1, having T/N controlled to 80 mg/L, and containing sodium acetate as an organic source added to attain a $C/NO_3$—N ratio as described above of 1 was used for the Tests. In the treatment equipments 30 and 40, synthetic wastewater having an ammonium nitrogen concentration of 80 mg/L and containing sodium acetate as an organic source added to correlate with the amount of nitrate produced in a nitrification tank 24 and attain a $C/NO_3$—N ratio of 1 was used. Also in the conventional process, this synthetic wastewater was used. The equipments 10, 20, 30, and 40 for treating an ammonium containing liquid were operated at a nitrogen load of 1.6 kg-N/m$^3$/day. Detailed conditions are as shown below.

(Test 1)
 The equipment 10 for treating an ammonium containing liquid shown in FIG. 3A was used.
 Nitrate reduction tank 12 (anaerobic tank): Retention time 32 minutes, tank packed with nonwoven cloth packing material at 30%, denitrifying bacteria introduced at 6×10$^7$ cells/mL, components in tank stirred at 60 rpm
 Anaerobic ammonium oxidation tank 14: Retention time 40 minutes, tank packed with nonwoven cloth packing material at 30%, anaerobic ammonium oxidizing bacteria introduced at 4×10$^5$ cells/mL, components in tank stirred at 60 rpm (Test 2)
 The equipment 20 for treating an ammonium containing liquid shown in FIG. 3B was used.
 Anaerobic ammonium oxidation tank 14: Retention time 72 minutes, tank packed with nonwoven cloth packing material at 30%, heterotrophic denitrifying bacteria introduced at 6×10$^7$ cells/mL, anaerobic ammonium oxidizing bacteria introduced at 4×10$^5$ cells/mL, components in tank stirred at 60 rpm (Test 3)
 The equipment 20 for treating an ammonium containing liquid shown in FIG. 3B was used.
 Anaerobic ammonium oxidation tank 14: Retention time 72 minutes, tank packed with entrapping immobilization pellets 50A and 50B shown in FIG. 4A at 20% (10% for pellets 50A in which 6×10$^8$ cells/mL of heterotrophic denitrifying bacteria are entrapped to be immobilized; 10% for pellets 50B in which 4×10$^6$ cells/mL of anaerobic ammonium oxidation bacteria are entrapped to be immobilized), components in tank stirred at 60 rpm (Test 4)
 The equipment 20 for treating an ammonium containing liquid shown in FIG. 3B was used.
 Anaerobic ammonium oxidation tank 14: Retention time 72 minutes, tank packed with entrapping immobilization pellets 50 shown in FIG. 4B
 (pellets in which 3×10$^8$ cells/mL of heterotrophic denitrifying bacteria and 2×10$^6$ cells/mL of anaerobic ammonium oxidizing bacteria are entrapped to be immobilized) at 20%, components in tank stirred at 60 rpm (Test 5)
 The equipment 20 for treating an ammonium containing liquid shown in FIG. 3B was used.
 Anaerobic ammonium oxidation tank 14: Retention time 72 minutes, tank packed with entrapping immobilization pellets 50' shown in FIG. 4C (pellets in which 3×10$^8$ cells/mL of heterotrophic denitrifying bacteria are entrapped to be immobilized near the surface, and 2×10$^6$ cells/mL of anaerobic ammonium oxidizing bacteria are entrapped to be immobilized at the center) at 20%, components in tank stirred at 60 rpm (Test 6)
 The equipment 30 for treating an ammonium containing liquid shown in FIG. 3C was used.
 Anaerobic tank 22: Retention time 40 minutes, tank packed with entrapping immobilization pellets 50' shown in FIG. 4C (pellets in which 3×10$^8$ cells/mL of heterotrophic denitrifying bacteria are entrapped to be immobilized near the surface, and 2×10$^6$ cells/mL of anaerobic ammonium oxidizing bacteria are entrapped to be immobilized at the center) at 20%, components in tank stirred at 60 rpm
 Aerobic tank 24: Retention time 32 minutes, tank packed with nonwoven cloth packing material at 30%, activated sludge introduced at 2,000 mg/L and attached to nonwoven cloth, tank aerated by aeration unit 26 while maintaining dissolved oxygen at 3 mg/L or more
 100% circulation through circulation line 28

(Test 7)
 Comparative Example in which the same tank configuration as in the equipment 30 for treating an ammonium containing liquid shown in FIG. 3C was employed, but heterotrophic denitrifying bacteria were neither introduced into the tank nor added to pellets.
 Anaerobic tank 22: Retention time 40 minutes, tank packed with nonwoven cloth packing material at 30%, activated sludge introduced at 2,000 mg/mL and attached to nonwoven cloth, components in tank stirred at 60 rpm
 Aerobic tank 24: Retention time 32 minutes, tank packed with nonwoven cloth packing material at 30%, activated sludge introduced at 2,000 mg/L and attached to nonwoven cloth, tank aerated by aeration unit 26 while maintaining dissolved oxygen at 3 mg/L or more
 100% circulation through circulation line 28

Treatment operations were carried out in the Tests described above. One month after completion of acclimatization, the treatment was made stable, and the nitrogen removal ratio at that time was examined. The results are shown in the following Table 2.

TABLE 2

|  | T-N value in treated water (mg/L) | T-N removal ratio (%) |
|---|---|---|
| Test 1 | 36~42 | 48~55 |
| Test 2 | 14~28 | 65~83 |
| Test 3 | 12~24 | 70~85 |
| Test 4 | 5~20 | 75~94 |
| Test 5 | 5~15 | 81~94 |
| Test 6 | 10 or less | 87 or more |
| Test 7 | 52~70 | 13~35 |

According to Table 2, the nitrogen removal ratios attained in Tests 1 to 6 were higher than that attained in Test 7 as Comparative Example.

Example 1-2

Next, in this Example, a treatment test for synthetic wastewater containing ammonium and sodium acetate was carried out in the equipment 30 for treating an ammonium containing liquid shown in FIG. 3C under the conditions of the inventive process and the conventional process.

Synthetic wastewater having an ammonium nitrogen concentration of 40 mg/L and containing sodium acetate as an organic source added to attain a $C/NO_3$—N ratio as described above of 1 was used for the Tests. The equipment 30 for treating an ammonium containing liquid was operated at a nitrogen load of 0.6 kg-N/m$^3$/day. Detailed conditions are as shown below.

(Test 1)
 The equipment 30 for treating an ammonium containing liquid shown in FIG. 3C was used.
 Anaerobic tank 22: Retention time 46 minutes, tank packed with entrapping immobilization pellets 50' shown in FIG. 4C (pellets in which 3×10$^8$ cells/mL of heterotrophic denitrifying bacteria are entrapped to be immobilized near the surface, and $2\times10^6$ cells/mL of anaerobic ammonium oxidizing bacteria are entrapped to be immobilized at the center) at 20%, components in tank stirred at 60 rpm Aerobic tank 24: Retention time 50 minutes, tank packed with nonwoven cloth packing material at 30%, activated sludge introduced at 2,000 mg/L and attached to nonwoven cloth, tank aerated by aeration unit 26 while maintaining dissolved oxygen at 3 mg/L or more 100% circulation through circulation line 28

(Test 2)

Comparative Example in which the same tank configuration as in the equipment 30 for treating an ammonium containing liquid shown in FIG. 3C was employed, but heterotrophic denitrifying bacteria were neither introduced into the tank nor added to pellets.

Anaerobic tank 22: Retention time 46 minutes, tank packed with nonwoven cloth packing material at 30%, activated sludge introduced at 2,000 mg/mL and attached to nonwoven cloth, components in tank stirred at 60 rpm Aerobic tank 24: Retention time 50 minutes, tank packed with nonwoven cloth packing material at 30%, activated sludge introduced at 2,000 mg/L and attached to nonwoven cloth, tank aerated by aeration unit 26 while maintaining dissolved oxygen at 3 mg/L or more 100% circulation through circulation line 28

The same wastewater treatment operation was carried out in Tests 1 and 2 described above. One month after completion of acclimatization, the treatment was made stable, and the T-N value in the treated water was measured at that time.

The results show that the T-N value in the treated water was 10 mg/L or less in Test 1, but the T-N value in the treated water was 25 to 30 mg/L in Test 2 as a Comparative Example.

As described in the above Examples 1-1 and 1-2, when the present invention is employed, anaerobic ammonium oxidation can be carried out using nitrate which can be supplied in a more stable manner. Accordingly, a process and equipment for treating an ammonium containing liquid can be provided which can carry out high-speed denitrification stably if the nitrogen components in the ammonium containing liquid vary.

Example 2

Example 2-1

In this treatment, an ammonium containing liquid was treated using treatment equipment 110 shown in FIG. 5. The composition and the like of entrapping immobilization pellets with which an anaerobic ammonium oxidation tank 114 was filled are as shown in Table 3.

TABLE 3

| Composition component | | Composition ratio (weight %) |
|---|---|---|
| Accumulated sludge concentrate of heterotrophic nitrifying bacteria and anaerobic ammonium oxidizing bacteria | Containing $2 \times 10^6$ cells/mL of heterotrophic nitrifying bacteria and $2 \times 10^5$ cells/mL of anaerobic ammonium oxidizing bacteria | 50 |
| Polyethylene glycol diacrylate | | 4 |
| Acrylamide | | 1 |
| N,N,N',N'-tetramethylethylenediamine | | 0.5 |
| Potassium persulfate | | 0.25 |
| Water | | 44.25 |

After mixing the above-described components, the above composition was gelled by addition of potassium persulfate, and the gel was formed into 3 mm×3 mm squares to prepare entrapping immobilization pellets 124.

(Test Conditions for Treatment Equipment)

Ammonium containing liquid: Industrial wastewater having an ammonium nitrogen ($NH_4$—N) concentration of 90 to 120 mg/L and a BOD concentration of 90 to 130 mg/L Amount of nitrate added: A certain amount of nitrate with a nitrate nitrogen ($NO_3$—N) concentration of 150 mg/L Retention time in anaerobic ammonium oxidation tank 114: 2 hours Packing ratio of entrapping immobilization pellets: 20%

Mechanical stirring in the anaerobic ammonium oxidation tank 114 caused a flow of pellets 124, 124 . . . .

After continuous treatment under the above-described conditions and acclimatization for one month, ammonium in the ammonium containing liquid and nitrite were anaerobically simultaneously denitrified in the anaerobic ammonium oxidation tank 114, and the treated liquid was maintained to have a total nitrogen concentration (T-N) of 30 to 50 mg/L in a stable manner.

In the Example using the treatment equipment 110 of FIG. 5, industrial wastewater not containing a BOD component and having an ammonium nitrogen ($NH_4$—N) concentration of 90 to 120 mg/L and $NO_3$—N concentration of 120 to 180 mg/L was retained in the anaerobic ammonium oxidation tank 114 for a retention time of 2 hours, and sodium acetate as an organic substance was added thereto with a C/$NO_3$—N ratio of 1.2, to carry out treatment operation. As a result, continuous treatment was performed in a stable manner, and the treated liquid was maintained to have a total nitrogen concentration (T-N) of 30 to 50 mg/L.

Example 2-2

In this Example, as Tests 1 to 3, an ammonium containing liquid was treated with the same entrapping immobilization pellets as in Example 2-1, using treatment equipment 160 in FIG. 8, treatment equipment 170 in FIG. 9, and treatment equipment 180 in FIG. 10. Treatment conditions in Tests 1 to 3 are as follows.

(Test 1)

The treatment equipment 160 shown in FIG. 8 was used.

Ammonium containing liquid to be treated: Industrial wastewater having an ammonium nitrogen ($NH_4$—N) concentration of 90 to 120 mg/L Amount of nitrate added: Nitrate with a nitrate nitrogen ($NO_3$—N) concentration 1.8 times of the ammonium nitrogen ($NH_4$—N) concentration added by ammonium monitoring control Amount of organic substance added: Molasses added at a C/$NO_3$—N ratio of molasses to nitrate nitrogen of 1.2 by ammonium monitoring control Retention time in anaerobic ammonium oxidation tank 114: 2 hours Amount of packed pellets in anaerobic ammonium oxidation tank 114: 20% Mechanical stirring in the anaerobic ammonium oxidation tank 114 caused a flow of pellets 124, 124 . . . .

(Test 2)

The treatment equipment 170 shown in FIG. 9 was used.

Ammonium containing liquid to be treated: Industrial wastewater having an ammonium nitrogen ($NH_4$—N) concentration of 90 to 120 mg/L Amount of nitrate added: Nitrate with a nitrate nitrogen ($NO_3$—N) concentration 1.8 times of a predetermined average ammonium nitrogen ($NH_4$—N) concentration of 105 mg/L added by inflow volume control Amount of organic substance added: Molasses added at a C/$NO_3$—N ratio of molasses to nitrate nitrogen of 1.2 by ammonium monitoring control Retention time in anaerobic ammonium oxidation tank 114: 2 hours Amount of packed pellets in anaerobic ammonium oxidation tank 114: 20%

Mechanical stirring in the anaerobic ammonium oxidation tank 114 caused a flow of pellets 124, 124 . . . .

(Test 3)

The treatment equipment 180 shown in FIG. 10 was used.

Ammonium containing liquid to be treated: Industrial wastewater having an ammonium nitrogen ($NH_4$—N) concentration of 90 to 120 mg/L Amount of nitrate added: Nitrate with a nitrate nitrogen ($NO_3$—N) concentration 1.4 times of a predetermined average ammonium nitrogen ($NH_4$—N) concentration of 105 mg/L added by nitrogen gas production amount control and then controlled in accordance with flow chart shown in FIG. 11

Amount of organic substance added: Molasses added at a C/$NO_3$—N ratio of molasses to nitrate nitrogen of 1.2

Retention time in anaerobic ammonium oxidation tank 114: 2 hours

Amount of packed pellets in anaerobic ammonium oxidation tank 114: 20%

Mechanical stirring in the anaerobic ammonium oxidation tank 114 caused a flow of pellets 124, 124 . . . .

The results of the above-described Tests 1 to 3 are shown in Table 4. In Comparative Examples 1 and 2 in Table 4, treatment was carried out without addition of nitrate using the treatment equipment 130 shown in FIG. 6.

TABLE 4

| | Treatment equipment | Total nitrogen concentration in treated water (mg/L) |
|---|---|---|
| Test 1 | FIG. 8 | 15~26 |
| Test 2 | FIG. 9 | 18~30 |
| Test 3 | FIG. 10 | 10~22 |
| Comparative Example 1 | FIG. 6, nitrate not added | 91~124 |
| Comparative Example 2 | FIG. 6, methanol added instead of nitrate | 87~114 |

As is clear from Table 4, Tests 1 to 3 provided treated liquids with a total nitrogen concentration of 10 to 30 mg/L each, and could treat ammonium containing liquids in a stable manner.

On the contrary, Comparative Examples 1 and 2 provided treated liquids with a total nitrogen concentration of 87 to 124 mg/L each, and could not treat ammonium in ammonium containing liquids almost at all.

Ammonium treatment by the conventional processes needs nitrification reaction and denitrification reaction. The nitrification reaction needs a retention time of 4 to 6 hours, the denitrification reaction needs a retention time of 3 to 6 hours, and the treatment needs methanol in an amount three times greater than that of nitrogen. Accordingly, the treatment needs large-scale treatment equipment.

On the contrary, treatment in Tests 1 to 3 simply involves adding a necessary amount of nitrate from the nitrate storage tank 112 and a necessary amount of an organic substance from an organic substance storage tank 132 to the anaerobic ammonium oxidation tank 114, while bringing an ammonium containing liquid into contact with heterotrophic denitrifying bacteria and anaerobic ammonium oxidizing bacteria in an anaerobic atmosphere in the anaerobic ammonium oxidation tank 114. Consequently, the retention time can be shortened to one hour, and an ammonium containing liquid can be treated constantly stably. Accordingly, the process of the present invention can reduce the size of treatment equipment as compared with a conventional process requiring a nitrification tank and a denitrification tank, can be operated at a lower running cost, and is thus an extremely inexpensive treatment process.

Example 2-3

In this treatment, an ammonium containing liquid was treated using treatment equipment 190 shown in FIG. 12. The composition and the like of entrapping immobilization pellets with which anaerobic ammonium oxidation tanks 114 were filled are the same as in the aforementioned Table 3. After mixing the components in Table 3 in the same manner as above, the above composition was gelled by addition of potassium persulfate, and the gel was formed into 3 mm×3 mm squares to prepare entrapping immobilization pellets 124.

(Test Conditions for Treatment Equipment)

Ammonium containing liquid: Diluted development wastewater with an ammonium nitrogen ($NH_4$—N) concentration of 2,000 mg/L Amount of nitrate added: Nitrate containing nitrogen in an amount 1.5 times of ammonium nitrogen ($NH_4$—N) continuously added Amount of organic substance added: Methanol in an amount 0.8 time of nitrate nitrogen ($NO_3$—N) continuously added Retention time in anaerobic ammonium oxidation tanks 114: 4 hours Packing ratio of entrapping immobilization pellets 124: 30%

Anaerobic mechanical stirring in the anaerobic ammonium oxidation tanks 114 caused a flow of entrapping immobilization pellets.

As a result of continuous treatment under the above conditions, ammonium in the ammonium containing liquid and nitrite produced by reduction of nitrate added from a nitrate storage tank 112 by heterotrophic denitrifying bacteria were simultaneously denitrified in the anaerobic ammonium oxidation tanks 114, and the treated liquid was maintained to have a total nitrogen concentration of 120 to 180 mg/L in a stable manner.

In this manner, by employing the present invention, ammonium in an ammonium containing liquid could be denitrified at a high speed.

Example 3

Example 3-1

In this treatment, an ammonium containing liquid was treated using treatment equipment 210 shown in FIG. 13.

The composition and the like of entrapping immobilization pellets 216 with which an anaerobic ammonium oxidation tank 214 was filled are the same as in the aforementioned Table 3.

After mixing the components in Table 3, the above composition was gelled by addition of potassium persulfate, and the gel was formed into 3 mm×3 mm squares to prepare entrapping immobilization pellets 216.

(Test Conditions for Treatment Equipment)
  Ammonium containing liquid: Industrial wastewater having an ammonium nitrogen ($NH_4$—N) concentration of 90 to 120 mg/L and a BOD concentration of 90 to 130 mg/L
  Retention time in nitrification tank 212: 6 hours
  Nitrification tank 212 packed with contact filter media
  Retention time in anaerobic ammonium oxidation tanks 214: 2 hours
  Packing ratio of entrapping immobilization pellets 216 in anaerobic ammonium oxidation tank 214: 20%
  Mechanical stirring in the anaerobic ammonium oxidation tank 214 caused a flow of entrapping immobilization pellets 216, 216 . . . .

After continuous treatment under the above-described conditions and acclimatization for one month, ammonium and nitrite were simultaneously removed, and the treated liquid was maintained to have a total nitrogen concentration (T-N) of 12 to 20 mg/L in a stable manner.

Example 3-2

In this Example using treatment equipment 230 of FIG. 14, an ammonium containing liquid was treated with entrapping immobilization pellets 216 in the same manner as in Example 3-1. The specification of a nitrification tank 212 and an anaerobic ammonium oxidation tank 214 and the wastewater used were the same as in Example 3-1. The equipment was operated at a nitrified liquid feedback ratio of 100%.

After continuous treatment under the above-described conditions and acclimatization for one month, ammonium and nitrite were simultaneously removed, and the treated liquid was maintained to have a total nitrogen concentration (T-N) of 7 to 10 mg/L in a stable manner.

Example 3-3

In this Example using treatment equipment 240 of FIG. 15, an ammonium containing liquid was treated with entrapping immobilization pellets 216 in the same manner as in Example 3-1.

(Test Conditions for Treatment Equipment)
  Ammonium containing liquid: Industrial wastewater having an ammonium nitrogen ($NH_4$—N) concentration of 90 to 120 mg/L and a BOD concentration of 190 to 230 mg/L
  Retention time in nitrification tank 212: 6 hours
  Nitrification tank 212 packed with contact filter media
  Retention time in denitrification tank 226: 3 hours
  Denitrification tank 226 packed with contact filter media 28 (denitrifying bacteria attached to be immobilized)
  Retention time in anaerobic ammonium oxidation tanks 214: 2 hours
  Packing ratio of entrapping immobilization pellets 216 in anaerobic ammonium oxidation tank 214: 20%
  Mechanical stirring in the anaerobic ammonium oxidation tank 214 caused a flow of entrapping immobilization pellets 216, 216 . . . .

After continuous treatment under the above-described conditions and acclimatization for one month, ammonium and nitrite were simultaneously removed, and the treated liquid was maintained to have a total nitrogen concentration (T-N) of 14 to 20 mg/L and a BOD concentration of 20 mg/L or less in a stable manner.

When the denitrification tank 226 was not equipped in the treatment equipment 240, anaerobic ammonium oxidizing bacteria were inhibited by the BOD component, and the total nitrogen concentration (T-N) in the treated water was reduced to 40 to 80 mg/L.

Example 3-4

In this Example using treatment equipment 250 of FIG. 16, an ammonium containing liquid was treated with entrapping immobilization pellets 216 in the same manner as in Example 3-1. The specification of a nitrification tank 212, a denitrification tank 226, and an anaerobic ammonium oxidation tank 214 and the wastewater used were the same as in Example 3-3.

The equipment was operated at a nitrified liquid feedback ratio of 100% (50% to the denitrification tank 226, and 50% to the anaerobic ammonium oxidation tank 214).

After continuous treatment under the above-described conditions and acclimatization for one month, ammonium and nitrite were simultaneously removed, and the treated liquid was maintained to have a total nitrogen concentration (T-N) of 7 to 12 mg/L and a BOD concentration of 20 mg/L or less in a stable manner.

Example 3-5

In this Example using treatment equipment 260 of FIG. 17, an ammonium containing liquid was treated under the same conditions as in Example 3-1, except for using wastewater not containing BOD and having an ammonium nitrogen ($NH_4$—N) concentration of 90 to 120 mg/L. The treatment equipment 260 comprises the equipment of Example 3-1 and a molasses addition unit 242.

When molasses was introduced into nitrate produced in a nitrification tank 212 to attain a $C/NO_3$—N ratio of 1.8 to the anaerobic ammonium oxidation tank 214, continuous treatment was carried out in a stable manner, and the treated liquid was maintained to have a total nitrogen concentration (T-N) of 10 to 20 mg/L.

Example 3-6

In this Example using treatment equipment 270 of FIG. 18, an ammonium containing liquid was treated with entrapping immobilization pellets 216 in the same manner as in Example 3-1. Multiple nitrification tanks 212 were provided (three tanks in this Example), since a high-concentration ammonium containing liquid was used as described in the following test conditions.

(Test Conditions for Treatment Equipment)
  Ammonium containing liquid: Industrial wastewater having an ammonium nitrogen ($NH_4$—N) concentration of 590 to 820 mg/L and a BOD concentration of 100 to 230 mg/L
  Retention time in nitrification tanks 212: 12 hours (retention time in each tank 4 hours)
  Packing ratio of entrapping immobilization nitrified sludge pellets 215 in nitrification tanks 212: 20%
  Retention time in anaerobic ammonium oxidation tanks 214: 12 hours
  Packing ratio of entrapping immobilization pellets 216 in anaerobic ammonium oxidation tank 214: 20%

Molasses introduced into anaerobic ammonium oxidation tank 214 at a C/NO₃—N ratio of 0.5

Mechanical stirring in the anaerobic ammonium oxidation tank 214 caused a flow of entrapping immobilization pellets 216, 216 . . . .

After continuous treatment under the above-described conditions and acclimatization for one month, ammonium and nitrite were simultaneously removed, and the treated liquid was maintained to have a total nitrogen concentration (T-N) of 34 to 40 mg/L in a stable manner.

In Comparative Example, when the equipment was operated with a single nitrification tank 212 for a retention time of 12 hours, nitrification did not proceed, and the treated liquid was maintained to have a total nitrogen concentration (T-N) of 184 to 540 mg/L. In a conventional treatment process with activated sludge, it is necessary to dilute wastewater three times and extend the retention time to two days or more.

Example 3-7

In this Example using treatment equipment 280 of FIG. 19, an ammonium containing liquid was treated with entrapping immobilization pellets 216 in the same manner as in Example 3-1. Multiple nitrification tanks 212 and anaerobic ammonium oxidation tanks 214 were provided (three tanks in this Example, respectively), since a high-concentration ammonium containing liquid was used as described in the following test conditions.

(Test Conditions for Treatment Equipment)

Ammonium containing liquid: Industrial wastewater having an ammonium nitrogen (NH₄—N) concentration of 590 to 820 mg/L and a BOD concentration of 100 to 230 mg/L Retention time in nitrification tanks 212: 12 hours (retention time in each tank 4 hours).

Packing ratio of entrapping immobilization nitrified sludge pellets 215 in nitrification tanks 212: 20%

Retention time in anaerobic ammonium oxidation tanks 214: 12 hours (retention time in each tank 4 hours)

Packing ratio of entrapping immobilization pellets 216 in anaerobic ammonium oxidation tanks 214: 20%

Molasses introduced into anaerobic ammonium oxidation tanks 214 at a C/NO₃—N ratio of 0.5

Mechanical stirring in the anaerobic ammonium oxidation tanks 214 caused a flow of entrapping immobilization pellets 214, 214 . . . .

After continuous treatment under the above-described conditions and acclimatization for one month, ammonium and nitrite were simultaneously removed, and the treated liquid was maintained to have a total nitrogen concentration (T-N) of 14 to 20 mg/L in a stable manner.

In Comparative Example for this Example, when the equipment was operated with a single nitrification tank 212 for a retention time of 12 hours, nitrification did not proceed, and the treated liquid was maintained to have a total nitrogen concentration (T-N) of 284 to 630 mg/L. In a conventional treatment process with activated sludge, it is necessary to dilute wastewater three times and extend the retention time to two days or more.

In a conventional process, ammonium treatment essentially involves nitrification reaction and denitrification reaction. Treatments of Examples 3-1 to 3-5 using a conventional process require a nitrification tank retention time of 12 hours and a denitrification tank of 12 hours to obtain the same water quality. The treatments also require an organic substance such as molasses or methanol in an amount three times of an amount of nitrogen, and large-scale treatment equipment. In contrast, when the present invention is employed, ammonium can be anaerobically denitrified for a short retention time, and treatment equipment can be much inexpensive than in a conventional process.

As described above, when the present invention is employed, a process and equipment for treating an ammonium containing liquid can be provided which can denitrify ammonium in an ammonium containing liquid at a high speed.

What is claimed is:

1. A process for treating an ammonium containing liquid by denitrification treatment of an ammonium containing liquid containing at least ammonium, the process comprising:

carrying out nitrate reduction treatment of reducing nitrate to nitrite, wherein the nitrate is contained in or added to the ammonium containing liquid; and at the same time carrying out anaerobic ammonium oxidation treatment of simultaneously anaerobically denitrifying nitrite and ammonium, wherein the nitrite is produced in the nitrate reduction treatment and ammonium is contained in the ammonium containing liquid, wherein the nitrate reduction treatment is carried out by bringing the ammonium containing liquid into contact with a catalyst that reduces the nitrate as a nitrogen component to nitrite.

2. The process for treating an ammonium containing liquid according claim 1, wherein the catalyst is a Pd—Cu catalyst formed of an alloy of palladium and copper.

3. The process for treating an ammonium containing liquid according to claim 1, wherein the C/NO₃—N ratio of the concentration C of the organic carbon contained in or added to the arnmomum containing liquid to the concentration NO₃—N of nitrate nitrogen contained in or added to the ammonium containing liquid is defined to be 0.5 to 2.5.

4. A process for treating an ammonium containing liquid by anaerobically biologically denitrifying ammonium in the ammonium containing liquid, the process comprising:

adding a certain concentration of nitrate to an anaerobic ammonium oxidation tank from a nitrate storage tank at the same time that the ammonium containing liquid is brought into contact with heterotrophic denitrifying bacteria and anaerobic ammonium oxidizing bacteria in the anaerobic ammonium oxidation tank to carry out the biological denitrification, wherein the ammonium containing liquid is brought into contact with pellets in which heterotrophic denitrifying bacteria are entrapped to be immobilized and pellets in which anaerobic ammonium oxidizing bacteria are entrapped to be immobilized, or wherein the ammonium containing liquid is brought into contact with pellets in which both the heterotrophic denitrifying bacteria and the anaerobic ammonium oxidizing bacteria are entrapped to be immobilized.

5. The process for treating an ammonium containing liquid according to claim 4, further comprising:

measuring the ammomum nitrogen concentration in the ammonium containing liquid, calculating the necessary amount of nitrate from the measured ammonium nitrogen concentration, and controlling the amount of a certain concentration of the nitrate added, based on the calculated necessary amount of the nitrate.

6. The process for treating an ammonium containing liquid according to claim 4 further comprising:

measuring the volume of the ammonium containing liquid flowing into the anaerobic ammonium oxidation tank, and increasing or decreasing the amount of a certain concentration of the nitrate added in proportion to an increase or decrease in the measured inflow volume.

7. The process for treating an ammonium containing liquid according to claim 4, further comprising:

increasing or decreasing the amount of the nitrate added to the anaerobic ammonium oxidation tank from the nitrate storage tank, measuring an increase or decrease in the production rate (L/min) of nitrogen gas produced in the anaerobic ammonium oxidation tank when the amount is increased or decreased, and controlling the amount of a certain concentration of the nitrate added with reference to, as the necessary amount of nitrate, an amount that does not allow the gas production rate to be increased or decreased in direct proportion to an increase or decrease in the amount of the nitrate added.

8. A process for treating an ammonium containing liquid by anaerobically biologically denitrifying ammonium in the ammonium containing liquid, the process comprising:

adding a certain concentration of nitrate to an anaerobic ammonium oxidation tank from a nitrate storage tank, and adding a certain concentration of an organic substance to the anaerobic ammonium oxidation tank from an organic substance storage tank at the same time that the ammonium containing liquid is brought into contact with heterotrophic denitrifying bacteria and anaerobic ammonium oxidizing bacteria in the anaerobic ammonium oxidation tank to carry out the biological denitrification, wherein the ammonium containing liquid is brought into contact with pellets in which heterotrophic denitrifying bacteria are entrapped to be immobilized and pellets in which anaerobic ammonium oxidizing bacteria are entrapped to be immobilized, or wherein the ammonium containing liquid is brought into contact with pellets in which both the heterotrophic denitrifying bacteria and the anaerobic ammonium oxidizing bacteria are entrapped to be immobilized.

9. The process for treating an ammonium containing liquid according to claim 8, further comprising:

measuring the ammonium nitrogen concentration in the ammonium containing liquid, calculating the necessary amount of nitrate from the measured ammonium nitrogen concentration, controlling the amount of a certain concentration of the nitrate added from the nitrate storage tank, based on the calculated necessary amount of the nitrate, and controlling the amount of a certain concentration of the organic carbon added from the organic storage tank, so that the $C/NO_3$—N ratio of the organic carbon concentration to the nitrate nitrogen concentration in the ammonium containing liquid is 0.5 to 2.5.

* * * * *